United States Patent
Chen et al.

(10) Patent No.: US 9,503,702 B2
(45) Date of Patent: Nov. 22, 2016

(54) VIEW SYNTHESIS MODE FOR THREE-DIMENSIONAL VIDEO CODING

(71) Applicant: QUALCOMM Incorporated, San Diego, CA (US)

(72) Inventors: Ying Chen, San Diego, CA (US); Li Zhang, San Diego, CA (US); Marta Karczewicz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 561 days.

(21) Appl. No.: 13/839,447

(22) Filed: Mar. 15, 2013

(65) Prior Publication Data

US 2013/0271566 A1    Oct. 17, 2013

Related U.S. Application Data

(60) Provisional application No. 61/624,157, filed on Apr. 13, 2012, provisional application No. 61/635,761, filed on Apr. 19, 2012, provisional application No. 61/639,064, filed on Apr. 26, 2012, provisional application No. 61/639,845, filed on Apr. 27, 2012, provisional application No. 61/642,379, filed on May 3, 2012, provisional application No. 61/646,810, filed on May 14, 2012, provisional application No. 61/696,661, filed on Sep. 4, 2012.

(51) Int. Cl.
| | | |
|---|---|---|
| *H04N 13/00* | (2006.01) | |
| *H04N 19/176* | (2014.01) | |
| *H04N 19/597* | (2014.01) | |
| *H04N 19/70* | (2014.01) | |
| *H04N 19/109* | (2014.01) | |

(52) U.S. Cl.
CPC ........ *H04N 13/0048* (2013.01); *H04N 19/109* (2014.11); *H04N 19/176* (2014.11); *H04N 19/597* (2014.11); *H04N 19/70* (2014.11)

(58) Field of Classification Search
None
See application file for complete search history.

(56) References Cited

U.S. PATENT DOCUMENTS

| | | |
|---|---|---|
| 7,782,947 B2 | 8/2010 | Jeon et al. |
| 2008/0170753 A1 | 7/2008 | Park et al. |
| 2008/0198924 A1 | 8/2008 | Ho et al. |
| 2009/0252221 A1 | 10/2009 | Park et al. |

(Continued)

FOREIGN PATENT DOCUMENTS

EP    1978750 A2    10/2008

OTHER PUBLICATIONS

Yea et al, View Synthesis Prediction for Multiview Video Coding, Apr. 2009, Mitsubishi Electric Research Laboratories, TR2009-009, pp. 1-14.*

(Continued)

*Primary Examiner* — Geepy Pe
*Assistant Examiner* — William Adrovel
(74) *Attorney, Agent, or Firm* — Shumaker & Sieffert, P.A.

(57) ABSTRACT

A video encoder signals, in a bitstream, a syntax element that indicates whether a current video unit is predicted from a VSP picture. The current video unit is a macroblock or a macroblock partition. The video encoder determines, based at least in part on whether the current video unit is predicted from the VSP picture, whether to signal, in the bitstream, motion information for the current video unit. A video decoder decodes the syntax element from the bitstream and determines, based at least in part on the syntax element, whether the bitstream includes the motion information.

24 Claims, 11 Drawing Sheets

(56) References Cited

U.S. PATENT DOCUMENTS

| | | | |
|---|---|---|---|
| 2009/0279608 A1* | 11/2009 | Jeon et al. | 375/240.16 |
| 2010/0215100 A1 | 8/2010 | Jeon et al. | |
| 2011/0044550 A1* | 2/2011 | Tian et al. | 382/238 |
| 2011/0122225 A1 | 5/2011 | Kim et al. | |
| 2012/0230412 A1 | 9/2012 | Lee et al. | |

OTHER PUBLICATIONS

International Preliminary Report on Patentability from International Application No. PCT/US2013/034992, dated Jun. 11, 2014, 9 pp.

Response to Second Written Opinion dated Mar. 27, 2014, from International Application No. PCT/US2013/034992, filed on May 19, 2014, 25 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Hannuksela et al., "3D-AVC Draft Text 4," Joint Collaborative Team on 3D Video Coding Extension Development of ITU-T SG 16 WP 3 and ISO/IEC JTC 1/SC 29/WG 11, 2nd meeting: Shanghai, CN, Oct. 13-19, 2012, Document JCT3V-B1002, 75 pp.

Hannuksela et al., Editors: "Working Draft 1 of AVC compatible video with depth information," ISO/IEC/JTC1/SC29/WG11/N12545, Mar. 2012, 65 pp.

Hannuksela, "Test Model for AVC based 3D video coding," ISO/IEC JTC1/SC29/WG11 MPEG2012/N12558, Mar. 2012, 18 pp.

International Search Report and Written Opinion—PCT/US2013/034992—ISA/EPO—Jul. 16, 2013, 13 pp.

ITU-T H.264, Series H: Audiovisual and Multimedia Systems, Infrastructure of audiovisual services—Coding of moving video, Advanced video coding for generic audiovisual services, Mar. 2010, 674 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Rusanovskyy et al., "Description of Nokia's response to MPEG 3DV Call for Proposals on 3DV Video Coding Technologies," ISO/IEC JTC1/SC29/WG11 MPEG2011/M22552, Nov. 2011, Geneva, Switzerland, 21 pp.

Schwarz et al., "Description of 3D Video Technology Proposal by Fraunhofer HHI (HEVC compatible; configuration A)," ISO/IEC JTC1/SC29/WG11 MPEG2011/M22570, Geneva, Switzerland, Nov. 2011, 48 pp.

Schwarz et al., "Test Model under Consideration for HEVC based 3D video coding," ISO/IEC JTC1/SC29/WG11 MPEG2011/N12559, Feb. 2012, San Jose, CA, USA, 44 pp.

Stankiewicz et al., "Poznan University of Technology tools for 3DV coding integration into 3D-HTM," ISO/IEC JTC1/SC29/WG11 MPEG2012/ M23783, Feb. 2012, San Jose, USA, 7 pp.

Suzuki et al., "WD on MVC extensions for inclusion of depth maps," Coding of Moving Pictures and Associated Audio Information, Document No. ISO/IEC/JTC1/SC29/WG11/N12351, Dec. 2011, 14 pp.

Suzuki et al., "WD on MVC extensions for inclusion of depth maps," International Organisation for Standardisation Organisation Internationale de Normalisation ISO/IEC JTC1/SC29/WG11 Coding of Moving Pictures and Associated Audio Information, ISO/IEC/JTC1/SC29/WG11N12544, Feb. 2012, 66 pp.

Tian et al., "Mitsubishi Response to MPEG Call for Proposal on 30 Video Coding Technology", MPEG Meeting; Geneva; (Motion Picture Expert Group or ISO/IEC JTC1 /SC29/WG11), No. m22663, Nov. 2011, XP030051226, 18 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

Yang et al., "3D-CE1.a related: on Generalized view synthesis prediction (GVSP) mode", MPEG Meeting; Geneva; (Motion Picture Expert Group or ISO/IEC JTC1/SC29/WG11), No. m24940, Apr.-May 2012, XP030053283, 6 pp.

Zhao et al., "Cross-check for JCTVC-G197 (AHG4: Low latency CABAC initialization for dependent tiles)," Joint Collaborative Team on Video Coding (JCT-VC) of ITU-T SG16 WP3 and ISO/IEC JTC1/SC29/WG11, 7th Meeting: Geneva, Nov. 21-30, 2011, Document JCTVC-G961, WG11 No. m22586, 3 pp.

Zhao et al., "3D-CE1.a: Generalized view synthesis prediction (GVSP) mode", JCT-3V Meeting; MPEG Meeting; Stockholm; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-A0103, Jul. 16-20, 2012, XP030130102, 6 pp.

Second Written Opinion of international application No. PCT/US2013/034992, mailed Mar. 27, 2014, 8 pp.

Chen Y., et al., "Comments on View Synthesis Prediction in 3D-AVC", 3. JCT-3V Meeting; 103. MPEG Meeting; Jan. 17, 2013-Jan. 23, 2013; Geneva; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-00063, Jan. 11, 2013, XP030130479.

Sullivan, et al., "Editors' draft revision to ITU-T Rec. H.2641 ISO/IEC 14496-10 Advanced Video Coding—in preparation for ITU-T SG 16 AAP Consent (in integrated form)," 30th Meeting: Geneva, CH Jan. 29-Feb. 3, 2009, Document: JVT-AAOO7, Feb. 2, 2009, 689 pp.

Bross, et al., "WD4: Working Draft 4 of High-Efficiency Video Coding," 6th Meeting; Torino, IT, Jul. 14-22, 2011; Document: JCTVC-F803_d6, Oct. 22, 2011, 229 pp.

Bross, et al., "High Efficiency Video Coding (HEVC) test specification draft 9," 11th Meeting: Shanghai, CN; Oct. 10-19, 2012, Document: JCTVC-K1003_v8, 292 pp.

Chen, et al., "Description of 3D Video Coding Technology Proposal by Qualcomm Incorporated," ISO/IEC/JTCl/SC29/WG11/MPEG2011/m2253, Nov. 2011, 21 pp.

Hannuksela, et al., Editors: "Working Draft 1 of AVC compatible video with depth information," ISO/IEC/JTC1/SC29/WG11/N12545, Mar. 2012, 65 pp.

* cited by examiner

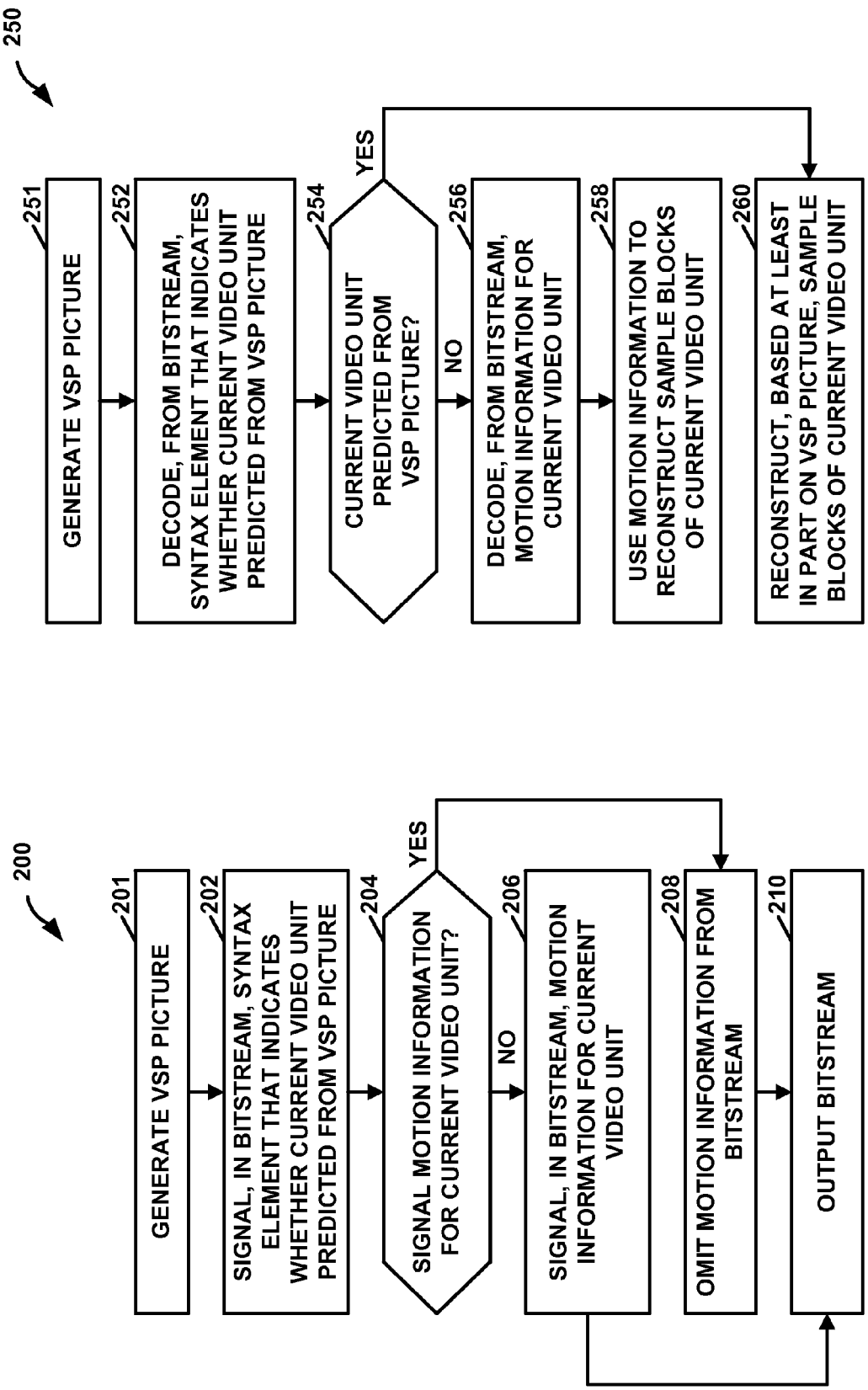

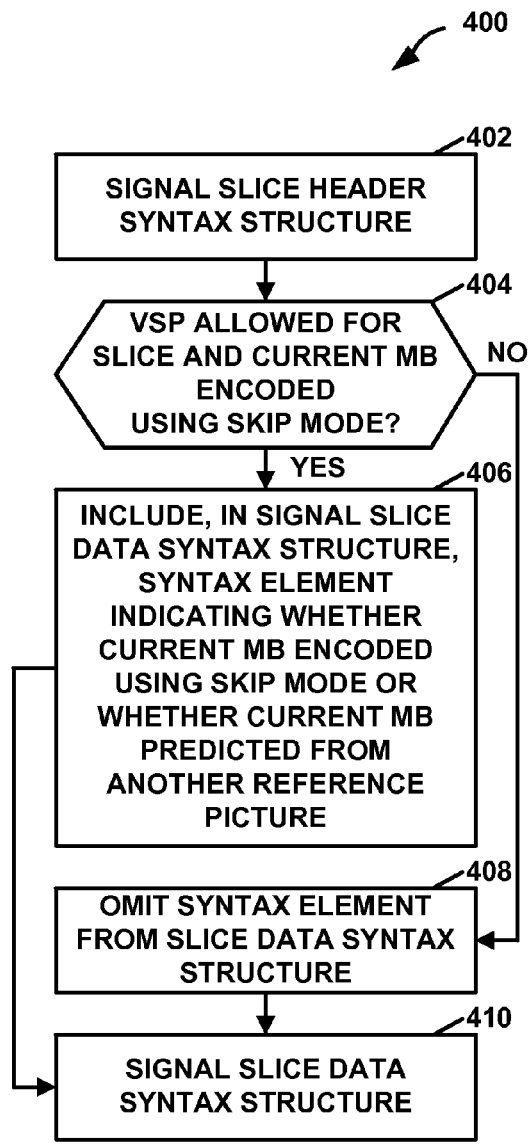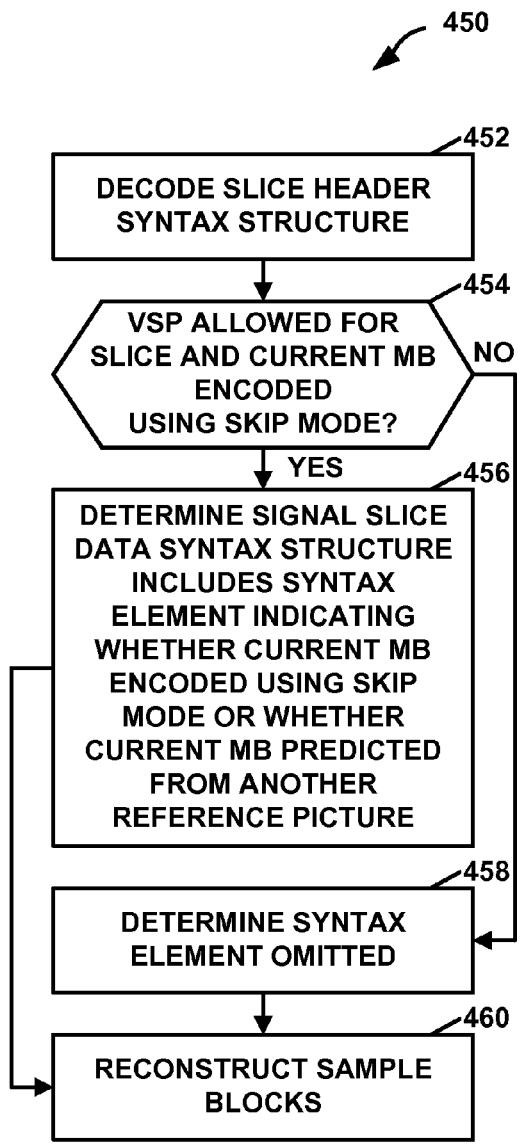
FIG. 6A                    FIG. 6B

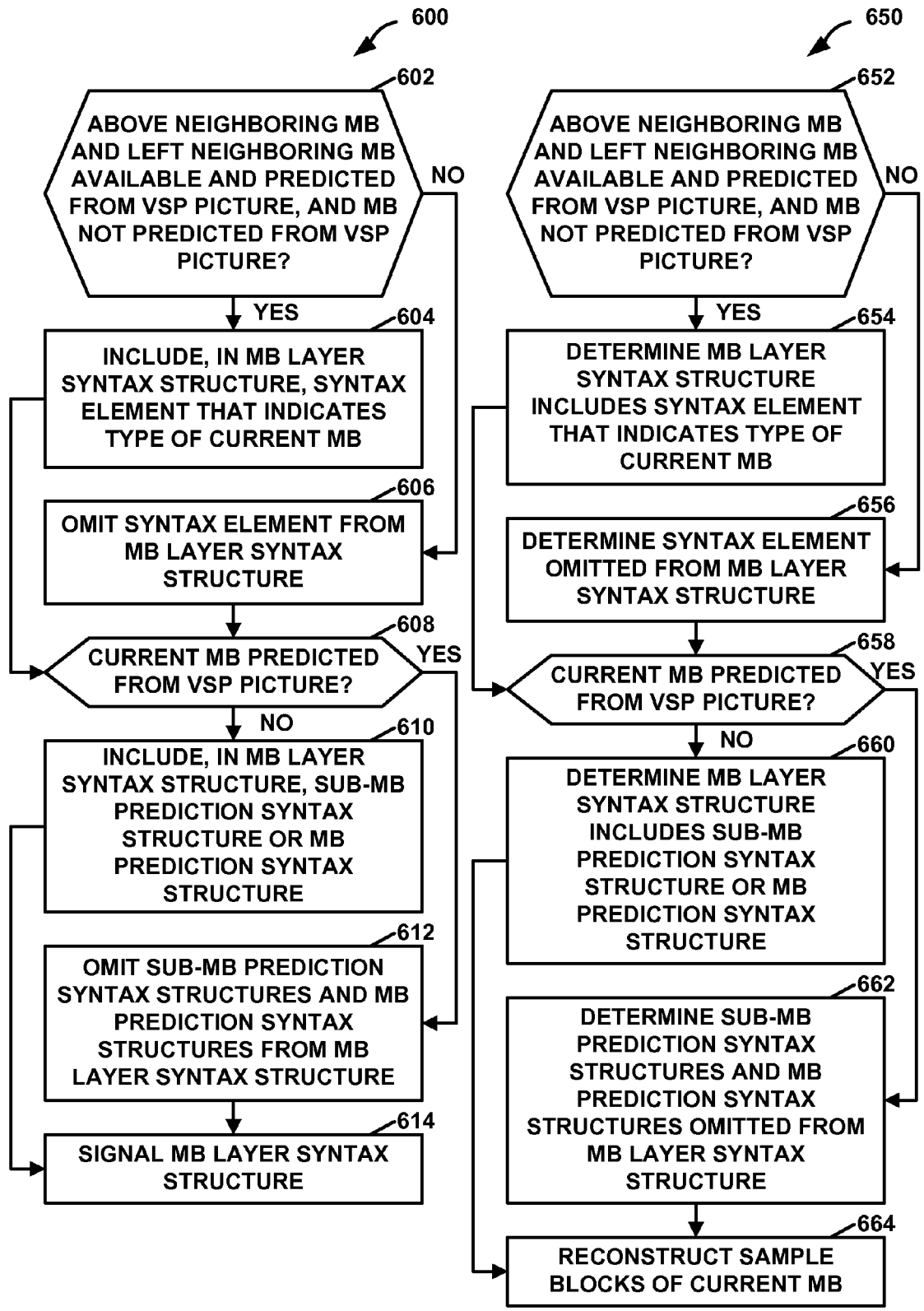

VIEW SYNTHESIS MODE FOR THREE-DIMENSIONAL VIDEO CODING

This application claims the benefit of U.S. Provisional Patent Application No. 61/624,157, filed Apr. 13, 2012, U.S. Provisional Patent Application No. 61/635,761, filed Apr. 19, 2012, U.S. Provisional Patent Application No. 61/639,064, filed Apr. 26, 2012, U.S. Provisional Patent Application No. 61/639,845, filed Apr. 27, 2012, U.S. Provisional Patent Application No. 61/642,379, filed May 3, 2012, U.S. Provisional Patent Application No. 61/646,810, filed May 14, 2012, and U.S. Provisional Patent Application No. 61/696,661, filed Sep. 4, 2012, the entire content of each of which is incorporated herein by reference.

TECHNICAL FIELD

This disclosure relates to video coding (i.e., encoding and/or decoding of video data).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multi-view bitstream may be generated by encoding views e.g., from multiple color cameras. To further extend the flexibility of multi-view video, three-dimensional (3D) video standards have been developed. A 3D video bitstream may contain not only the views corresponding to multiple cameras, namely texture views, but also depth views associated with at least one or more texture views. For example, each view may consist of one texture view and one depth view.

SUMMARY

In general, this disclosure describes signaling a view synthesis prediction (VSP) mode of a video unit. More specifically, a video encoder signals, in a bitstream, a syntax element that indicates whether a current video unit is predicted from a VSP picture. The current video unit may be a macroblock or a macroblock partition. Furthermore, the video encoder may determine, based at least in part on whether the current video unit is predicted from the VSP picture, whether to signal, in the bitstream, motion information for the current video unit.

A video decoder may decode, from a bitstream, the syntax element that indicates whether the current video unit is predicted from the VSP picture. When the current video unit is predicted from the VSP picture, the video decoder may reconstruct, based at least in part on the VSP picture, sample blocks of the current video unit. When the current video unit is not predicted from the VSP picture, the video decoder may decode, from the bitstream, motion information for the current video unit. The video decoder may use the motion information to reconstruct the sample blocks of the current video unit.

In one example, a method of decoding video data comprises generating, based at least in part on a previously-coded texture view component of a current access unit and a depth view component of the current access unit, a VSP picture. In addition, the method comprises decoding, from a bitstream that includes a coded representation of multiple texture views and multiple depth views, a syntax element that indicates whether a current video unit is predicted from the VSP picture, wherein the current video unit is a macroblock (MB) or an MB partition of a current texture view component of a current view of the current access unit. The method also comprises, when the current video unit is not predicted from the VSP picture, decoding, from the bitstream, motion information for the current video unit and using the motion information for the current video unit to reconstruct sample blocks of the current video unit. In addition, the method comprises when the current video unit is predicted from the VSP picture, using the VSP picture to reconstruct the sample blocks of the current video unit.

In another example, a video decoding device comprises one or more processors configured to generate, based at least in part on a previously-coded texture view component of a current access unit and a depth view component of the current access unit, a VSP picture. Furthermore, the one or more instructions are configured to decode, from a bitstream that includes a coded representation of multiple texture views and multiple depth views, a syntax element that indicates whether a current video unit is predicted from the VSP picture, wherein the current video unit is an MB or an MB partition of a current texture view component of a current view of the current access unit. The one or more processors are also configured such that when the current video unit is not predicted from the VSP picture, the one or more processors decode, from the bitstream, motion information for the current video unit and use the motion information for the current video unit to reconstruct sample blocks of the current video unit. The one or more processors are also configured such that when the current video unit is predicted from the VSP picture, the one or more processors use the VSP picture to reconstruct the sample blocks of the current video unit.

In another example, a video decoding device comprises means for generating, based at least in part on a previously-coded texture view component of a current access unit and a depth view component of the current access unit, a VSP picture. In addition, the video decoding device comprises means for decoding, from a bitstream that includes a coded representation of multiple texture views and multiple depth views, a syntax element that indicates whether a current video unit is predicted from the VSP picture, wherein the current video unit is an MB or an MB partition of a current texture view component of a current view of the current access unit. In addition, the video decoding device comprises means for decoding, when the current video unit is not predicted from the VSP picture, from the bitstream, motion information for the current video unit. The video decoding device also comprises means for using, when the current video unit is not predicted from the VSP picture, the motion information for the current video unit to reconstruct sample blocks of the current video unit. In addition, the video decoding device comprises means for using, when the current video unit is predicted from the VSP picture, the VSP picture to reconstruct the sample blocks of the current video unit.

In another example, a computer-readable storage medium has instructions stored thereon that, when executed by one or more processors of a video decoding device, configure the video decoding device to generate, based at least in part on a previously-coded texture view component of a current access unit and a depth view component of the current access unit, a VSP picture. The instructions also configure the video decoding device to decode, from a bitstream that includes a coded representation of multiple texture views and multiple depth views, a syntax element that indicates whether a current video unit is predicted from the VSP picture, wherein the current video unit is an MB or an MB partition of a current texture view component of a current view of the current access unit. The instructions also configure the video decoding device such that, when the current video unit is not predicted from the VSP picture, the video decoding device decodes, from the bitstream, motion information for the current video unit and uses the motion information for the current video unit to reconstruct sample blocks of the current video unit. When the current video unit is predicted from the VSP picture, the instructions configure the video decoding device to use the VSP picture to reconstruct the sample blocks of the current video unit.

In another example, a method for encoding video data comprises generating, based at least in part on a previously-coded texture view component of a current access unit and a depth view component of the current access unit, a VSP picture. Furthermore, the method comprises signaling, in a bitstream that includes an encoded representation of multiple texture views and multiple depth views, a syntax element indicating whether a current video unit is predicted from the VSP picture, wherein the current video unit is a MB or an MB partition of a current texture view component of a current view of the current access unit. In addition, the method comprises, when the current video unit is not predicted from the VSP picture, signaling, in the bitstream, motion information for the current video unit. The method also comprises, when the current video unit is predicted from the VSP picture, omitting, from the bitstream, the motion information for the current video unit. Furthermore, the method comprises outputting the bitstream.

In another example, a video encoding device comprises one or more processors configured to generate, based at least in part on a previously-coded texture view component of a current access unit and a depth view component of the current access unit, a VSP picture. In addition, the one or more processors are configured to signal, in a bitstream that includes an encoded representation of multiple texture views and multiple depth views, a syntax element indicating whether a current video unit is predicted from the VSP picture, wherein the current video unit is an MB or an MB partition of a current texture view component of a current view of the current access unit. The one or more processors are configured such when the current video unit is not predicted from the VSP picture, the one or more processors signal, in the bitstream, motion information for the current video unit. Furthermore, the one or more processors are configured such that when the current video unit is predicted from the VSP picture, the one or more processors omit, from the bitstream, the motion information for the current video unit. The one or more processors are also configured to output the bitstream.

In another example, a video encoding device comprises means for generating, based at least in part on a previously-coded texture view component of a current access unit and a depth view component of the current access unit, a VSP picture. In addition, the video encoding device comprises means for signaling, in a bitstream that includes an encoded representation of multiple texture views and multiple depth views, a syntax element indicating whether a current video unit is predicted from the VSP picture, wherein the current video unit is an MB or an MB partition of a current texture view component of a current view of the current access unit. The video encoding device also comprises means for signaling, when the current video unit is not predicted from the VSP picture, in the bitstream, motion information for the current video unit. Furthermore, the video encoding device comprises means for omitting, when the current video unit is predicted from the VSP picture, from the bitstream, the motion information for the current video unit. In addition, the video encoding device comprises means for outputting the bitstream.

In another example, a computer-readable storage medium has instructions stored thereon that, when executed by one or more processors of a video encoding device, configure the video encoding device to generate, based at least in part on a previously-coded texture view component of a current access unit and a depth view component of the current access unit, a VSP picture. The instructions also cause the video encoding device to signal, in a bitstream that includes an encoded representation of multiple texture views and multiple depth views, a syntax element indicating whether a current video unit is predicted from the VSP picture, wherein the current video unit is an MB or an MB partition of a current texture view component of a current view of the current access unit. When the current video unit is not predicted from the VSP picture, the instructions configure the video encoding device to signal, in the bitstream, motion information for the current video unit. Furthermore, when the current video unit is predicted from the VSP picture, the instructions configure the video encoding device to omit, from the bitstream, the motion information for the current video unit. In addition, the instructions configure the video encoding device to output the bitstream.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 4A is a flowchart illustrating an example operation of a video encoder, in accordance with one or more techniques of this disclosure.

FIG. 4B is a flowchart illustrating an example operation of a video decoder, in accordance with one or more techniques of this disclosure.

FIG. 6A is a flowchart illustrating another example operation of the video encoder, in accordance with the techniques of this disclosure.

FIG. 6B is a flowchart illustrating another example operation of the video decoder, in accordance with the techniques of this disclosure.

FIG. 8A is a flowchart illustrating another example operation of the video encoder, in accordance with the techniques of this disclosure.

FIG. 8B is a flowchart illustrating another example operation of the video decoder, in accordance with the techniques of this disclosure.

DETAILED DESCRIPTION

Figure 1:
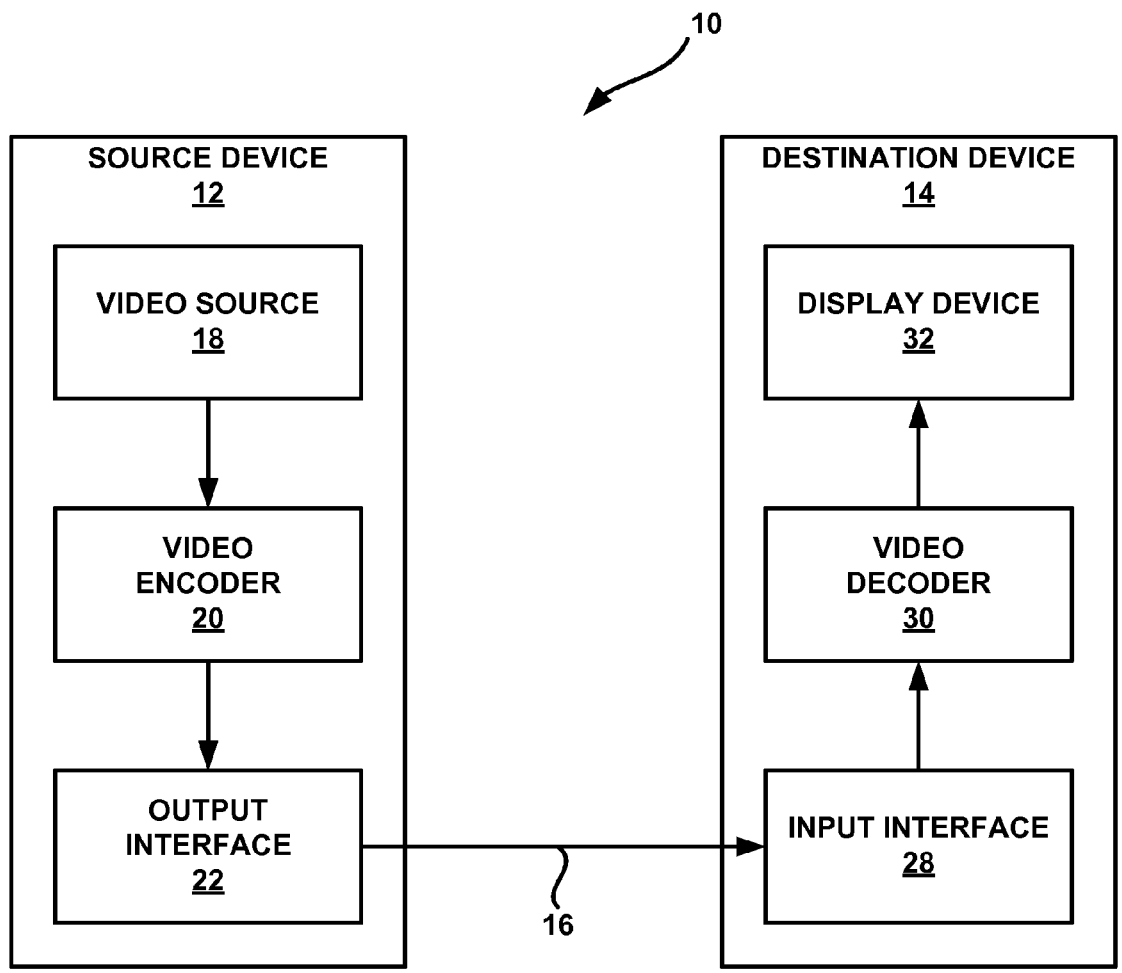
FIG. 1 is a block diagram illustrating an example video coding system that may utilize the techniques described in this disclosure.

In 3-dimensional video (3DV) coding, images of the same scene are captured from different viewpoints. Showing pictures of the same scene from different viewpoints may provide a viewer with a stereoscopic 3-dimensional effect.

Because pictures of the same scene captured at the same time from different viewpoints may be highly similar, a video encoder may use inter-view prediction to reduce the amount of data sent by predicting blocks of the pictures based in blocks in other pictures from different viewpoints. The term "access unit" is used to refer to the set of pictures that correspond to the same time instance. A "view component" may be a coded representation of a view in a single access unit.

To further reduce the amount of data sent, the video encoder may generate a view synthesis prediction (VSP) picture based on previously-coded view components in the same access unit as a picture currently being coded. The video encoder may include the VSP picture in a reference picture list. When the video encoder encodes a current video unit (e.g., a macroblock (MB), MB partition, sub-MB partition, prediction unit (PU), etc.), the video encoder may use the VSP picture as a reference picture in generating a predictive block for the current video unit. Furthermore, the video encoder may signal a reference index and a motion vector. The reference index may indicate the VSP picture's position within the reference picture list. The motion vector indicates a spatial displacement between a reference block within the VSP picture and sample blocks of the current video unit.

The video encoder may signal the motion vector using a motion vector difference (MVD). The MVD may indicate a difference between a motion vector predictor and a motion vector of the current video unit. The motion vector predictor may be a motion vector of a neighboring block.

A video decoder may generate the same VSP picture as the video encoder and may generate the same reference picture list as the video encoder. Furthermore, the video decoder may determine, based on the reference index, that a predictive block for a current video unit is to be generated based on the VSP picture. In addition, the video decoder may determine, based at least in part on a signaled MVD, a motion vector for the current video unit. The video decoder may then determine, based at least in part on the motion vector, a reference block within the VSP picture. Next, the video decoder may determine, based at least in part on the reference block, the predictive block for the current video unit. The video decoder may reconstruct, based at least in part on the predictive block for the current video unit, sample blocks of the current video unit.

As mentioned above, when the video encoder uses a VSP picture to generate a predictive block for a current video unit, the video encoder signals a MVD from which the video decoder derives a motion vector of the current video unit. When the video encoder uses a VSP picture to generate a predictive block for the current video unit, the motion vector is almost always very close to zero. That is, the reference block in the VSP picture is almost always co-located with the sample blocks of the current video unit.

Because the reference block in the VSP picture is almost always co-located with the sample blocks of the current video unit, the video decoder may be able to determine, without decoding a MVD for the current video unit from the bitstream, that a motion vector of the current video unit is equal to 0 if the current video unit is encoded based on the VSP picture. Hence, it may be a waste of bits to signal a MVD for the current video unit when the current video unit is encoded based on the VSP picture. Moreover, because it is unnecessary to signal the MVD for the current video unit when the current video unit is encoded based on the VSP picture, the signaling of a syntax element that indicates that the current video unit is encoded based on the VSP picture may render it unnecessary to include the VSP picture in a reference picture list.

In accordance with the techniques of this disclosure, the video encoder may signal, in a bitstream that includes a coded representation of multiple texture views and multiple depth views, a syntax element that indicates whether a current video unit is predicted from a VSP picture of a current texture view component. In some examples, the current video unit may be an MB, an MB partition, or a sub-MB partition. In other examples, the current video unit may be a prediction unit (PU). In some examples, when the syntax element indicates that the current video unit is predicted from the VSP picture, the video encoder does not signal motion information for the current video unit. In other words, the video encoder omits, from the bitstream, the motion information for the current video unit. For example, the video encoder does not signal reference indices or MVDs for the current video unit when the current video unit is predicted from the VSP picture. Conversely, when the current video unit is not predicted from the VSP picture, the video encoder may signal, in the bitstream, the motion information for the current video unit. Thus, the video encoder may determine, based at least in part on whether the current video unit is predicted from the VSP picture, whether to signal, in the bitstream, motion information for the current video unit. By not signaling the motion information of the current video unit when the current video unit is predicted from the VSP picture, the video encoder may reduce the number of bits in the bitstream.

Similarly, in accordance with the techniques of this disclosure, a video decoder may generate, based at least in part on a previously-coded texture view component of a current access unit and a depth view component of the current access unit, a VSP picture. Furthermore, the video decoder may decode, from a bitstream that includes a coded representation of multiple texture views and multiple depth views, a syntax element that indicates whether a current video unit is predicted from the VSP picture. When the current video unit is not predicted from the VSP picture, the video decoder may decode, from the bitstream, motion information for the current video unit and may use the motion information for the current video unit to reconstruct sample blocks of the current video unit. When the current video unit is predicted from the VSP picture, the video decoder may use the VSP picture to reconstruct the sample blocks of the current video unit.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) and Multiview Video Coding (MVC) extensions. A draft of MVC is described in "Advanced video coding for generic audiovisual services, ITU-T Recommendation H.264, March 2010, which as of Mar. 13, 2013 is available for download from http://www.itu.int/rec/T-REC-H.264-201003-S/en, the entire content of which is incorporated herein by reference. Another recent draft of the MVC extension of H.264/AVC is, as of Mar. 13, 2013, available for download at http://wftp3.itu.int/av-arch/jvt-site/2009_01_Geneva/JVT-AD007.zip, the entire content of which is incorporated herein by reference.

In addition, there is an extension of the MVC standard, namely "MVC-based 3DV" (i.e., MVC-compatible 3DV), described in "WD of MVC extension for inclusion of depth maps," MPEG document w12351, the entire content of which is incorporated herein by reference. In some instances, any legal bitstream conforming to MVC-based 3DV may always contain a sub-bitstream that is compliant to a MVC profile, e.g., stereo high profile.

Furthermore, there is an ongoing effort to generate a three-dimensional video (3DV) coding extension to H.264/AVC, namely AVC-based 3DV. A working draft (WD) of AVC-based 3DV, referred to as "3DV-AVC Working Draft 1" hereinafter is incorporated herein by reference. Another draft of the AVC-based 3DV is described in Mannuksela et al., "3D-AVC Draft Text 4," Joint Collaborative Team on 3D Video Coding Extension Development of ITU-T SG 16 WP 3 and ISO/IEC JTC 1/SC 29/WG 11, $2^{nd}$ meeting, Shanghai China, October 2012, which, as of Mar. 13, 2013, is available at http://phenix.it-sudparis.eu/jct2/doc_end_user/documents/2_Shanghai/wg11/JCT3V-B1002-v1.zip, the entire content of which is incorporated herein by reference. A description of the reference software for AVC-based 3DV is available as Miska M. Hannuksela, "Test Model for AVC based 3D video coding," ISO/IEC JTC1/SC29/WG11 MPEG2011/N12558, San Jose, USA, February 2012. The reference software is available, as of Mar. 13, 2013, from http://mpeg3dv.research.nokia.com/svn/mpeg3dv/trunk/, the entire content of which is incorporated herein by reference.

In other examples, video encoder 20 and video decoder 30 may operate according to ITU-T H.261, ISO/IEC MPEG-1 Visual, ITU-T H.262 or ISO/IEC MPEG-2 Visual, and ITU-T H.264, ISO/IEC Visual. Video encoder 20 and video decoder 30 may operate according to other video compression standards, including the High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG).

A draft of the upcoming HEVC standard, referred to as "HEVC Working Draft 4" is described in Bross et al., "WD4: Working Draft 4 of High Efficiency Video Coding," Joint Collaborative Team on Video Coding (JCT-VC) of ITU-T SG16 WP3 and ISO/IEC JTC1/SC29/WG11, $6^{th}$ Meeting, Torino, IT, July, 2011, which as of Mar. 13, 2013, is available from http://phenix.int-evey.fr/jct/doc_end_user/documents/6_Torino/wg11/JCTVC-F803-v8.zip, the entire content of which is incorporated herein by reference. Another draft of the upcoming HEVC standard, referred to as "HEVC Working Draft 6" is described in Bross et al., "High Efficiency Video Coding (HEVC) text specification draft 6," Joint Collaborative Team on Video Coding (JCT-VC) of ITU-T SG16 WP3 and ISO/IEC JTC1/SC29/WG11, $8^{th}$ Meeting, San Jose, Calif., February, 2012, which as of Mar. 13, 2013, is available from http://phenix.int-evey.fr/jct/doc_end_user/documents/8_San %20Jose/wg11/JCTVC-H1003-v22.zip, the entire content of which is incorporated herein by reference. Another draft of the upcoming HEVC standard, referred to as "HEVC Working Draft 9," is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, China, October, 2012, which, as of Mar. 13, 2013, is downloadable from http://phenix.int-evey.fr/jct/doc_end_user/documents/11_Shanghai/wg11/JCTVC-K1003-v8.zip, the entire content of which is incorporated herein by reference.

Furthermore, there are ongoing efforts to produce a 3DV extension for HEVC. The 3DV extension of HEVC may be referred to as HEVC-based 3DV or HEVC-3DV. The HEVC-based 3DV codec in MPEG is based on solutions proposed in Schwarz et al., "Description of 3D Video Technology Proposal by Fraunhofer HHI (HEVC compatible; configuration A)", ISO/IEC JTC1/SC29/WG11MPEG2011/m22570, Geneva, Switzerland, November 2011 (hereinafter, "document m22570"), the entire content of which is incorporated herein by reference, and Wegner et al., "Poznan University of Technology tools for 3DV coding integrated into 3D-HTM", ISO/IEC JTC1/SC29/WG11MPEG2011/m23783, San Jose, USA, February 2012 (hereinafter, "document m23783"), the entire content of which is incorporated herein by reference. A reference software description is available as Schwarz et al., "Test Model under Consideration for HEVC based 3D video coding", ISO/IEC JTC1/SC29/WG11 MPEG2011/N12559, San Jose, USA, February 2012, the entire content of which is incorporated herein by reference. The reference software is available, as of Mar. 13, 2013, from https://hevc.hhi.fraunhofer.de/svn/svn_3DVCSoftware/trunk. Although the techniques of this disclosure are described with respect to H.264/AVC and HEVC, such techniques may be applied to other coding standards and are not limited to any particular coding standard or technique.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

A video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may divide the sample arrays of the picture into equally-sized blocks. For example, in H.264/AVC, video encoder 20 may divide the picture into macroblocks (MBs). An MB is a 16×16 block of luma samples and two corresponding blocks of chroma samples of a picture that has three sample arrays, or a 16×16 block of samples of a monochrome picture or a picture that is coded using three separate color planes. In H.264/AVC, a slice may include an integer number of MBs or MB pairs ordered consecutively in the raster scan within a particular slice group.

Video encoder 20 may partition an MB into a set of one or more MB partitions. An MB partition is a block of luma samples and two corresponding blocks of chroma samples resulting from a partitioning of an MB for inter prediction for a picture that has three sample arrays, or a block of luma samples resulting from a partitioning of an MB for inter prediction of a monochrome picture or a picture that is coded using three separate color planes. In some instances, video encoder 20 may partition an MB into sub-MBs. Each sub-MB is one quarter of the samples of an MB, i.e., an 8×8 luma block and two corresponding chroma blocks of which one corner is located at a corner of the MB for a picture that has three sample arrays or an 8×8 luma block of which one corner is located at a corner of the MB for a monochrome picture or a picture that is encoded using three separate color planes. A sub-MB partition is a block of luma samples and two corresponding blocks of chroma samples resulting from a partitioning of a sub-MB for inter prediction for a picture that has three sample arrays or a block of luma samples resulting from a partitioning of a sub-MB for inter prediction for a monochrome picture or a picture that is coded using three separate color planes. The luma and chroma blocks of an MB or MB partition may be referred to generically as the sample blocks of the MB or MB partition.

In HEVC, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "largest coding unit" (LCU). In HEVC, a slice may comprise an integer number of CTUs. The CTUs of HEVC may be broadly analogous to the MBs of other standards, such as H.264/AVC. However, a CTU is not necessarily limited to a particular size and may include one or more coding units (CUs). A CU may be a coding block of luma samples and two corresponding coding blocks of chroma samples of a picture that has a luma sample array, a Cb sample array and a Cr sample array, and syntax structures used to code the samples of the coding blocks. A coding block is an N×N block of samples.

Furthermore, in HEVC, a CU may have one or more prediction units (PUs). A PU may be a prediction block of luma samples, two corresponding prediction blocks of chroma samples of a picture, and syntax structures used to predict the prediction block samples. A prediction block may be a rectangular (e.g., M×N) block of samples on which the same prediction is applied. A prediction block of a PU of a CU may be a partition of a coding block of the CU. The luma and chroma blocks of a PU may be referred to generically as the sample blocks of the PU.

When video encoder 20 encodes a current video unit (such as an MB, MB partition, PU, etc.), video encoder 20 may generate predictive luma and chroma blocks for the current video unit. Video encoder 20 may perform intra prediction or inter prediction to generate the predictive blocks. When video encoder 20 performs intra prediction, video encoder 20 may generate, based at least in part on samples within the same picture as the current video unit, predictive luma and chroma blocks for the current video unit.

When video encoder 20 performs inter prediction to generate predictive luma and chroma blocks for the current video unit, video encoder 20 may generate the predictive blocks based on reference blocks within one or more reference pictures. The reference pictures may be pictures other than the picture that contains the current video unit. More specifically, video encoder 20 may generate a first reference picture list (RefPicList0) and a second reference picture list (RefPicList1). RefPicList0 and RefPicList1 are lists of reference pictures. If video encoder 20 uses uni-directional inter prediction to encode the current video unit, video encoder 20 may signal a reference index that indicates a position within either RefPicList0 or RefPicList1 of a reference picture that includes a reference block. Video encoder 20 may also signal a motion vector that indicates a spatial displacement between the luma block of the current video unit and the reference block. If video encoder 20 uses bi-directional inter prediction, video encoder 20 may signal two reference indices that indicate positions within RefPicList0 and RefPicList1 of reference pictures that contain reference blocks. Video encoder 20 may also signal motion vectors that indicate spatial displacements between the luma block of the current video unit and the reference blocks.

In H.264/AVC, each inter MB (i.e., each MB that is encoded using inter prediction) may be partitioned in one of four different ways: one 16×16 MB partition, two 16×8 MB partitions, two 8×16 MB partitions, or four 8×8 MB partitions. Different MB partitions in one block may have different reference indices for each direction (RefPicList0 or RefPicList1). When an MB is not partitioned into four 8×8 MB partitions, the MB has only one motion vector for the whole MB partition in each direction. In this case, a MB partition can have a size of 16×16, 8×16 or 16×8. When an MB is partitioned into four 8×8 MB partitions, each 8×8 MB partition can be further partitioned into sub-blocks, each of which can have a different motion vector in each direction. There are four different ways to partition an 8×8 MB partition into sub-blocks: one 8×8 sub-block, two 8×4 sub-blocks, two 4×8 sub-blocks, and four 4×4 sub-blocks. Each of the sub-blocks may have a different motion vector in each direction.

In H.264/AVC, video encoder 20 may signal a motion vector for a current video unit (e.g., an MB or MB partition) by signaling a motion vector difference (MVD). An MVD indicates a difference between a motion vector predictor and a motion vector for the current video unit. The motion vector predictor may be a motion vector of a neighboring block. The neighboring block may be above or to the left of the sample blocks of the current video unit. If a neighboring block is not available for use in generating the motion vector predictor, the horizontal and vertical components of the motion vector predictor may be equal to 0. Among other reasons, a neighboring block may not be available if the neighboring block and the current block are in different slices, the neighboring block is not within the boundary of the current picture, and so on.

Furthermore, in H.264/AVC, video encoder 20 may generate an MB layer syntax structure that includes syntax elements for an MB. The MB layer syntax structure may include an MB prediction syntax structure or a sub-MB prediction syntax structure, depending on a partitioning mode of the MB. The MB prediction syntax structure or the sub-MB prediction syntax structure may include syntax elements that indicate the motion information for the MB or motion information for MB partitions of the MB. For instance, MB prediction syntax structures and sub-MB prediction syntax structures may include syntax elements that specify reference indices and MVDs.

Furthermore, in HEVC, when video encoder 20 uses inter prediction to generate predictive blocks for a current PU, video encoder 20 may signal motion information for the current PU using a merge mode or an Adaptive Motion Vector Prediction (AMVP) mode. In either merge mode or AMVP mode, video encoder 20 may generate a list of predictor candidates (i.e., a candidate list). The predictor candidates may specify the motion information of PUs other than the current PU. In merge mode, video encoder 20 may signal a position within the candidate list of a selected predictor candidate. The motion information of the PU may be the same as the motion information specified by the selected predictor candidate. In AMVP mode, video encoder 20 may signal a position within the candidate list of a selected predictor candidate, a reference index, and a MVD for the current PU. The MVD for the current PU may be based on a difference between a motion vector of the selected predictor candidate and a motion vector of the current PU.

After video encoder 20 generates a predictive block that corresponds to a current video unit (such as an MB, MB partition, PU, etc.), video encoder 20 may generate a residual block. Each sample in the residual block may be based on a difference between corresponding samples in a sample block of the current video unit and the predictive block. Video encoder 20 may apply a transform to the residual block to generate one or more transform coefficient blocks. Video encoder 20 may quantize the transform coefficient blocks to further reduce the number of bits used to represent the current video unit. After quantizing a transform coefficient block, video encoder 20 may entropy encode syntax elements that represent transform coefficients in the transform coefficient block and other syntax elements. For example, video encoder 20 may perform context-adaptive binary arithmetic coding (CABAC), context-adaptive variable length coding (CAVLC), exponential-Golomb coding, or another type of entropy encoding on the syntax elements. Video encoder 20 may output a bitstream that includes the entropy-encoded syntax elements.

To apply CABAC encoding to a syntax element, video encoder 20 may binarize the syntax element to form a series of one or more bits, which are referred to as "bins." In addition, video encoder 20 may identify a coding context. The coding context may identify probabilities of coding bins having particular values. For instance, a coding context may indicate a 0.7 probability of coding a 0-valued bin and a 0.3 probability of coding a 1-valued bin. After identifying the coding context, video encoder 20 may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, video encoder 20 may repeat these steps with the interval being the sub-interval associated with the value of the encoded bit. When video encoder 20 repeats these steps for the next bin, video encoder 20 may use modified probabilities based on the probabilities indicated by the identified coding context and the actual values of bins encoded.

Video encoder 20 may output a bitstream that includes the entropy-encoded syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for supplemental enhancement information (SEI), and so on. NAL units that encapsulate RBSPs for video coding data (as opposed to RBSPs for parameter sets and SEI messages) may be referred to as video coding layer (VCL) NAL units.

Video decoder 30 may receive a bitstream that includes an encoded representation of video data. Video decoder 30 may parse the bitstream to decode syntax elements of the bitstream. As part of decoding the syntax elements of the bitstream, video decoder 30 may entropy decode syntax elements of the bitstream. For example, video decoder 30 may perform CABAC decoding on at least some syntax elements. Video decoder 30 may perform, based at least in part on the syntax elements associated with a current video unit (such as an MB, MB partition, PU, etc.), inter or intra prediction to generate predictive blocks for the current video unit. In addition, video decoder 30 may inverse quantize transform coefficients of transform coefficient blocks associated with the current video unit and may apply one or more inverse transforms to the transform coefficient blocks to generate a residual block. Video decoder 30 may reconstruct a sample block for the current video unit block based at least in part on the residual block and the predictive block. In this way, by reconstructing blocks of a picture, video decoder 30 may reconstruct the picture.

When video decoder 30 performs CABAC decoding on a syntax element, video decoder 30 may identify a coding context. Video decoder 30 may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, video decoder 30 may decode a bin having the value associated with the lower sub-interval. If the encoded value is within the upper sub-interval, video decoder 30 may decode a bin having the value associated with the upper sub-interval. To decode a next bin of the syntax element, video decoder 30 may repeat these steps with the interval being the sub-interval that contains the encoded value. When video decoder 30 repeats these steps for the next bin, video decoder 30 may use modified probabilities based on the probabilities indicated by the identified coding context and the decoded bins. Video decoder 30 may then de-binarize the bins to recover the syntax element.

As mentioned above, Multiview Video Coding (MVC) is an extension of the H.264/AVC standard. In the MVC extension to H.264/AVC, there may be multiple views of the same scene from different viewpoints. The term "access unit" is used to refer to the set of pictures that correspond to the same time instance. Thus, video data may be conceptualized as a series of access units occurring over time. A "view component" may be a coded representation of a view in a single access unit. In this disclosure, a "view" may refer to a sequence of view components associated with the same view identifier.

The MVC extension of H.264/AVC supports inter-view prediction. Inter-view prediction is similar to the inter prediction used in H.264/AVC and may use the same syntax elements. However, when a video coder performs inter-view prediction on a current video unit (such as an MB or MB partition), video encoder 20 may use, as a reference picture, a picture that is in the same access unit as the current video unit, but in a different view. In contrast, conventional inter prediction only uses pictures in different access units as reference pictures.

In MVC, a view may be referred to as a "base view" if a video decoder (e.g., video decoder 30) can decode pictures in the view without reference to pictures in any other view. When coding a picture in one of the non-base views, a video coder (such as video encoder 20 or video decoder 30) may add a picture into a reference picture list if the picture is in a different view but within a same time instance (i.e. access unit) as the picture that the video coder is currently coding. Like other inter prediction reference pictures, the video coder may insert an inter-view prediction reference picture at any position of a reference picture list.

In MVC, inter-view prediction may be supported by disparity motion compensation. Disparity motion compensation uses the syntax of H.264/AVC motion compensation, but may allow a picture in a different view to be used as a reference picture. Coding of two or more views may be supported by MVC. One of the advantages of MVC may be that an MVC encoder may use more than two views as a 3D video input and an MVC decoder may decode such a multiview representation. As a result, video decoders that support MVC may process 3D video content with more than two views.

Furthermore, there is an emerging MVC-based 3DV extension to H.264/AVC. MVC-based 3DV is designed to enable 3D enhancements while maintaining MVC compatibility. MVC-based 3DV provides for depth maps. Accordingly, MVC-based 3DV may also be referred to as "MVC plus depth," "MVC+D," or as the "MVC-compatible extension including depth." Suzuki et al., "WD of MVC extensions for inclusion of depth maps," ISO/IEC/JTC1/SC29/WG11/N12351, December 2011, the entire content of which is incorporated herein by reference, is a draft of MVC-compatible 3DV. Suzuki et al., "WD od MVC extensions for inclusion of depth maps," ISO/IEC/JTC1/SC29/WG11/N12544, February 2012, the entire content of which is incorporated herein by reference, is a later draft of MVC-compatible 3DV.

Depth maps are pictures whose pixel (e.g., sample) values represent the three-dimensional depths of objects shown in corresponding "texture" pictures. In some examples, brighter pixel values in a depth map may correspond to objects that are closer to a camera and darker pixel values in a depth map may correspond to objects that are further from the camera. The "texture" pictures may be normal H.264/AVC pictures.

In this disclosure, the texture part of a view may be referred to as a "texture view" and the depth part of a view may be referred to as a "depth view." The texture part of a view in one access unit, i.e., a texture view in an access unit, may be referred to as a "texture view component." The depth part of a view in one access unit, i.e., a depth view in an access unit, may be referred to as a "depth view component." Thus, the term "view component" may refer to a view in one access unit and collectively to both the texture view component and the depth view component of the same access unit.

As mentioned above, there is an ongoing effort to generate a 3DV extension to H.264/AVC, namely AVC-based 3DV. Like MVC-based 3DV, AVC-based 3DV provides for depth maps. In AVC-based 3DV, video encoder 20 may encode a depth map in the same manner as other views of an access unit. In contrast to MVC-based 3DV, AVC-based 3DV may allow a depth view component to be encoded based on a texture view component. This may increase coding efficiency, but may increase complexity. AVC-based 3DV may not be compatible with MVC.

In AVC-based 3DV, video encoder 20 may generate, based on available texture and depth view components, a synthetic texture view component. That is, in-loop view synthesis prediction (VSP) is supported in AVC-based 3DV (and other video coding standards) for enhanced texture coding. A synthetic texture view component may be a texture view component that is synthesized based on a depth map and one or more texture view components. That is, to enable VSP for coding of a current view, the previously-coded texture and depth view components of the same access unit may be used for view synthesis.

For example, a particular texture view component may be a left-eye texture view component and video encoder 20 may generate a right-eye texture view component for 3DV playback. In some instances, a synthetic texture view component may be used as a reference picture for inter-access unit prediction or inter-view prediction. Accordingly, a synthesized picture resulting from VSP may be included in the initial reference picture lists (i.e., RefPicList 0 and/or RefPicList 1) following temporal and inter-view reference frames. Synthetic texture view components that are used as reference pictures may be referred to as view synthesis reference pictures (VSRPs), view synthesis prediction (VSP) reference pictures, or simply VSP pictures.

In some test models for AVC-based 3DV, VSP is realized by adding the synthesized picture into a reference picture list, such as RefPicList0 or RefPicList1. There are several potential problems with this approach. For example, motion vectors to VSP reference pictures are typically very close to zero. That is, motion vectors to reference blocks within VSP pictures almost always have magnitudes of zero. However, the approach of such test models may make the context for motion vector differences less efficient. For example, the motion vector for a VSP block is typically 0, however, if the neighboring blocks are predicted with temporal pictures, the motion vector prediction may be derived to be not close to 0, therefore, an unnecessary motion vector difference may need to be signaled, or otherwise, the motion vector predictor is not sufficient enough.

In accordance with some techniques of this disclosure, video encoder 20 may signal, in a bitstream, a syntax element that indicates whether a current video unit is predicted from a VSP picture. In some examples, the current video unit may be MB, an MB partition, or another type of unit. In examples where H.264/AVC is used, signaling of the VSP mode is introduced at the MB or MB partition level to indicate whether an MB or an MB partition is predicted from a VSP picture. The VSP mode of a video unit (e.g., an MB or MB partition) indicates whether the video unit is predicted from a VSP picture.

In some examples, when the current video unit is predicted from a VSP picture, video encoder 20 does not signal motion information for the current video unit. In examples where H.264/AVC is used, the motion information for the current video unit may include one or more reference indices and one or more MVDs. In examples where HEVC is used, the motion information for the current video unit may include one or more reference indices, one or more motion vector candidate indices, one or more MVDs, and a prediction direction indicator.

Furthermore, when the current video unit is predicted from a VSP picture, video encoder 20 may generate, based at least in part on a block of the VSP picture that is co-located with the sample blocks of the current video unit, a predictive block for the current video unit. Video encoder 20 may generate a residual block for the current video unit. The residual block may indicate differences between a sample block of the current video unit and the predictive block for the current video unit. Video encoder 20 may transform, quantize, and entropy encode samples of the residual block.

Video decoder 30 may decode, from the bitstream the syntax element and determine, based at least in part on syntax element, whether the current video unit is predicted from a VSP picture. When the current video unit is predicted from a VSP picture, video decoder 30 may generate, based at least in part on a block of the VSP picture that is co-located with the current video unit, a predictive block for the current video unit. Video decoder 30 may generate the predictive block for the current video unit without decoding, from the bitstream, motion information for the current video unit.

Thus, in accordance with the techniques of this disclosure, a video coder may generate a predictive block for a current video unit (e.g., an MB or MB partition) such that the predictive block matches a co-located block in a VSP picture. In other words, when the current video unit is predicted from a VSP picture, the video coder copies a co-located block of the current video unit from the VSP picture.

Because video decoder 30 may be able to generate a predictive block for the current video unit without decoding motion information for the current video unit when the current video unit is predicted from the VSP picture, it may be unnecessary to include the VSP picture in a reference picture list. Hence, in accordance with the techniques of this disclosure, instead of adding a VSP picture into a reference picture list, a video coder (such as video encoder 20 or video decoder 30) does not add the VSP picture into the reference picture list.

Furthermore, in accordance with the techniques of this disclosure, a video coder may select, based at least in part on information associated with a neighboring block (e.g. a neighboring MB or MB partition), a coding context for entropy coding motion information of a current video unit (e.g., a current MB or MB partition). When a neighboring block (e.g., a neighboring MB or MB partition) is predicted from a VSP picture, the video coder may determine the information associated with the neighboring block to be unavailable for use in selecting a coding context for entropy coding the motion information of the current video unit. For instance, when constructing an entropy coding context for entropy coding the motion information of a particular MB or a particular MB partition, an MB or MB partition that uses a VSP picture is considered to be unavailable for use in selection of the entropy coding context. When the video coder determines that the information associated with a neighboring block is unavailable for use in selecting a coding context, the video coder does not use information associated with the neighboring block to select the coding context. Hence, a block (e.g., an MB or an MB partition) that uses a VSP picture may have no impact on the entropy coding context for the syntax elements related to motion for the current video unit.

As indicated above, video encoder 20 may signal syntax elements that indicate whether video units, such as MBs, MB partitions, sub-MB partitions, etc., are predicted from a VSP picture. For example, video encoder 20 may generate a syntax element that indicates whether an MB is predicted from a VSP picture, video encoder 20 may generate a syntax element that indicates whether an MB partition is predicted from a VSP picture, and may generate a syntax element that indicates whether a sub-MB partition is predicted from a VSP picture. In accordance with the techniques of this disclosure, a video coder may use the same or different coding contexts when entropy coding the syntax elements that indicate whether MBs, MB partitions, and sub-MB partitions are predicted from VSP pictures. For instance, the introduced MB or MB partition-level syntax elements that indicate the VSP mode may share the same or different contexts for entropy coding.

Video decoder 30 may predict (i.e., determine), based on a motion vector predictor and a MVD, a motion vector for a current video unit. In H.264/AVC, the motion vector predictor may be derived from a motion vector of a neighboring block (e.g., a neighboring MB, MB partition, or sub-MB partition) when the neighboring block is available. In accordance with the techniques of this disclosure, when a video coder predicts a motion vector for a current video unit, a block (e.g., an MB or MB partition) which is predicted from a VSP picture may be considered as unavailable.

In H.264/AVC and its extensions, video encoder 20 may generate a slice header syntax structure for a slice and a slice data syntax structure for the slice. As indicated above, a slice may include an integer number of MBs. The slice data syntax structure for a slice may include MB layer syntax structures for the MBs of the slice. The MB layer syntax structure for an MB may include syntax elements for the MB. In some versions of the AVC-based 3DV test model (3D-ATM), a slice data syntax structure for a slice may include mb_skip_flag syntax elements for MBs of the slice. When the slice is a P slice or a SP slice, the mb_skip_flag syntax element for an MB indicates whether the MB is encoded in P_Skip mode. When the slice is a B slice, the mb_skip_flag syntax element for an MB indicates whether the MB is encoded in B_Skip mode. For example, if the mb_skip_flag syntax element for an MB is equal to 1 and the slice is a P or SP slice, video decoder 30 may infer that the mb_type for the MB is P_Skip (and the MB type is collectively referred to as P MB type). If the mb_skip_flag syntax element is equal to 1 and the slice is a B slice, video decoder 30 may infer that the mb_type for the MB is B_Skip (and the MB type is collectively referred to as B MB type). In this example, if the mb_skip_flag for an MB is equal to 0, the MB is not skipped.

When an MB is encoded in P_Skip mode, video decoder 30 may derive predictive luma and chroma blocks for the MB such that the predictive luma and chroma blocks of the MB match the luma and chroma blocks of a co-located MB in a reference picture. Hence, when an MB is encoded in P_Skip mode, an MB layer syntax structure for the MB may include a reference index that identifies a location, within RefPicList0 or RefPicList1, of the reference picture. Similarly, when an MB is encoded in B_Skip mode, video decoder 30 may derive the predictive luma and chroma blocks of the MB from co-located MBs of two reference pictures. When the MB is encoded in B_Skip mode, the MB layer syntax structure for the MB may include reference indices that identify locations, within RefPicList 0 and RefPicList 1, of the reference pictures. When the MB is encoded in P_Skip mode or B_Skip mode, the MB layer syntax structure for the MB does not need to include other syntax elements, such as syntax elements specifying motion information, transform coefficient levels, etc.

Furthermore, in some versions of the 3D-ATM, the slice data syntax structure for a slice may include a VSP skip syntax element that indicates whether a current MB is skipped from a VSP picture. In other words, the VSP skip syntax element may indicate that the predictive luma and chroma blocks for the current MB match co-located luma and chroma blocks of the VSP picture. When the VSP skip syntax element indicates that the current MB is skipped from a VSP picture, the current MB is always uni-directionally predicted from the VSP picture. The VSP skip syntax element and the mb_skip_flag syntax element may be signaled together and may be entropy encoded based on a context that is based on MBs above and to the left of the current MB.

The mb_skip_flag syntax element and the skip_from_vsp_flag syntax element may be signaled in a relatively complicated way. This disclosure may refer to this issue as the skip mode signaling complexity issue. Furthermore, in some of the techniques describe above, only one VSP picture is available for the whole view component or slice. Some such techniques may support only uni-directional prediction from a VSP picture and prediction from multiple VSP pictures is not supported. This disclosure may refer to this issue as the uni-directional VSP skip mode issue. Additional techniques of this disclosure may address these issues. These additional techniques may or may not work together for a complete solution.

In an example technique for addressing the skip mode signaling complexity issue, when only one VSP picture is available, the mb_skip flag syntax element and the flag indicating skipping from a VSP picture (e.g., the VSP skip syntax element) are combined into a single syntax element. This combined single syntax element may be referred to herein as the mb_skip_idc syntax element. Furthermore, the context of values of the mb_skip_idc syntax element for neighboring blocks can be used to predict the mb_skip_idc syntax element for a current MB.

A first example technique for addressing the uni-directional VSP skip mode issue is applicable when at least one predictor (i.e., reference picture) for an MB is a VSP picture and there is only one VSP picture available for each prediction direction. In this example, the mb_part_vsp_flag syntax element and the sub_mb_vsp_flag syntax element are extended to both directions in order to indicate whether a given prediction direction of an MB partition is predicted from a VSP or not. As indicated above, the mb_part_vsp_flag syntax element of an MB prediction syntax structure indicates whether a current MB partition is predicted from a VSP picture. The sub_mb_vsp_flag syntax element of a sub-MB prediction syntax structure indicates whether a current MB partition is predicted from a VSP picture.

A second example technique for addressing the uni-directional VSP skip mode issue is applicable when at least one predictor (i.e., reference picture) for an MB is a VSP picture and there is only one VSP picture available for each prediction direction. In this example, the VSP picture remains in a reference picture list (e.g., RefPicList0 or RefPicList1). When a reference index (e.g., a ref_idx syntax element) of an MB or a sub-MB corresponds to the VSP picture, bi-directional prediction automatically is from a VSP picture. Similar to other techniques of this disclosure, however, the motion vectors corresponding to such a ref_idx (assuming that ref_idx belongs to RefPicListX) are not signaled, and the motion information associated to RefPicListX of the MB partition is considered as unavailable. This may apply to uni-directional prediction as well.

In another example technique that addresses the uni-directional VSP skip mode issue, multiple VSP pictures are supported. In this example, when any flag indicates that VSP is used, a further index can be signaled. Alternatively, a direct indication is given, which takes all the possible VSP pictures and the normal skip picture into consideration and signals them jointly with one syntax element.

Although the techniques of this disclosure have been described above largely with reference to H.264/AVC, the techniques of this disclosure may also be applicable to HEVC, and specifically the 3DV extension of HEVC. In the 3DV extension of HEVC, as proposed in document m23783, some regions of a synthesized image (e.g., a VSP picture) are not available because the regions were occluded in the other views (i.e., the views from which the VSP picture was synthesized). Such regions of the VSP picture may be referred to as disoccluded regions because the regions were hidden (i.e., occluded) in the other views. The disoccluded regions are identified and marked on a binary map, namely an availability map, which controls coding and decoding processes. The video coder and video decoder may both use the availability map to determine whether a given CU is coded or not. However, observations have shown that the coding performance of such a technique is less than optimal. Hence, there lacks an efficient VSP mechanism in HEVC-based 3DV, mainly due to the following problems. First, view synthesis as a mode can only be helpful for some regions. Second, view synthesis mode is not well integrated into the whole HEVC design.

The techniques of this disclosure may provide a solution for VPS support in HEVC-based 3DV. In accordance with one or more techniques of this disclosure, video encoder 20 may signal a flag in a CU level to indicate whether a current CU is coded with VSP (is predicted from a VSP picture). When a current CU is coded with VSP (i.e., the current CU is a VSP CU), the residual of the VSP CU can be signaled in the same manner as other modes.

Furthermore, in some examples, video encoder 20 may signal, for each PU, a syntax element (e.g., a flag) that indicates whether the PU is predicted from a VSP. In such examples, a video coder may predict (i.e., generate a predictive block for) one PU in the CU with a VSP while the video coder may predict another PU of the CU with other modes, such as normal Inter or Intra. Furthermore, in such examples, when the video coder is constructing an coding context for entropy coding the motion information of a PU, the video coder may use the same or different context models for a CU level flag (i.e., a syntax element that indicates whether all PUs of a CU are predicted from the VSP picture) and a PU level flag (i.e., a syntax element that indicates whether a single PU is predicted from the VSP picture).

When a video coder generates a predictive block for a CU or a PU from a VSP picture, the video coder may copy the co-located block of the CU or PU from the VSP picture. In other words, a predictive block for a CU or a PU may match a co-located block of the VSP picture.

As described above, video encoder 20 may use merge mode or AMVP mode to signal the motion information of a current PU. In either merge mode or AMVP mode, video encoder 20 may generate a list of predictor candidates (i.e., a candidate list). The predictor candidates may specify the motion information of PUs other than the current PU. When one of the other PUs is not available, video encoder 20 does not include a predictor candidate that specifies the motion information of the other PU. In accordance with the techniques of this disclosure, when a video coder checks a neighboring PU/CU for availability during motion vector prediction, the video coder may consider a PU/CU that is predicted from a VSP picture (i.e., a VSP PU/CU) to be unavailable.

Figure 2:
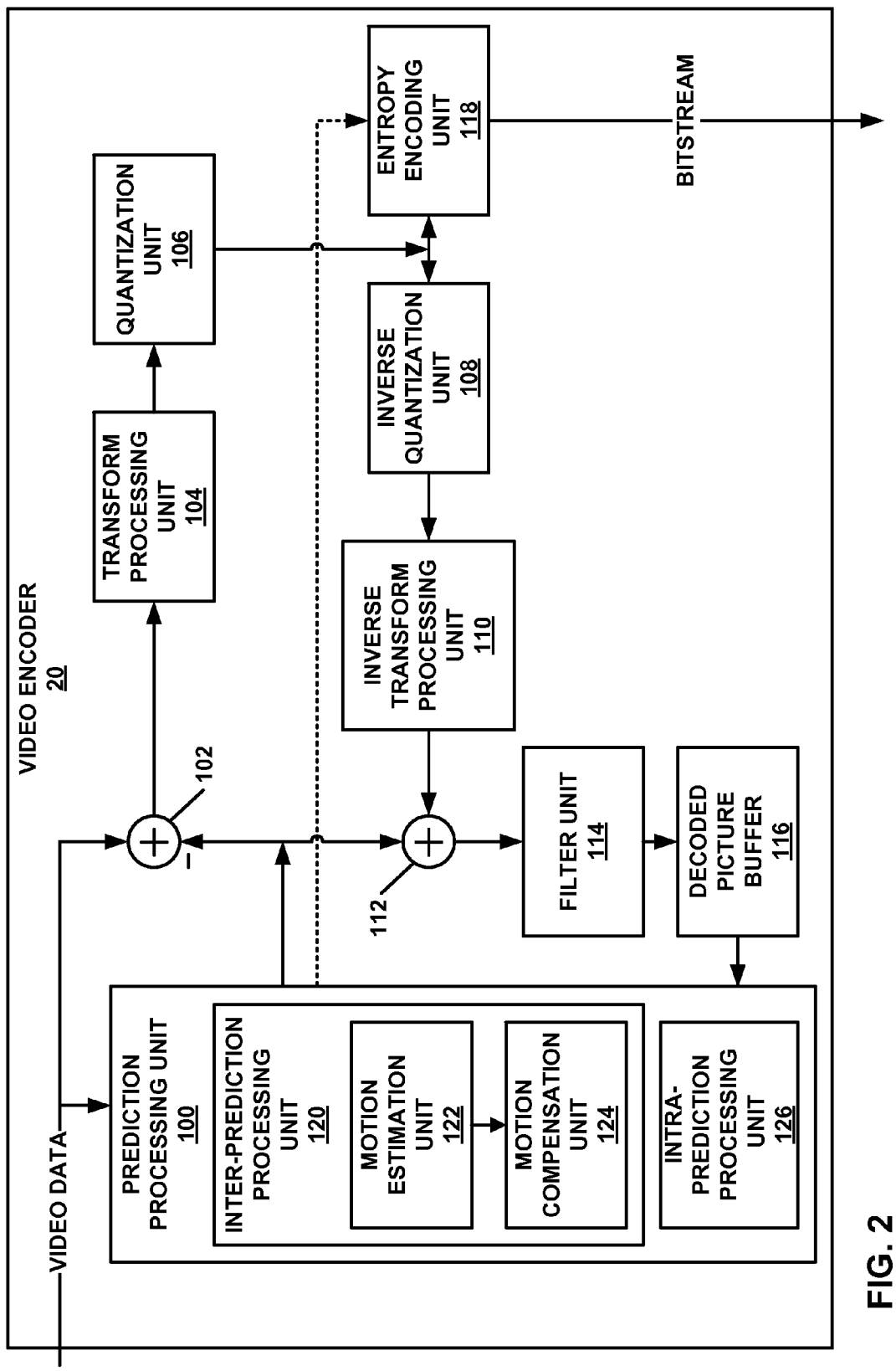
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure primarily describes video encoder 20 in the context of H.264/AVC coding. However, the techniques of this disclosure may be applicable to other coding standards or methods, such as HEVC.

In the example of FIG. 2, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 receives video data. To encode the video data, video encoder 20 may encode each MB of each picture of the video data. To encode an MB, prediction processing unit 100 may select a partitioning mode for the MB. Video encoder 20 may signal the partitioning mode for the MB using an mb_type syntax element in an MB layer syntax structure for the MB. The partitioning mode for the MB may indicate how the luma and chroma blocks of the MB are partitioned into luma and chroma blocks of MB partitions of the MB.

A slice may include an integer number of MBs. Furthermore, slices may be I slices, P slices, SP slices, SI slices, or B slices. If an MB is an I slice, all MB partitions of the MB are intra predicted. Hence, if the MB is in an I slice, motion estimation unit 122 and motion compensation unit 124 do not perform inter prediction on the MB. An SP slice is a slice that may be coded using intra prediction or inter prediction with quantization of the prediction samples using at most one motion vector and reference index to predict the sample values of each block. An SP slice can be coded such that its decoded samples can be constructed identically to another SP slice or an SI slice. An SI slice is a slice that is coded using intra prediction only and using quantization of the prediction samples. An SI slice can be coded such that its decoded samples can be constructed identically to an SP slice.

Inter-prediction processing unit 120 may perform a reference picture list construction process at the beginning of coding each P, SP, or B slice. If inter-prediction processing unit 120 is coding a P or SP slice, inter-prediction processing unit 120 may generate a first reference picture list (e.g., RefPicList0). If inter-prediction processing unit 120 is coding a B slice, inter-prediction processing unit 120 may generate the first reference picture list (e.g., RefPicList0) and also generate a second reference picture list (e.g., RefPicList1).

If video encoder 20 is coding a current video unit (e.g., an MB or MB partition) in a P slice, motion estimation unit 122 may search the reference pictures in a reference picture list (e.g., RefPicList0) for a reference block for the current video unit. In examples where video encoder 20 uses MVC-compatible 3DV or AVC-compatible 3DV, the reference picture list may include inter-view reference pictures. In examples where video encoder 20 uses AVC-compatible 3DV, the inter-view reference pictures in the reference picture list may include reference pictures synthesized based on a depth map. The reference block of the current video unit may be a block of luma samples and two corresponding blocks of chroma samples that most closely correspond to the luma and chroma blocks of the current video unit.

Motion estimation unit 122 may generate a reference index that indicates the reference picture in RefPicList0 containing a reference block of a current video unit in a P slice and a motion vector that indicates a spatial displacement between a luma sample block of the current video unit and the reference block. The motion information of the current video unit may include the current video unit's reference index and the current video unit's motion vector. Motion compensation unit 124 may generate the predictive blocks for the current video unit based on the reference block indicated by the motion information of the current video unit.

If the current video unit is in a B slice, motion estimation unit 122 may perform uni-directional inter prediction or bi-directional inter prediction for the current video unit. To perform uni-directional inter prediction for the current video unit, motion estimation unit 122 may search the reference pictures of RefPicList0 or a second reference picture list (e.g., RefPicList1) for a reference block for the current video unit. In examples where video encoder 20 uses MVC or 3DV, RefPicList0 and/or RefPicList1 may include inter-view reference pictures. Motion estimation unit 122 may generate a reference index that indicates a position in RefPicList0 or RefPicList1 of the reference picture that contains the reference block and a motion vector that indicates a spatial displacement between the sample blocks of the current video unit and the reference block. Motion estimation unit 122 may also generate a prediction direction indicator that indicates whether the reference picture is in RefPicList0 or RefPicList1.

To perform bi-directional inter prediction for a current video unit, motion estimation unit 122 may search the reference pictures in RefPicList0 for a reference block for the current video unit and may also search the reference pictures in RefPicList1 for another reference block for the current video unit. Motion estimation unit 122 may generate picture indices that indicate positions in RefPicList0 and RefPicList1 of the reference pictures that contain the reference blocks. In addition, motion estimation unit 122 may determine motion vectors that indicate spatial displacements between the reference blocks and the luma block of the current video unit. The motion information of the current video unit may include the reference indices and the motion vectors of the current video unit. Motion compensation unit 124 may generate the predictive blocks for the current video unit based on the reference blocks indicated by the motion information of the current video unit.

Intra-prediction processing unit 126 may generate predictive data for a current video unit by performing intra prediction on the current video unit. The predictive data for the current video unit may include predictive blocks for the current video unit and various syntax elements. Intra-prediction processing unit 126 may perform intra prediction on video units in I slices, P slices, and B slices.

Prediction processing unit 100 may select the predictive data for a current video unit from among the predictive data generated by inter-prediction processing unit 120 for the current video unit or the predictive data generated by intra-prediction processing unit 126 for the current video unit. In some examples, prediction processing unit 100 selects the predictive data for the current video unit based on rate/distortion metrics of the sets of predictive data.

Residual generation unit 102 may generate residual blocks by subtracting samples in predictive blocks for the current video unit from corresponding samples of the sample blocks of the current video unit. Transform processing unit 104 may generate transform coefficient blocks for each residual block by applying one or more transforms to the residual block. Transform processing unit 104 may apply various transforms to a residual block. For example, transform processing unit 104 may apply a discrete cosine transform (DCT), a directional transform, an integer transform, a wavelet transform, or a conceptually similar transform to a residual block.

Quantization unit 106 may quantize the transform coefficients in a transform coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a transform coefficient block based on a quantization parameter (QP) value. Video encoder 20 may adjust the degree of quantization applied to transform coefficient blocks by adjusting the QP value.

Inverse quantization unit 108 and inverse transform processing unit 110 may apply inverse quantization and inverse transforms to a transform coefficient block, respectively, to reconstruct a residual block from the transform coefficient block. Reconstruction unit 112 may add samples in reconstructed residual blocks to corresponding samples from one or more predictive blocks generated by prediction processing unit 100 to produce reconstructed blocks. Filter unit 114 may perform a deblocking operation to reduce blocking artifacts in the reconstructed blocks. Decoded picture buffer 116 may store the reconstructed blocks after filter unit 114 performs the one or more deblocking operations on the reconstructed blocks. Motion estimation unit 122 and motion compensation unit 124 may use a reference picture that contains the reconstructed blocks to perform inter prediction on video units of subsequent pictures. In addition, intra-prediction processing unit 126 may use reconstructed blocks in decoded picture buffer 116 to perform intra prediction.

Entropy encoding unit 118 may receive data from functional components of video encoder 20. For example, entropy encoding unit 118 may receive transform coefficient blocks from quantization unit 106 and may receive syntax elements from prediction processing unit 100. Entropy encoding unit 118 may perform one or more entropy encoding operations on the data to generate entropy-encoded data. For example, video encoder 20 may perform a CAVLC operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb coding operation, or another type of entropy encoding operation on the data.

Figure 3:
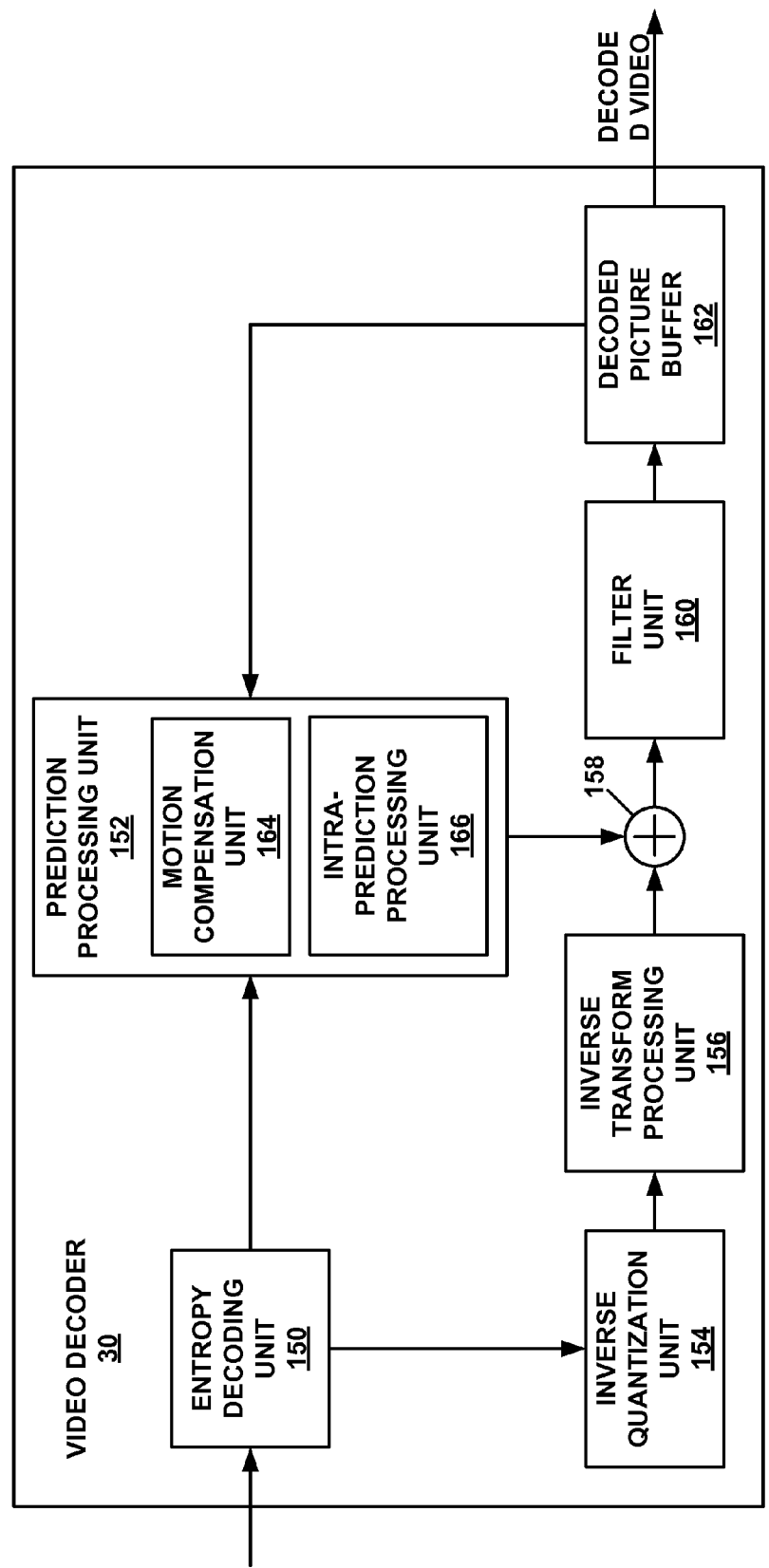
FIG. 3 is a block diagram illustrating an example video decoder that may implement the techniques described in this disclosure.

FIG. 3 is a block diagram illustrating an example video decoder 30 that may implement the techniques of this disclosure. FIG. 3 is provided for purposes of explanation and is not limiting on the techniques as broadly exemplified and described in this disclosure. For purposes of explanation, this disclosure describes video decoder 30 in the context of H.264/AVC coding. However, the techniques of this disclosure may be applicable to other coding standards or methods.

In the example of FIG. 3, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video decoder 30 may receive a bitstream. Entropy decoding unit 150 may parse the bitstream to decode syntax elements from the bitstream. As part of parsing the bitstream, entropy decoding unit 150 may entropy decode entropy-encoded syntax elements in the bitstream. Prediction processing unit 152, inverse quantization unit 154, inverse transform processing unit 156, reconstruction unit 158, and filter unit 160 may generate decoded video data (i.e., reconstruct the video data) based on the syntax elements decoded from the bitstream. The syntax elements decoded from the bitstream may include syntax elements that represent transform coefficient blocks.

Inverse quantization unit 154 may inverse quantize, i.e., de-quantize, transform coefficient blocks. Inverse quantization unit 154 may use a QP value to determine a degree of quantization and, likewise, a degree of inverse quantization for inverse quantization unit 154 to apply. After inverse quantization unit 154 inverse quantizes a transform coefficient block, inverse transform processing unit 156 may apply one or more inverse transforms to the transform coefficient block in order to generate a residual block. For example, inverse transform processing unit 156 may apply an inverse DCT, an inverse integer transform, an inverse Karhunen-Loeve transform (KLT), an inverse rotational transform, an inverse directional transform, or another inverse transform to the transform coefficient block.

If a current video unit is encoded using intra prediction, intra-prediction processing unit 166 may perform intra prediction to generate predictive blocks for the current video unit. For example, intra-prediction processing unit 166 may determine an intra prediction mode for the current video unit based on syntax elements in the bitstream. Intra-prediction processing unit 166 may use the intra prediction mode to generate the predictive blocks for the current video unit based on spatially-neighboring blocks.

Motion compensation unit 164 may construct a first reference picture list (RefPicList0) and a second reference picture list (RefPicList1) based on syntax elements decoded from the bitstream. In examples where the bitstream is encoded using MVC-compatible 3DV or AVC-based 3DV, RefPicList0 and/or RefPicList1 may include inter-view reference pictures. In examples where the bitstream is encoded using AVC-based 3DV, the inter-view reference pictures in RefPicList0 and/or RefPicList1 may include reference pictures synthesized based on depth maps. Furthermore, if the current video unit is encoded using inter prediction, entropy decoding unit 150 may decode motion information for the current video unit. Motion compensation unit 164 may determine, based on the motion information of the current video unit, one or more reference blocks for the current video unit. Motion compensation unit 164 may generate, based on the one or more reference blocks for the current video unit, predictive blocks for the current video unit.

Reconstruction unit 158 may reconstruct sample blocks of the current video unit based on the residual blocks for the current video unit and the predictive blocks for the current video unit. In particular, reconstruction unit 158 may add samples (e.g., luma or chroma components) of the residual blocks to corresponding samples of the predictive blocks to reconstruct the sample blocks of the current video unit.

Filter unit 160 may perform a deblocking operation to reduce blocking artifacts associated with the sample blocks of the current video unit. Filter unit 114 of video encoder 20 may perform a deblocking operation similar to the deblocking operation of filter unit 160, hence for conciseness this disclosure only describes the deblocking operation with regard to filter unit 160. When filter unit 160 performs the deblocking operation in H.264/AVC, filter unit 160 may perform a filtering process for block edges. Filter unit 160 may apply the filtering process to a set of eight samples across a 4×4 block horizontal or vertical edge. These samples may be referred to as the "input samples" and may be denoted as $p_i$ and $q_i$ with i=0..3 with the edge lying between $p_0$ and $q_0$. When filter unit 160 applies the filtering process to the set of samples, filter unit 160 may determine a boundary filtering strength value (bS). In addition, filter unit 160 may determine quantization parameters ($qP_p$, $qP_q$) for the blocks. Filter unit 160 may then perform a threshold derivation process based at least in part on the sample values, bS, filter offsets, $qP_p$ and $qP_q$. The threshold derivation process may return a value that indicates whether the input samples are filtered. The threshold derivation process may also return a value (indexA) and values of threshold variables α and β. Filter unit 160 may then perform an operation, based at least in part on bS, α, β and index A, a filter to the input samples.

As mentioned above, filter unit 160 may determine a boundary filtering strength value (bS). Filter unit 160 may determine bS based on a variety of different types of information. For example, filter unit 160 may determine bS based at least in part on prediction (e.g., inter or intra) modes of the blocks, reference indices of the blocks, whether the blocks are uni-directionally or bi-directionally inter predicted, the motion vectors of the blocks, and so on.

Video decoder 30 may store reconstructed blocks in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the reconstructed blocks in decoded picture buffer 162, intra prediction or inter prediction operations on PUs of other CUs.

As described above, the bitstream may comprise a series of NAL units. The NAL units may include coded slice NAL units that encapsulate coded slices of pictures of the video data. Each coded slice includes a slice header syntax structure and a slice data syntax structure. In accordance with a first example implementation of the techniques of this disclosure, the slice header syntax structure may conform to the example syntax of Table 1, below.

TABLE 1

| Slice header syntax | C | Descriptor |
|---|---|---|
| slice_header( ) { | | |
|    first_mb_in_slice | 2 | ue(v) |
|    slice_type | 2 | ue(v) |
|    pic_parameter_set_id | 2 | ue(v) |
|    frame_num | 2 | u(v) |
|    if( !frame_mbs_only_flag ) { | | |
|       field_pic_flag | 2 | u(1) |
|       if( field_pic_flag ) | | |
|          bottom_field_flag | 2 | u(1) |
|    } | | |
|    if( nal_unit_type = = 5 ) | | |
|       idr_pic_id | 2 | ue(v) |
|    if( pic_order_cnt_type = = 0 ) { | | |
|       pic_order_cnt_lsb | 2 | u(v) |
|       if( pic_order_present_flag && !field_pic_flag ) | | |
|          delta_pic_order_cnt_bottom | 2 | se(v) |
|    } | | |
|    if( pic_order_cnt_type = = 1 && !delta_pic_order_always_zero_flag ) { | | |
|       delta_pic_order_cnt[ 0 ] | 2 | se(v) |
|       if(pic_order_present_flag && !field_pic_flag ) | | |
|          delta_pic_order_cnt[ 1 ] | 2 | se(v) |
|    } | | |
|    if( redundant_pic_cnt_present_flag ) | | |
|       redundant_pic_cnt | 2 | ue(v) |
|    if( slice_type = = B ) | | |
|       direct_spatial_mv_pred_flag | 2 | u(1) |
|    if ( seq_vsp_enabled_flag) | | |
|       slice_vsp_flag | 2 | u(1) |
|    if( slice_type = = P | | slice_type = = SP | | slice_type = = B ) { | | |
|       num_ref_idx_active_override_flag | 2 | u(1) |
|       if( num_ref_idx_active_override_flag ) { | | |
|          num_ref_idx_l0_active_minus1 | 2 | ue(v) |
|          if( slice_type = = B ) | | |
|             num_ref_idx_l1_active_minus1 | 2 | ue(v) |
|       } | | |
|    } | | |
|    ref_pic_list_reordering( ) | 2 | |
|    if( ( weighted_pred_flag && ( slice_type = = P | | slice_type = = SP ) ) | | ( weighted_bipred_idc = = 1 && slice_type = = B ) ) | | |
|       pred_weight_table( ) | 2 | |
|    if( nal_ref_idc != 0 ) | | |
|       dec_ref_pic_marking( ) | | |
|    if( entropy_coding_mode_flag && slice_type != I && slice_type != SI ) | | |
|       cabac_init_idc | 2 | ue(v) |
|    slice_qp_delta | 2 | se(v) |
|    if( slice_type = = SP | | slice_type = = SI ) { | | |
|       if( slice_type = = SP ) | | |
|          sp_for_switch_flag | 2 | u(1) |
|       slice_qs_delta | 2 | se(v) |
|    } | | |
|    if( deblocking_filter_control_present_flag ) { | | |
|       disable_deblocking_filter_idc | 2 | ue(v) |
|       if( disable_deblocking_filter_idc != 1 ) { | | |
|          slice_alpha_c0_offset_div2 | 2 | se(v) |
|          slice_beta_offset_div2 | 2 | se(v) |
|       } | | |
|    } | | |
|    if(num_slice_groups_minus1 > 0 && slice_group_map_type >= 3 && slice_group_map_type <= 5) | | |
|       slice_group_change_cycle | 2 | u(v) |
| } | | |

In Table 1, above, and other syntax tables of this disclosure, syntax elements with type descriptor ue(v) may be variable-length unsigned integers encoded using $0^{th}$ order exponential Golomb (Exp-Golomb) coding with left bit first. In the example of Table 1 and the following tables, a syntax element having a descriptor of the form u(n), where n is a non-negative integer, are unsigned values of length n.

The seq_vsp_enabled_flag variable of Table 1 indicates whether VSP is allowed for a coded video sequence. If the seq_vsp_enabled_flag indicates that VSP is allowed for a coded video sequence that includes a slice, a slice header syntax structure for the slice may include a slice_vsp_flag syntax element. The slice_vsp_flag syntax element indicates whether VSP is allowed for the slice. When slice_vsp_flag is not present, video decoder 30 may infer (i.e., automatically determine) that slice_vsp_flag is equal to 0, meaning that VSP is not allowed for the slice.

A NAL unit that includes a slice header syntax structure may also include a slice data syntax structure. A slice header syntax structure corresponds to a slice data syntax structure if the slice header syntax structure and the slice data syntax structure are encapsulated by the same NAL unit, and vice versa. The slice data syntax structure may include MB layer syntax structures for MBs of a slice. Table 2, below, is an example syntax for a slice data syntax structure in accordance with the first example implementation of the techniques of this disclosure.

picture in RefPicList0 or RefPicList1. In Table 2, the variable VspRefExist indicates whether there is a VSP picture in RefPicList0 or RefPicList1. In some examples, the

TABLE 2

Slice data syntax

| slice_data( ) { | C | Descriptor |
|---|---|---|
|   if( entropy_coding_mode_flag ) | | |
|     while( !byte_aligned( ) ) | | |
|       cabac_alignment_one_bit | 2 | f(1) |
|   CurrMbAddr = first_mb_in_slice * ( 1 + MbaffFrameFlag ) | | |
|   moreDataFlag = 1 | | |
|   prevMbSkipped = 0 | | |
|   do { | | |
|     if( slice_type != I && slice_type != SI ) | | |
|       if( !entropy_coding_mode_flag ) { | | |
|         mb_skip_run | 2 | ue(v) |
|         prevMbSkipped = ( mb_skip_run > 0 ) | | |
|         for( i=0; i<mb_skip_run; i++ ) | | |
|           CurrMbAddr = NextMbAddress( CurrMbAddr ) | | |
|         moreDataFlag = more_rbsp_data( ) | | |
|       } else { | | |
|         mb_skip_flag | 2 | ae(v) |
|         if (slice_vsp_flag && mb_skip_flag && VspRefExist) | | |
|           skip_from_vsp_flag | | ae(v) |
|         moreDataFlag = !mb_skip_flag | | |
|       } | | |
|     if( moreDataFlag ) { | | |
|       if( MbaffFrameFlag && ( CurrMbAddr % 2 = = 0 \|\| | | |
|         ( CurrMbAddr % 2 = = 1 && prevMbSkipped ) ) ) | | |
|         mb_field_decoding_flag | 2 | u(1) \| ae(v) |
|       macroblock_layer( ) | 2 \| 3 \| 4 | |
|     } | | |
|     if( !entropy_coding_mode_flag ) | | |
|       moreDataFlag = more_rbsp_data( ) | | |
|     else { | | |
|       if( slice_type != I && slice_type != SI ) | | |
|         prevMbSkipped = mb_skip_flag | | |
|       if( MbaffFrameFlag && CurrMbAddr % 2 = = 0 ) | | |
|         moreDataFlag = 1 | | |
|       else { | | |
|         end_of_slice_flag | 2 | ae(v) |
|         moreDataFlag = !end_of_slice_flag | | |
|       } | | |
|     } | | |
|     CurrMbAddr = NextMbAddress( CurrMbAddr ) | | |
|   } while( moreDataFlag ) | | |
| } | | |

In the example syntax of Table 2, a slice data syntax structure may include an mb_skip_flag syntax element. The mb_skip_flag syntax element indicates whether an MB is encoded using skip mode. The whole MB may be predicted from a VSP picture or the normal skip mode may be used. In other words, a predictive block for the MB may be generated from a VSP picture or another picture. For example, mb_skip_flag equal to 1 may indicate that the skip mode is used to encode the MB. In this example, mb_skip_flag equal to 0 may indicate that the skip mode is not used to encode the MB.

Furthermore, in the example syntax of Table 2, a slice data syntax structure may include a skip_from_vsp_flag for an MB when the slice_vsp_flag of the corresponding slice header syntax structure indicates that VSP is allowed for the slice, the MB is encoded using skip mode, and there is a VSP VspRefExist condition is omitted. The skip_from_vsp_flag for an MB indicates whether the whole MB is predicted from a VSP picture. For example, skip_from_vsp_flag equal to 1 may indicate that when skip mode is used, the whole MB is predicted from a VSP picture. In this example, skip_from_vsp_flag equal to 0 may indicate the normal skip mode. When skip_from_vsp_flag is not present in the slice data syntax structure, video decoder 30 may infer that the MB is encoded using normal skip mode (e.g., video decoder 30 may infer skip_from_vsp_flag to be equal to zero).

As shown in Table 2, above, the slice data may include one or more MB layer syntax structures. An MB layer syntax structure may include an encoded MB. Table 3, below, is an example syntax for the MB layer syntax structure in accordance with the first example implementation of the techniques of this disclosure.

TABLE 3

Macroblock layer syntax

| macroblock_layer( ) { | C | Descriptor |
|---|---|---|
|   if (slice_vsp_flag && VspRefExist) | | |
|     vsp_mb_flag | 2 | ae(v) |
|   if (! vsp_mb_flag ) | | |
|     mb_type | 2 | ue(v) \| ae(v) |
|   if( mb_type = = I_PCM ) { | | |
|     while( !byte_aligned( ) ) | | |
|       pcm_alignment_zero_bit | 3 | f(1) |
|     for( i = 0; i < 256; i++ ) | | |
|       pcm_sample_luma[ i ] | 3 | u(v) |
|     for( i = 0; i < 2 * MbWidthC * MbHeightC; i++ ) | | |
|       pcm_sample_chroma[ i ] | 3 | u(v) |
|   } else { | | |
|     noSubMbPartSizeLessThan8x8Flag = 1 | | |
|     if( mb_type != I_NxN && | | |
|       MbPartPredMode( mb_type, 0 ) != Intra_16x16 && | | |
|       NumMbPart( mb_type ) = = 4 ) { | | |
|       if ( !vsp_mb_flag ) | | |
|         sub_mb_pred( mb_type ) | 2 | |
|       for( mbPartIdx = 0; mbPartIdx < 4; mbPartIdx++ ) | | |
|         if( sub_mb_type[ mbPartIdx ] != B_Direct_8x8 ) { | | |
|           if( NumSubMbPart( sub_mb_type[ mbPartIdx ] ) > 1 ) | | |
|             noSubMbPartSizeLessThan8x8Flag = 0 | | |
|         } else if( !direct_8x8_inference_flag ) | | |
|           noSubMbPartSizeLessThan8x8Flag = 0 | | |
|     } else { | | |
|       if(transform_8x8_mode_flag && mb_type = = I_NxN ) | | |
|         transform_size_8x8_flag | 2 | u(1) \| ae(v) |
|       if ( !vsp_mb_flag ) | | |
|         mb_pred( mb_type ) | 2 | |
|     } | | |
|     if( MbPartPredMode( mb_type, 0 ) != Intra_16x16 ) { | | |
|       coded_block_pattern | 2 | me(v) \| ae(v) |
|       if( CodedBlockPatternLuma > 0 && | | |
|         transform_8x8_mode_flag && mb_type != I_NxN && | | |
|         noSubMbPartSizeLessThan8x8Flag && | | |
|         (vsp_mb_flag \|\| (!vsp_mb_flag && (mb_type != B_Direct_16x16 | | |
| \|\| direct_8x8_inference_flag)) ) ) | | |
|         transform_size_8x8_flag | 2 | u(1) \| ae(v) |
|     } | | |
|     if( CodedBlockPatternLuma > 0 \|\| CodedBlockPatternChroma > 0 \|\| | | |
|       MbPartPredMode( mb_type, 0 ) = = Intra_16x16 ) { | | |
|       mb_qp_delta | 2 | se(v) \| ae(v) |
|       residual( 0, 15 ) | 3 \| 4 | |
|     } | | |
|   } | | |
| } | | |

In the example syntax of Table 3, an MB layer syntax structure for an MB may include a vsp_mb_flag syntax element when VSP is allowed in a slice containing the MB and there is a VSP picture in RefPicList0 or RefPicList1. In other words, the MB layer syntax structure may include vsp_mb_flag when slice_vsp_flag is equal to 1 and VspRefExist is equal to 1. In some examples, the VspRefExist condition is omitted. The vsp_mb_flag syntax element may indicate whether the whole MB is predicted from a VSP picture. For example, vsp_mb_flag equal to 1 may indicate that the whole MB is predicted from a VSP picture. In this example, vsp_mb_flag equal to 0 indicates that the whole MB may be predicted by other modes.

When the whole MB is predicted from a VSP picture (e.g., when vsp_mb_flag is equal to 1), the mb_type syntax element is not signaled in the MB layer syntax structure. The mb_type syntax element indicates a type of the MB. Furthermore, when vsp_mb_flag is not present, video decoder 30 may infer vsp_mb_flag to indicate that the whole MB may be predicted by other modes (e.g., video decoder 30 may infer vsp_mb_flag to be equal to 0).

Furthermore, the example of Table 3 includes a noSubMbPartLessThan8×8Flag variable. If the number of MB partitions of the current MB is less than four, noSubMbPartLessThan8×8Flag is true, as in H.264/AVC. However, if the number of MB partitions of the current MB is equal to four (i.e., if NumMbPart(mb_type)=4), noSubMbPartLessThan8×8Flag may be derived by only checking the 8×8 MB partitions with mb_part_vsp_flag equal to 0. For instance, if any MB partition has a sub-MB partition smaller than 8×8, noSubMbPartLessThan8×8Flag may be false. Otherwise, noSubMbPartLessThan8×8Flag may be true (i.e., noSubMbPartLessThan8×8Flag=1).

Furthermore, as shown in the example syntax of Table 3, video encoder 20 may determine, based at least in part on whether the whole MB is predicted from a VSP picture, whether to include a syntax element (transform_size_8×8_flag) in the MB layer syntax structure. Likewise, video decoder 30 may determine, based at least in part on whether the whole MB is predicted from a VSP picture, whether to decode the syntax element from the MB layer syntax structure. The transform_size_8×8_flag may indicate whether, for the current MB, a transform coefficient decoding process and picture construction process prior to a deblocking filter process for residual 8×8 or 4×4 blocks is invoked for luma samples, and, in some instances, for Cb and Cr samples.

As shown in the example syntax of Table 3, an MB layer syntax structure may include an MB prediction syntax structure (mb_pred(mb_type)) if the whole MB is not predicted from a VSP picture (e.g., if vsp_mb_flag is not equal to 1). Conversely, the MB layer syntax structure does not include an MB prediction syntax structure if the whole MB is predicted from a VSP picture (e.g., if vsp_mb_flag is equal to 1). In other examples, the MB layer syntax structure may include the MB prediction syntax structure regardless of whether the MB is predicted from the VSP picture.

As shown in the example of Table 3, above, an MB layer syntax structure may include an MB prediction syntax structure. The MB prediction syntax structure may include motion information for an MB. Table 4, below, is an example syntax for an MB prediction syntax structure in accordance with the first example implementation of the techniques of this disclosure.

containing the particular MB partition (e.g., slice_vsp_flag=1) and does not evaluate whether the number of MB partitions of the MB is not equal to 1 or VspRefExist=1.

In some examples, mb_part_vsp_flag[mbPartIdx] equal to 1 may indicate that a particular MB partition is predicted from a VSP picture, where mbPartIdx is an index of the particular MB partition. In this example, mb_part_vsp_flag[mbPartIdx] equal to 0 may indicate that the whole MB partition is not predicted from a VSP picture, where mbPartIdx is an index of the MB partition. In some examples, when mb_part_vsp_flag[mbPartIdx] is not present, video decoder 30 may infer mb_part_vsp_flag[mbPartIdx] to indicate that the whole MB partition is not predicted from a VSP picture (e.g., video decoder 30 may infer mb_part_vsp_flag[mbPartIdx] to be equal to 0).

As shown in Table 4, if mbPartIdx is the index of a particular MB partition, an MB prediction syntax structure

TABLE 4

Macroblock prediction syntax

| mb_pred( mb_type ) { | C | Descriptor |
|---|---|---|
|   if( MbPartPredMode( mb_type, 0 ) = = Intra_4x4 \|\| | | |
|     MbPartPredMode( mb_type, 0 ) = = Intra_16x16 ) { | | |
|     if( MbPartPredMode( mb_type, 0 ) = = Intra_4x4 ) | | |
|       for( luma4x4BlkIdx=0; luma4x4BlkIdx<16; luma4x4BlkIdx++ ) { | | |
|         prev_intra4x4_pred_mode_flag[ luma4x4BlkIdx ] | 2 | u(1) \| ae(v) |
|         if( !prev_intra4x4_pred_mode_flag[ luma4x4BlkIdx ] ) | | |
|           rem_intra4x4_pred_mode[ luma4x4BlkIdx ] | 2 | u(3) \| ae(v) |
|       } | | |
|     intra_chroma_pred_mode | 2 | ue(v) \| ae(v) |
|   } else if( MbPartPredMode( mb_type, 0 ) != Direct ) { | | |
|     for( mbPartIdx = 0; mbPartIdx < NumMbPart( mb_type ); mbPartIdx++) | | |
|       if (slice_vsp_flag && NumMbPart( mb_type ) != 1 && VspRefExist) | | |
| //vsp_mb_flag is not 1 | | |
|         mb_part_vsp_flag[ mbPartIdx ] | 2 | ae(v) |
|       if(!mb_part_vsp_flag[ mbPartIdx ] &&( | | |
| num_ref_idx_l0_active_minus1 > 0 \|\| | | |
|         mb_field_decoding_flag ) && | | |
|         MbPartPredMode( mb_type, mbPartIdx ) != Pred_L1 ) | | |
|           ref_idx_l0[ mbPartIdx ] | 2 | te(v) \| ae(v) |
|     for (mbPartIdx = 0; mbPartIdx < NumMbPart( mb_type ) && | | |
| !mb_part_vsp_flag[ mbPartIdx ]; mbPartIdx++) | | |
|       if( ( num_ref_idx_l1_active_minus1 > 0 \|\| | | |
|         mb_field_decoding_flag ) && | | |
|         MbPartPredMode( mb_type, mbPartIdx ) != Pred_L0 ) | | |
|           ref_idx_l1[ mbPartIdx ] | 2 | te(v) \| ae(v) |
|     for( mbPartIdx = 0; mbPartIdx < NumMbPart( mb_type ); mbPartIdx++) | | |
|       if(!mb_part_vsp_flag[ mbPartIdx ] && MbPartPredMode | | |
| (mb_type, mbPartIdx ) != Pred_L1 ) | | |
|         for( compIdx = 0; compIdx < 2; compIdx++ ) | | |
|           mvd_l0[ mbPartIdx ][ 0 ][ compIdx ] | 2 | se(v) \| ae(v) |
|     for( mbPartIdx = 0; mbPartIdx < NumMbPart( mb_type ); mbPartIdx++) | | |
|       if(!mb_part_vsp_flag[ mbPartIdx ] && | | |
| MbPartPredMode( mb_type, mbPartIdx ) != Pred_L0 ) | | |
|         for( compIdx = 0; compIdx < 2; compIdx++ ) | | |
|           mvd_l1[ mbPartIdx ][ 0 ][ compIdx ] | 2 | se(v) \| ae(v) |
|   } | | |
| } | | |

In the example syntax of Table 4, an MB prediction syntax structure may include an array of syntax elements mb_part_vsp_flag[ ]. Each entry in mb_part_vsp_flag[ ] indicates whether a different MB partition of an MB is predicted from a VSP picture. The MB prediction syntax structure may include an mb_part_vsp_flag for a particular MB partition if VSP is enabled for a slice containing the particular MB partition (e.g., slice_vsp_flag=1), the number of MB partitions of the MB is not equal to 1, and there is a VSP picture in RefPicList0 or RefPicList1 (e.g., VspRefExist=1). In other examples, the MB prediction syntax structure may include the mb_part_vsp_flag if VSP is enabled for a slice does not include reference indices (ref_idx_l0 and ref_idx_l1) or motion vector differences (mvd_l0 and mvd_l1) for the particular MB partition when mb_part_vsp_flag[mbPartIdx] indicates that the particular MB partition is predicted from a VSP picture. In other examples, the MB prediction syntax structure may include ref_idx_l0 or ref_idx_l1 regardless of whether the particular MB partition is predicted from a VSP picture.

Furthermore, if an MB is not wholly predicted from a VSP picture (e.g., if the vsp_mb_flag of the MB is not equal to 1), the MB layer syntax structure for the MB may include a sub-MB prediction syntax structure. The sub-MB prediction syntax structures may include motion information (e.g., motion vectors, reference indices, etc.) for MB partitions. Table 5, below, shows an example syntax for a sub-MB prediction syntax structure in accordance with the first example implementation of the techniques of this disclosure.

TABLE 5

Sub-macroblock prediction syntax

| | C | Descriptor |
|---|---|---|
| sub_mb_pred( mb_type ) { | | |
|    for( mbPartIdx = 0; mbPartIdx < 4; mbPartIdx++ ) { | | |
|       if (slice_vsp_flag && VspRefExist) // vsp_mb_flag is not 1 | | |
|          sub_mb_vsp_flag[ mbPartIdx ] | | |
|       if(!sub_mb_vsp_flag[ mbPartIdx ]) | | |
|          sub_mb_type[ mbPartIdx ] | 2 | ue(v) \| ae(v) |
|    } | | |
|    for( mbPartIdx = 0; mbPartIdx < 4; mbPartIdx++ ) | | |
|       if(!sub_mb_vsp_flag [ mbPartIdx ] &&( num_ref_idx_l0_active_minus1 > 0 \| \| mb_field_decoding_flag ) && | | |
|          mb_type != P_8x8ref0 && | | |
|          sub_mb_type[ mbPartIdx ] != B_Direct_8x8 && | | |
|          SubMbPredMode( sub_mb_type[ mbPartIdx ] ) != Pred_L1 ) | | |
|             ref_idx_l0[ mbPartIdx ] | 2 | te(v) \| ae(v) |
|    for( mbPartIdx = 0; mbPartIdx < 4; mbPartIdx++ ) | | |
|       if( !sub_mb_vsp_flag[ mbPartIdx ] && (num_ref_idx_l1_active_minus1 > 0 \| \| mb_field_decoding_flag ) && | | |
|          sub_mb_type[ mbPartIdx ] != B_Direct_8x8 && | | |
|          SubMbPredMode( sub_mb_type[ mbPartIdx ] ) != Pred_L0 ) | | |
|             ref_idx_l1[ mbPartIdx ] | 2 | te(v) \| ae(v) |
|    for( mbPartIdx = 0; mbPartIdx < 4; mbPartIdx++ ) | | |
|       if(!sub_mb_vsp_flag[ mbPartIdx] &&( sub_mb_type[ mbPartIdx ] != B_Direct_8x8 && | | |
|          SubMbPredMode( sub_mb_type[ mbPartIdx ] ) != Pred_L1 ) | | |
|          for( subMbPartIdx = 0; | | |
|             subMbPartIdx < NumSubMbPart( sub_mb_type[ mbPartIdx ] ); | | |
|             subMbPartIdx++) | | |
|                for( compIdx = 0; compIdx < 2; compIdx++ ) | | |
|                   mvd_l0[ mbPartIdx ][ subMbPartIdx ][ compIdx ] | 2 | se(v) \| ae(v) |
|    for( mbPartIdx = 0; mbPartIdx < 4; mbPartIdx++ ) | | |
|       if(!sub_mb_vsp_flag[ mbPartIdx ] &&sub_mb_type[ mbPartIdx ] != B_Direct_8x8 && | | |
|          SubMbPredMode( sub_mb_type[ mbPartIdx ] ) != Pred_L0 ) | | |
|          for( subMbPartIdx = 0; | | |
|             subMbPartIdx < NumSubMbPart( sub_mb_type[ mbPartIdx ] ); | | |
|             subMbPartIdx++) | | |
|                for( compIdx = 0; compIdx < 2; compIdx++ ) | | |
|                   mvd_l1[ mbPartIdx ][ subMbPartIdx ][ compIdx ] | 2 | se(v) \| ae(v) |
| } | | |

In the example syntax of Table 5, a sub-MB prediction syntax structure may include sub_mb_vsp_flag[ ] syntax elements. Each sub_mb_vsp_flag[ ] indicates whether a different MB partition (e.g., 8×8) is predicted from a VSP picture. The sub-MB prediction syntax structure may include a sub_mb_vsp_flag for a particular MB partition when VSP is enabled for a slice containing the particular MB partition (e.g., slice_vsp_flag=1) and a VSP picture is in RefPicList0 or RefPicList1 (e.g., when VspRefExist=1). In other examples, the condition of VspRefExist=1 is not determined.

In one example, sub_mb_vsp_flag[mbPartIdx] equal to 1 may indicate that a particular MB partition is predicted from a VSP picture, wherein mbPartIdx is an index of the particular MB partition. In this example, sub_mb_vsp_flag [mbPartIdx] equal to 0 may indicate that the whole of the particular MB partition is not predicted from a VSP picture. When sub_mb_vsp_flag[mbPartIdx] is not present, the whole of the particular MB partition is not predicted from a VSP picture (e.g., video decoder 30 may infer sub_mb_vsp_flag[mbPartIdx] to be equal to 0).

Furthermore, as shown in the example syntax of Table 5, when mbPartIdx is the index of a particular MB partition and mb_part_vsp_flag[mbPartIdx] indicates that the particular MB partition is predicted from a VSP picture, the sub-MB prediction syntax structure does not include a syntax element that specifies a sub-MB type of the particular MB partition (sub_mb_type[mbPartIdx]). Moreover, when mb_part_vsp_flag[mbPartIdx] indicates that the particular MB partition is predicted from a VSP picture, the sub-MB prediction structure does not include reference indices (ref_idx_l0[mbPartIdx] and ref_idx_l1[mbPartIdx]) for the particular MB partition. Furthermore, when mb_part_vsp_flag [mbPartIdx] indicates that the particular MB partition is predicted from a VSP picture, the sub-MB prediction syntax structure does not include motion vector differences (mvd_l0[mbPartIdx] and mvd_l1[mbPartIdx]) for the particular MB partition.

Tables 1-5, above, include vsp_mb_flag, mb_part_vsp_flag, sub_mb_sp_flag, and skip_from_vsp_flag syntax elements. Video decoder 30 may use the vsp_mb_flag, mb_part_vsp_flag, sub_mb_vsp_flag, and skip_from_vsp_flag syntax elements to derive a flag, namely VSPFlag, for an MB partition of any size. The VSPFlag may indicate whether an MB partition is predicted from a VSP picture as described elsewhere in this disclosure. For example, when VSPFlag for an MB partition is equal to 1, the MB partition may be predicted from the VSP picture.

In accordance with the first implementation of the techniques of this disclosure, when the VSPFlag indicates that an MB partition is predicted from a VSP picture (e.g., when the VSPFlag is equal to 1), motion compensation unit 164 may set the samples of predictive blocks of the MB partition to samples of the VSP picture. For instance, assume that the current MB partition has a left-top pixel with coordinates (x, y) in the luma component and (x', y') in the chroma components. Furthermore, assume that the size of the current MB partition is N×M, where N, M is equal to 8 or 16. In this instance, motion compensation unit 164 may, starting from the coordinates (x, y) with the same size of N×M, set the values of the pixels of the luma component of the VSP picture to the pixels of the current MB partition. For example, motion compensation unit 164 may generate a predictive luma block for the current MB partition such that each luma sample in the predictive luma block matches a luma sample at a corresponding location in the VSP picture.

Furthermore, starting from coordinates (x', y') with the size of N/2×M/2 in the case of the 4:2:0 video format, N×M in the case of the 4:4:4 video format, or N×M/2 in the case of the 4:2:2 video format, motion compensation unit 164 may set the values of pixels in each block of a chroma component of the VSP picture to pixels of the current MB partition, starting at the same coordinates of the chroma components (x', y'). For example, motion compensation unit 164 may generate a predictive Cb or Cr block for the current MB partition such that each Cb or Cb sample matches a Cb or Cr sample at a corresponding location in the VSP picture. In this example, motion compensation unit 164 may start generating the predictive Cb or Cr block from coordinates (x', y') of a Cb or Cr block of the VSP picture. Furthermore, in this example, the predictive Cb or Cr block may be of size N/2×M/2, N×M, or n×M/2 if the chroma blocks of the VSP picture are down-sampled according to the 4:2:0 video format, the 4:4:4 video format, or the 4:2:2 video format, respectively.

When vsp_mb_flag or skip_from_vsp_flag is equal to 1, each block of the MB is inferred to have mb_part_vsp_flag, and sub_mb_vsp_flag equal to 1. When a whole MB is not predicted from a VSP picture (e.g., when vsp_mb_flag is equal to 0), MB partitions of the MB may have different values of mb_part_vsp_flag.

In one example alternative solution, it is constrained that not all MB partitions can have mb_part_vsp_flag equal to 1 if vsp_mb_flag is equal to 0. In other words, video encoder 20 does not signal that each MB partition of an MB is predicted from the VSP picture if video encoder 20 has signaled that the whole MB is not predicted from the VSP picture. Signaling all MB partitions of the MB are predicted from the VSP picture would yield the same results as signaling that whole MB is predicted from the VSP picture. Hence, if all MB partitions of the MB were predicted from the VSP picture, it may be a waste of bits to generate the MB partitions.

As described briefly above, entropy decoding unit 150 may perform entropy decoding operations to entropy decode syntax elements. Moreover, entropy encoding unit 118 of video encoder 20 may perform entropy encoding operations to entropy encode syntax elements. When an entropy coder (such as entropy encoding unit 118 and entropy decoding unit 150) performs entropy encoding or entropy decoding (i.e., entropy coding) on a syntax element, the entropy coder may determine a coding model. The entropy coder may determine a context model based on contextual information (i.e., a context). The context model may indicate probabilities of bins having particular values.

In accordance with the first example implementation of the techniques of this disclosure, an entropy coder may maintain a context for VSPFlag. As indicated above, VSP-Flag may indicate whether an MB partition is predicted from a VSP picture. The entropy coder may use the context for entropy coding of vsp_mb_flag, mb_part_vsp_flag, sub_mb_vsp_flag, and skip_from_vsp_flag. Entropy decoding unit 150 may update the context for VSPFlag based on each vsp_mb_flag, mb_part_vsp_flag, sub_mb_vsp_flag, and skip_from_vsp_flag.

Prior to entropy coding the first syntax element of a slice, the entropy coder performs a context initialization process to initialize context variables used in entropy coding syntax elements of the slice. In accordance with the techniques of this disclosure, the initial probability for the context of VSPFlag of P slices may be different than the initial probability for the context of VSPFlag of B slices, even though the VSP mode applies to both P slices and B slices.

Furthermore, when an entropy decoder starts entropy decoding a syntax element, the entropy decoder may retrieve a set of all possible binarizations of the syntax element and may set a bin index (binIdx) to −1. The entropy decoder may then sequentially process bits from bitstream. When the entropy decoder processes a bit, the entropy decoder may increment binIdx and may determine a context index (ctxIdx) based at least in part on binIdx. The entropy decoder may use a context model associated with ctxIdx to entropy decode the current bin. Next, the entropy decoder may determine whether bins that have been decoded so far for the syntax element match any of the possible binarizations of the syntax element. If not, the entropy decoder may process another bit in the manner described in this paragraph. When the decoded bins match a possible binarization of the syntax element, the entropy decoder may convert the binarization of the syntax element back to the original value of the syntax element.

An entropy encoder may perform a similar process. In this process, the entropy encoder may binarize a syntax element and may set a bin index (binIdx) to −1. The entropy encoder may then process the bins of the binarized syntax element sequentially. When the entropy encoder processes a bin, the entropy encoder may determine, based at least in part on the binIdx for the bin, a context index (ctxIdx) for the bin. The entropy encoder may then use a context model associated with the ctxIdx for the bin to entropy encode the bin. When the entropy encoder has processed each bin of the binarized syntax element, the entropy encoder has completed entropy encoding the syntax element.

As mentioned above, when an entropy coder (e.g., the entropy decoder or the entropy encoder) processes a bin of a syntax element, the entropy coder determines, based at least in part on a bin index (binIdx) of the bin, a context index (ctxIdx) for the bin. To determine the ctxIdx for the bin, the entropy coder may use the bin index and a context index offset (ctxIdxOffset) to look up, in a predetermined table, a context index increment (ctxIdxInc) for the bin. The entropy coder may determine the ctxIdxOffset as part of binarizing the syntax element. The ctxIdx for the bin may be equal to the ctxIdxOffset plus the ctxIdxInc for the bin.

In accordance with the first example implementation of the techniques of this disclosure, when an entropy coder is entropy coding the VSPFlag (which may be the skip_from_vsp_flag syntax element, the vsp_mb_flag syntax element, or the sub_mb_vsp_flag syntax element depending on the syntax element to be decoded), the entropy coder may determine the ctxIdxInc for a bin associated with the VSP-Flag. In some examples, the ctxIdxInc for the bin may be the sum of condTermFlagA and condTermFlagB. That is, ctx-IdxInc may be derived as ctxIdxInc=condTermFlagA+condTermFlagB. In another example, the ctxIdxInc for the bin may be equal to condTermFlagA. That is, ctxIdxInc may be derived as ctxIdxInc=condTermFlagA. In another example, the ctxIdxInc for the bin is equal to condTermFlagB. That is, ctxIdxInc may be derived as ctxIdxInc=condTermFlagB.

In the examples above, the entropy coder may determine condTermFlagA and condTermFlagB based at least in part on whether data associated with particular blocks that neighbor a current MB or MB partition are available for use in the entropy coding process for syntax elements associated with the current MB or MB partition. For example, mbPAddrA may denote the neighboring 8×8 block to the left of the current MB or MB partition and mbPAddrB may denote the neighboring 8×8 block above the current MB or MB partition. If mbPAddrA is not available or the VSPFlag for the block mbPAddrA is equal to 0, condTermFlagA is equal to 0. Otherwise, if mbPAddrA is available and the VSPFlag for the block mbPAddrA is equal to 1, condTermFlagA is equal to 1. Similarly, if mbPAddrB is not available or the VSPFlag for the block mbPAddrB is equal to 0, condTermFlagB is equal to 0. Otherwise, if mbPAddrB is available and the VSPFlag for the block mbPAddrB is equal to 1, condTermFlagB is equal to 1.

In another example, if mbPAddrA is available and the VSPFlag for the block mbPAddrA is equal to 0, condTermFlagA is equal to 1. Otherwise, if mbPAddrA is unavailable or the VSPFlag for the block mbPAddrA is equal to 1, condTermFlagA is equal to 0. Similarly, if mbPAddrB is available and the VSPFlag for the block mbPAddrB is equal to 0, condTermFlagB is equal to 1. Otherwise, if mbPAddrB is unavailable or the VSPFlag for the block mbPAddrB is equal to 1, condTermFlagB is equal to 0.

As mentioned briefly above, filter unit 160 may perform a deblocking operation to reduce blocking artifacts associated with the sample blocks of the current video unit. In accordance with the first example implementation of the techniques of this disclosure, filter unit 160 may perform particular deblocking operations related to the VSP mode. In a first example deblocking filter process, an MB partition with VSPFlag equal to 1 is considered as inter coding, with reference index equal to −1, uni-directionally inter coded from reference picture list 0 and motion vector equal to zero during the deblocking filter process. Filter unit 160 may determine a boundary filtering strength value (bS) for an boundary between the MB partition and another block. Filter unit 160 may use the bS to apply a filter to array of input samples at the boundary. In this first example deblocking filter process, filter unit 160 may determine bS based at least in part on prediction (e.g., inter or intra) modes of the blocks, reference indices of the blocks, whether the blocks are uni-directionally or bi-directionally inter predicted, and the motion vectors of the blocks.

In second example deblocking filter process, filter unit 160 may perform a derivation process for the luma content dependent boundary filtering strength as part of a deblocking filter process. In this example, inputs to the derivation process are the input sample values $p_0$ and $q_0$ of a single set of samples across an edge that is to be filtered. The inputs to the derivation process also include a verticalEdgeFlag. The verticalEdgeFlag may indicate whether the edge is horizontal or vertical. The output of the derivation process is a boundary strength variable bS.

In the second example deblocking filter process, a variable MbaffFrameFlag may be equal to 1 when an mb_adaptive_frame_field flag syntax element in a SPS is equal to 1 and a field_pic_flag in a slice header is not equal to 1. That is, MbaffFrameFlag=mb_adaptive_frame_field flag && !field_pic_flag. The mb_adaptive_frame_field flag syntax element specifies whether it is possible to switch between field and frame MBs within a picture. A field is an assembly of alternate rows of a frame. Mb_adaptive_frame_field equal to 0 specifies no switching between frame and field MBs within a picture. Mb_adaptive_frame_field equal to 1 specifies the possible use of switching between frame and field MBs within frames. The field_pic_flag syntax element indicates whether the slice is a slice of a coded field or a coded frame. A coded field is a coded representation of a field. Field_pic_flag equal to 1 may specify that the slice is a slice of a coded field. Field_pic_flag equal to 0 may specify that the slice is a slice of a coded frame. Thus, MbaffFrameFlag equal to 1 indicates the possible use of switching between frame and field MBs within frames and that the current slice is a slice of a coded frame.

Furthermore, in the second example deblocking filter process, filter unit 160 may derive a variable mixedModeEdgeFlag as follows. First, if MbaffFrameFlag is equal to 1 and the samples $p_0$ and $q_0$ are in different MB pairs, one of which is a field MB pair and the other is a frame MB pair, filter unit 160 sets mixedModeEdgeFlag equal to 1. Otherwise, if MbaffFrameFlag is not equal to 1 or the samples $p_0$ and $q_0$ are not in different MB pairs, filter unit 160 sets mixedModeEdgeFlag equal to 0.

Next, in the second example deblocking filter process, filter unit 160 derives the variable bS for the block edge being filtered. If the block edge is an MB edge and any of the following conditions are true, a value of bS equal to 4 is output. In accordance with a first condition, filter unit 160 sets the value of bS to 4 if the samples $p_0$ and $q_0$ are both in frame MBs and either or both of the samples $p_0$ and $q_0$ is in an MB coded using an intran MB prediction mode. In accordance with a second condition, filter unit 160 sets the value of bS to 4 if the samples $p_0$ and $q_0$ are both in frame MBs and either or both of the samples p0 or $q_0$ is in an MB that is in a slice with slice_type equal to SP or SI. In accordance with a third condition, filter unit 160 sets the value of bS to 4 if MbaffFrameFlag is equal to 1 or field_pic_flag is equal to 1, verticalEdgeFlag is equal to 1, and either or both of the samples $p_0$ or $q_0$ is in an MB coded using an intran MB prediction mode. In accordance with a fourth condition, filter unit 160 may set the value of bS to 4 if MbaffFrameFlag is equal to 1 or field_pic_flag is equal to 1, verticalEdgeFlag is equal to 1, and either or both of the samples $p_0$ or $q_0$ is in an MB that is in a slice with slice_type equal to SP or SI.

Otherwise, if any of the following conditions are true, filter unit 160 sets the value of bS to 3. According to a first condition, filter unit 160 sets the value of bS to 3 if mixedModeEdgeFlag is equal to 0 and either or both of the samples $p_0$ or $q_0$ is in an MB coded using an Intra MB prediction mode. According to a second condition, filter unit 160 sets the value of bS to 3 if mixedModeEdgeFlag is equal to 0 and either or both of the samples $p_0$ or $q_0$ is in an MB that is in a slice with slice_type equal to SP or SI. According to a third condition, filter unit 160 sets the value of bS to 3 if mixedModeEdgeFlag is equal to 1, verticalEdgeFlag is equal to 0, and either or both of the samples $p_0$ or $q_0$ is in an MB coded using an Intra MB prediction mode. According to a fourth condition, filter unit 160 sets the value of bS to 3 if mixedModeEdgeFlag is equal to 1, verticalEdgeFlag is equal to 0, and either or both of the samples $p_0$ or $q_0$ is in an MB that is in a slice with slice_type equal to SP or SI.

Otherwise, if any of the following conditions are true, filter unit 160 sets the value of bS to 2. According to a first condition, filter unit 160 sets the value of bS to 2 if the transform_size_8×8_flag is equal to 1 for the MB containing the sample $p_0$ and the 8×8 luma transform block associated with the 8×8 luma block containing the sample $p_0$ contains non-zero transform coefficient levels. According to a second condition, filter unit 160 sets the value of bS to 2 if transform_size_8x8_flag is equal to 0 for the MB containing the sample $p_0$ and the 4×4 luma transform block associated with the 4×4 luma block containing the sample $p_0$ contains non-zero transform coefficient levels. According to a third condition, filter unit 160 sets the value of bS to 2 if transform_size_8x8_flag is equal to 1 for the MB containing the sample $q_0$ and the 8×8 luma transform block associated with the 8×8 luma block containing the sample $q_0$ contains non-zero transform coefficient levels. According to a fourth condition, filter unit 160 sets the value of bS to 2 if transform_size_8x8_flag is equal to 0 for the MB containing the sample $q_0$ and the 4×4 luma transform block associated with the 4×4 luma block containing the sample $q_0$ contains non-zero transform coefficient levels.

Otherwise, if any of the following conditions are true, filter unit 160 sets the value of bS equal to 1. According to a first condition, filter unit 160 sets the value of bS to 1 if mixedModeEdgeFlag is equal to 1. According to a second condition and in accordance with the techniques of this disclosure, filter unit 160 sets the value of bS to 1 if mixedModeEdgeFlag is equal to 0, and the value of the VSPFlag for the MB/sub-MB partition containing the sample $p_0$ is different from the VSPFlag for the MB/sub-MB partition containing the sample $q_0$. According to a third condition, filter unit 160 sets the value of bS to 1 if mixedModeEdgeFlag is equal to 0 and if the prediction of the MB/sub-MB partition containing the sample $p_0$ different reference pictures or a different number of motion vectors are used than for the prediction of the MB/sub-MB partition containing the sample $q_0$. The determination of whether the reference pictures used for the two MB/sub-MB partitions are the same or different is based only on which pictures are referenced, without regard to whether a prediction is formed using an index into reference picture list 0 or an index into reference picture list 1, and also without regard to whether the index position within a reference picture list is different. According to a fourth condition, filter unit 160 sets the value of bS to 1 if mixedModeEdgeFlag is equal to 0 and one motion vector is used to predict the MB/sub-MB partition containing the sample $p_0$ and one motion vector is used to predict the MB/sub-MB partition containing the sample $q_0$ and the absolute difference between the horizontal or vertical component of the motion vectors used is greater than or equal to 4 in units of quarter luma frame samples. According to a fifth condition, filter unit 160 sets the value of bS to 1 if mixedModeEdgeFlag is equal to 0 and two motion vectors and two different reference pictures are used to predict the MB/sub-MB partition containing the sample $p_0$ and two motion vectors for the same two reference pictures are used to predict the MB/sub-MB partition containing the sample $q_0$ and the absolute difference between the horizontal or vertical component of the two motion vectors used in the prediction of the two MB/sub-MB partitions for the same reference picture is greater than or equal to 4 in units of quarter luma frame samples.

According to a sixth condition, filter unit 160 sets the value of bS to 1 if mixedModeEdgeFlag is equal to 0 and two motion vectors for the same reference picture are used to predict the MB/sub-MB partition containing the sample $p_0$ and two motion vectors for the same reference picture are used to predict the MB/sub-MB partition containing the sample $q_0$ and both of the following conditions are true. First, the absolute difference between the horizontal or vertical component of RefPicList0 motion vectors used in the prediction of the two MB/sub-MB partitions is greater than or equal to 4 in quarter luma frame samples or the absolute difference between the horizontal or vertical component of the RefPicList1 motion vectors used in the prediction of the two MB/sub-MB partitions is greater than or equal to 4 in units of quarter luma frame samples. Second, the absolute difference between the horizontal or vertical component of RefPicList0 motion vector used in the prediction of the MB/sub-MB partition containing the sample $p_0$ and the RefPicList1 motion vector used in the prediction of the MB/sub-MB partition containing the sample $q_0$ is greater than or equal to 4 in units of quarter luma frame samples or the absolute difference between the horizontal or vertical component of the RefPicList1 motion vector used in the prediction of the MB/sub-MB partition containing the sample $p_0$ and RefPicList0 motion vector used in the prediction of the MB/sub-MB partition containing the sample $q_0$ is greater than or equal to 4 in units of quarter luma frame samples. A vertical difference of 4 in units of quarter luma frame samples is a difference of 2 in units of quarter luma field samples. Otherwise, filter unit 160 sets the value of bS equal to 0.

In a third example deblocking filter process, filter unit 160 may perform a derivation process for the luma content dependent boundary filtering strength as part of performing a deblocking operation. In this example, inputs to the derivation process are the input sample values $p_0$ and $q_0$ of a single set of sample across an edge that is to be filtered. The inputs to the derivation process also include a verticalEdgeFlag. The output of the derivation process may be a boundary strength variable bS. In this example, filter unit 160 may derive a variable mixedModeEdgeFlag as follows. First, if MbaffFrameFlag is equal to 1 and the samples $p_0$ and $q_0$ are in different pairs, one of which is a field MB pair and the other is a frame MB pair, filter unit 160 sets mixedModeEdgeFlag equal to 1. Otherwise, if MbaffFrameFlag is not equal to 1 or the samples $p_0$ and $q_0$ are not in different MB pairs, filter unit 160 sets mixedModeEdgeFlag equal to 0.

Furthermore, in the third example deblocking filter process, filter unit 160 may derive a variable bS for a block edge between MBs. If the block edge is an MB edge and any of the following conditions are true, a value of bS equal to 4 is output. In accordance with a first condition, filter unit 160 sets the value of bS to 4 if the samples $p_0$ and $q_0$ are both in frame MBs and either or both of the samples $p_0$ and $q_0$ is in an MB coded using an intra MB prediction mode. In accordance with a second condition and in accordance with the techniques of this disclosure, filter unit 160 sets the value of bS to 4 if the samples $p_0$ and $q_0$ are both in frame MBs and either or both of the sample $p_0$ or $q_0$ is in an MB coded with VSPFlag equal to 1. In accordance with a third condition, filter unit 160 sets the value of bS to 4 if the samples $p_0$ and $q_0$ are both in frame MBs and either or both of the samples p0 or q0 is in an MB that is in a slice with slice_type equal to SP or SI. In accordance with a fourth condition, filter unit 160 sets the value of bS to 4 if MbaffFrameFlag is equal to 1 or field_pic_flag is equal to 1, verticalEdgeFlag is equal to 1, and either or both of the samples p0 or q0 is in an MB coded using an intra MB prediction mode. In accordance with a fifth condition and in accordance with the techniques of this disclosure, filter unit 160 sets the value of bS to 4 if MbaffFrameFlag is equal to 1 or field_pic_flag is equal to 1, and verticalEdgeFlag is equal to 1, and either or both of the samples $p_0$ or $q_0$ is in an MB coded with VSPFlag equal to 1. In accordance with a sixth condition, filter unit 160 may set the value of bS to 4 if MbaffFrameFlag is equal to 1 or field_pic_flag is equal to 1, verticalEdgeFlag is equal to 1, and either or both of the samples $p_0$ or $q_0$ is in an MB that is in a slice with slice_type equal to SP or SI.

Otherwise, in the third example deblocking filter process, if any of the following conditions are true, filter unit 160 sets the value of bS to 3. According to a first condition, filter unit 160 sets the value of bS to 3 if mixedModeEdgeFlag is equal to 0 and either or both of the samples $p_0$ or $q_0$ is in an MB coded using an Intra MB prediction mode. According to a second condition and in accordance with the techniques of this disclosure, filter unit 160 sets the value of bS to 3 if mixed ModeEdgeFlag is equal to 0 and either or both of the samples $p_0$ or $q_0$ is in an MB coded with VSPFlag equal to 1. According to a third condition, filter unit 160 sets the value of bS to 3 if mixedModeEdgeFlag is equal to 0 and either or both of the samples $p_0$ or $q_0$ is in an MB that is in a slice with slice_type equal to SP or SI. According to a fourth condition, filter unit 160 sets the value of bS to 3 if mixedModeEdgeFlag is equal to 1, verticalEdgeFlag is equal to 0, and either or both of the samples $p_0$ or $q_0$ is in an MB coded using an Intra MB prediction mode. According to a fifth condition and in accordance with the techniques of this disclosure, filter unit 160 sets the value of bS to 3 if mixedModeEdgeFlag is equal to 0, verticalEdgeFlag is equal to 0, and either or both of the samples $p_0$ or $q_0$ is in an MB coded with VSPFlag equal to 1. According to a sixth condition, filter unit 160 sets the value of bS to 3 if mixedModeEdgeFlag is equal to 1, verticalEdgeFlag is equal to 0, and either or both of the samples $p_0$ or $q_0$ is in an MB that is in a slice with slice_type equal to SP or SI.

Otherwise, in the third example deblocking filter process, filter unit 160 may set the value of bS to 2 if any of the conditions described above in the second example deblocking filter process are satisfied. Otherwise, filter unit 160 may set the value of bS to 1 if any of the conditions described above in the second example deblocking filter process are satisfied, except the second condition. Otherwise, filter unit 160 may set the value of bS to 0.

A second example implementation of the techniques of this disclosure uses different syntaxes and semantics than the first example described above. In the second example implementation, the syntax and semantics are changed such that the mb_skip_flag and skip_from_vsp_flag are conditionally and flexibly signaled. In this second example implementation, the syntax for the MB layer, MB prediction, and sub-MB prediction may be the same as in the first example implementation described above. However, in the second example implementation, the syntax and semantics of the slice data and the corresponding semantics may be different than in the first example implementation.

Table 6, below, is an example syntax for a slice data syntax structure in accordance with the second example implementation.

TABLE 6

| Slice data syntax | | |
|---|---|---|
| slice_data( ) { | C | Descriptor |
|   if( entropy_coding_mode_flag ) | | |
|     while( !byte_aligned( ) ) | | |
|       cabac_alignment_one_bit | 2 | f(1) |
|   CurrMbAddr = first_mb_in_slice * ( 1 + MbaffFrameFlag ) | | |
|   moreDataFlag = 1 | | |
|   prevMbSkipped = 0 | | |
|   do { | | |
|     if( slice_type != I && slice_type != SI ) | | |
|       if( !entropy_coding_mode_flag ) { | | |
|         mb_skip_run | 2 | ue(v) |
|         prevMbSkipped = ( mb_skip_run > 0 ) | | |
|         for( i=0; i<mb_skip_run; i++ ) | | |
|           CurrMbAddr = NextMbAddress( CurrMbAddr ) | | |
|         moreDataFlag = more_rbsp_data( ) | | |
|       } else { | | |
|         if(slice_vsp_flag && MbSkipFromVSPFlagLeft && | | |
|           MbSkipFromVSPFlagUp ) { | | |
|           if( VspRefExist ){ | | |
|             skip_from_vsp_flag | 2 | ae(v) |
|             moreDataFlag = !skip_from_vsp_flag | | |
|           } | | |
|           if( !skip_from_vsp_flag) { | | |
|             mb_skip_flag | 2 | ae(v) |
|             moreDataFlag = !mb_skip_flag | | |
|           } | | |
|         } else { | | |
|           mb_skip_flag | 2 | ae(v) |
|           if (slice_vsp_flag && !mb_skip_flag && VspRefExist) | | |
|             skip_from_vsp_flag | 2 | ae(v) |
|           moreDataFlag = !skip_from_vsp_flag && !mb_skip_flag | | |
|         } | | |
|       } | | |
|     if( moreDataFlag ) { | | |
|       if( MbaffFrameFlag && ( CurrMbAddr % 2 = = 0 || | | |
|         ( CurrMbAddr % 2 = = 1 && prevMbSkipped ) ) ) | | |
|         mb_field_decoding_flag | 2 | u(1) | ae(v) |
|       macroblock_layer( ) | 2 | 3 | 4 | |
|     } | | |
|     if( !entropy_coding_mode_flag ) | | |
|       moreDataFlag = more_rbsp_data( ) | | |
|     else { | | |
|       if( slice_type != I && slice_type != SI ) | | |

TABLE 6-continued

Slice data syntax

| slice_data( ) { | C | Descriptor |
|---|---|---|
|         prevMbSkipped = mb_skip_flag | | |
|       if( MbaffFrameFlag && CurrMbAddr % 2 = = 0 ) | | |
|         moreDataFlag = 1 | | |
|       else { | | |
|         end_of_slice_flag | 2 | ae(v) |
|         moreDataFlag = !end_of_slice_flag | | |
|       } | | |
|     } | | |
|     CurrMbAddr = NextMbAddress( CurrMbAddr ) | | |
|   } while( moreDataFlag ) | | |
| } | | |

In the example syntax of Table 6, and in accordance with the techniques of this disclosure, a slice data syntax structure for a slice may include a skip_from_vsp_flag syntax element for a current MB when VSP is enabled for the slice, a variable MbSkipFromVSPFlagLeft=1 and a variable MbSkipFromVSPFlagUp=1, and RefPicList0 or RefPicList1 includes a VSP picture. In other examples, slice data syntax structure for a slice may include a skip_from_vsp_flag syntax element for a current MB when a variable MbSkipFromVSPFlagLeft=1 and a variable MbSkipFromVSPFlagUp=1, and RefPicList0 or RefPicList1 includes a VSP picture. For instance, the slice data syntax structure may include the skip_from_vsp_flag when slice_vsp_flag=1, MbSkipFromVSPFlagLeft=1, MbSkipFromVSPFlagUp=1 and VspRefExist=1. In some examples, MbSkipFromVSPFlagLeft and MbSkipFromVSPFlagUp may be set to the values of the skip_from_vsp_flag of the left and above available MBs, respectively. In an alternative example, MbSkipFromVSPFlagLeft is set to the 1 if any of the available blocks in the left MB has VSPFlag equal to 1. In this example, MbSkipFromVSPFlagUp is set to the 1, if any of the available blocks in the above MB has VSPFlag equal to 1. In another alternative example, MbSkipFromVSPFlagLeft is set to 1 if both left 8×8 blocks are available and have VSPFlag equal to 1. In this example, MbSkipFromVSPFlagUp is set to 1 if both above 8×8 blocks are available and have VSPFlag equal to 1.

The skip_from_vsp_flag for a current MB indicates whether the whole current MB is predicted from a VSP picture, the current MB is associated with luma and/or chroma transform coefficient blocks that include non-zero transform coefficient levels, and the mb_type syntax element for the current MB is present. For example, skip_from_vsp_flag equal to 1 indicates that the whole current MB is predicted from a VSP picture and CodedBlockPatternLuma and CodedBlockPatternChroma are set to 0, and mb_type is not present. When skip_from_vsp_flag is equal to 0, the current MB is not predicted from a VSP picture or at least one of CodedBlockPatternLuma and CodedBlockPatternChroma is not equal to 0. Alternatively, when skip_from_vsp_flag is equal to 0, the current MB is predicted using normal skip mode. When skip_from_vsp_flag is not present, skip_from_vsp_flag may be inferred to be equal to 0. In some alternate examples, when skip_from_vsp_flag is equal to 1, mb_skip_flag, regardless of whether mb_skip_flag is present or not, may be inferred to be equal to 1.

In the example syntax of Table 6, mb_skip_flag equal to 1 specifies that for the current MB, when decoding a P or SP slice, mb_type shall be inferred to be P_Skip and the MB type is collectively referred to as P MB type, or for which, when decoding a B slice, mb_type shall be inferred to be B_Skip and the MB type is collectively referred to as B MB type. mb_skip_flag equal to 0 specifies that the current MB is not skipped.

Furthermore, in the example syntax of Table 6, a variable moreDataFlag is equal to 1 if skip_from_vsp_flag is equal to 0 and mb_skip_flag is equal to 0 (i.e., moreDataFlag=!skip_from_vsp_flag && !mb_skip_flag). If moreDataFlag is equal to 1, the slice data syntax structure may include a macroblock layer syntax structure for the current MB. In other examples, moreDataFlag may be equal to 1 if mb_skip_flag is equal to 0 (i.e., moreDataFlag=!mb_skip_flag).

In the second example implementation, an entropy coder, such as entropy encoding unit 118 or entropy decoding unit 150, may perform an entropy coding process similar to the entropy coding process described with regard to the first example implementation. Alternatively, in the second example implementation, the entropy coder may perform different context initialization and different context selection operations than those described above with regard to the first example implementation.

For instance, in the second example implementation, the entropy coder may use two set of contexts, one for skip_from_vsp_flag and the other for vsp_mb_flag, mb_part_vsp_flag and sub_mb_vsp_flag. During the context initiation operation, the entropy coder may initialize the initial probabilities of the contexts of vsp_mb_flag, mb_part_vsp_flag, or sub_mb_vsp_flag with different values for P slices and B slices. VSP mode may apply for both P slices and B slices. Furthermore, the entropy encoder may initialize the initial probabilities for the context of skip_from_vsp_flag of P slices differently from that of the B slices.

In the second example implementation, when the entropy coder is entropy coding an mb_part_vsp_flag, a sub_mb_vsp_flag, a vsp_mb_flag, or a skip_from_vsp_flag, the entropy coder may determine a ctxIdxInc for a bin associated with one of these syntax elements. The entropy coder may determine the ctxIdxInc for the bin based at least in part on condTermFlagA and condTermFlagB. In various examples, the entropy coder may determine the ctxIdxInc for the bin such that ctxIdxInc=condTermFlagA+condTermFlagB, such that ctxIdxInc=condTermFlagA, or such that ctxIdxInc=condTermFlagB. In the second example implementation, the entropy coder may determine condTermFlagA and condTermFlagB based at least in part on whether data associated with particular blocks that neighbor a current MB or MB partition are available for use in the entropy coding process for syntax elements associated with the current MB or MB partition.

For example, in the second example implementation, if the entropy coder is coding an mb_part_vsp_flag, a sub_mb_vsp_flag, a vsp_mb_flag syntax element, mbPAddrA may denote the neighboring 8×8 block to the left of the current MB or MB partition and mbPAddrB may denote the neighboring 8×8 block above the current MB or MB partition. In this example, if mbPAddrA is not available or NonSkipVSPFlag for mbPAddrA is equal to 0, condTermFlagA is equal to 0. In this example, NonSkipVSPFlag may be either the vsp_mb_flag, mb_part_vsp_flag, or sub_mb_vsp_flag depending on the syntax element to be coded. Otherwise, if mbPAddrA is available and NonSkipVSPFlag for mbPAddrA is equal to 1, condTermFlagA is equal to 1. Similarly, if mbPAddrB is not available or NonSkipVSPFlag for mbPAddrB is equal to 0, condTermFlagB is equal to 0. If mbPAddrB is available and NonSkipVSPFlag for mbPAddrB is equal to 1, condTermFlagB is equal to 1.

Furthermore, in the second example implementation, if the entropy coder is coding a skip_from_vsp_flag syntax element, mbPAddrA may denote the neighboring 8×8 block to the left of the current MB or MB partition and mbPAddrB may denote the neighboring 8×8 block above the current MB or MB partition. In this example, if mbPAddrA is available and the skip_from_vsp_flag for mbPAddrA is equal to 0, condTermFlagA may be equal to 1. Otherwise, if mbPAddrA is not available or the skip_from_vsp_flag for mbPAddrA is equal to 1, condTermFlagA may be equal to 0. Similarly, if mbPAddrB is available and the skip_from_vsp_flag for mbPAddrB is equal to 0, condTermFlagB may be equal to 1. Otherwise, if mbPAddrB is not available or the skip_from_vsp_flag for mbPAddrB is equal to 1, condTermFlagB may be equal to 0.

In another example where the entropy coder is coding a skip_from_vsp_flag, if mbPAddrA is available and the skip_from_vsp_flag for mbPAddrA is equal to 1, condTermFlagA may be equal to 1. Otherwise, if mbPAddrA is not available or the skip_from_vsp_flag for mbPAddrA is equal to 0, condTermFlagA may be equal to 0. Similarly, if mbPAddrB is available and the skip_from_vsp_flag for mbPAddrB is equal to 1, condTermFlagB may be equal to 1. Otherwise, if mbPAddrB is not available or the skip_from_vsp_flag for mbPAddrB is equal to 0, condTermFlagB may be equal to 0.

In another example where the entropy coder is coding a skip_from_vsp_flag, if mbPAddrA is available and the vsp_mb_flag for mbPAddrA is equal to 0, condTermFlagA may be equal to 1. Otherwise, if mbPAddrA is not available or the vsp_mb_flag for mbPAddrA is equal to 1, condTermFlagA may be equal to 0. Similarly, if mbPAddrB is available and the vsp_mb_flag for mbPAddrB is equal to 0, condTermFlagB may be equal to 1. Otherwise, if mbPAddrB is not available or the vsp_mb_flag for mbPAddrB is equal to 1, condTermFlagB may be equal to 0.

In other examples, the entropy coder may determine condTermFlagA and condTermFlagB from both skip_from_vsp_flag and vsp_mb_flag. In another example, the entropy coder may determine condTermFlagA and condTermFlagB from vsp_mb_flag.

In a third example implementation of the techniques of this disclosure, the syntax for the MB layer, sub-MB prediction, and slice data may be the same as in the first example implementation described above. However, in the third example implementation, the syntax may be further optimized based on various situations. For example, the syntax and semantics of the MB prediction syntax structure and the corresponding semantics may be different than in the first example implementation. Table 7, below, is an example syntax for slice data in accordance with the third example implementation.

TABLE 7

Macroblock prediction syntax

| mb_pred( mb_type ) { | C | Descriptor |
|---|---|---|
|   if( MbPartPredMode( mb_type, 0 ) = = Intra_4x4 \|\| | | |
|     MbPartPredMode( mb_type, 0 ) = = Intra_16x16 ) { | | |
|     if( MbPartPredMode( mb_type, 0 ) = = Intra_4x4 ) | | |
|       for( luma4x4BlkIdx=0; luma4x4BlkIdx<16; luma4x4BlkIdx++ ) { | | |
|         prev_intra4x4_pred_mode_flag[ luma4x4BlkIdx ] | 2 | u(1) \| ae(v) |
|         if( !prev_intra4x4_pred_mode_flag[ luma4x4BlkIdx ] ) | | |
|           rem_intra4x4_pred_mode[ luma4x4BlkIdx ] | 2 | u(3) \| ae(v) |
|       } | | |
|     intra_chroma_pred_mode | 2 | ue(v) \| ae(v) |
|   } else if( MbPartPredMode( mb_type, 0 ) != Direct ) { | | |
|     for( mbPartIdx = 0; mbPartIdx < NumMbPart( mb_type ); mbPartIdx++) | | |
|       if (slice_vsp_flag && NumMbPart( mb_type ) != 1 && VspRefExist) | | |
| //vsp_mb_flag is not 1 | | |
|         mb_part_vsp_flag[ mbPartIdx ] | 2 | ae(v) |
|       if(!mb_part_vsp_flag[ mbPartIdx ] &&( num_ref_idx_l0_active_minus1 > 0 \|\| | | |
|         mb_field_decoding_flag ) && | | |
|         MbPartPredMode( mb_type, mbPartIdx ) != Pred_L1 ) | | |
|         ref_idx_l0[ mbPartIdx ] | 2 | te(v) \| ae(v) |
|     for(!mb_part_vsp_flag[ mbPartIdx ] &&( mbPartIdx = 0; mbPartIdx < NumMbPart( mb_type ); mbPartIdx++) | | |
|       if( ( num_ref_idx_l1_active_minus1 > 0 \|\| | | |
|         mb_field_decoding_flag ) && | | |
|         MbPartPredMode( mb_type, mbPartIdx ) != Pred_L0 ) | | |
|         ref_idx_l1[ mbPartIdx ] | 2 | te(v) \| ae(v) |
|     for( mbPartIdx = 0; mbPartIdx < NumMbPart( mb_type ); mbPartIdx++) | | |
|       if(!mb_part_vsp_flag[ mbPartIdx ] &&( MbPartPredMode | | |
| ( mb_type, mbPartIdx ) != Pred_L1 ) | | |
|         for( compIdx = 0; compIdx < 2; compIdx++ ) | | |
|           mvd_l0[ mbPartIdx ][ 0 ][ compIdx ] | 2 | se(v) \| ae(v) |
|     for( mbPartIdx = 0; mbPartIdx < NumMbPart( mb_type ); mbPartIdx++) | | |
|       if(!mb_part_vsp_flag[ mbPartIdx ] &&( | | |
| MbPartPredMode( mb_type, mbPartIdx ) != Pred_L0 ) | | |

TABLE 7-continued

Macroblock prediction syntax

| mb_pred( mb_type ) { | C | Descriptor |
|---|---|---|
|     for( compIdx = 0; compIdx < 2; compIdx++ ) | | |
|         mvd_l1[ mbPartIdx ][ 0 ][ compIdx ] | 2 | se(v) \| ae(v) |
|   } | | |
| } | | |

Table 7 is similar to Table 4, above. However, the example syntax of Table 7 indicates "for(!mb_part_vsp_flag[mb-PartIdx] &&(mbPartIdx=0; mbPartIdx<NumMbPart(mb_type); mbPartIdx++)" instead of "for (mbPartIdx=0; mbPartIdx<NumMbPart(mb_type) && !mb_part_vsp_flag[mbPartIdx]; mbPartIdx++)" in the loop for generating/decoding ref_idx_l1 syntax elements. In other examples, the MB prediction syntax structure may include the mb_part_vsp_flag[mbPartIdx] if slice_vsp_flag && NumMbPart(mb_type) !=1 && MbPartPredMode(mb_type, mbPartIdx)==Pred_L0.

A fourth example implementation of the techniques of this disclosure may be similar to the second example implementation described above. However, in the fourth example implementation, the syntax design of the MB layer, MB prediction, and sub-MB prediction may be changed relative to that of the second example implementation. Table 8, below, is an example syntax of the MB layer syntax structure in accordance with the fourth example implementation.

TABLE 8

Macroblock layer syntax

| macroblock_layer( ) { | C | Descriptor |
|---|---|---|
|   if(slice_vsp_flag && MbVSPFlagLeft && bMbVSPFlagUp){ | | |
|     if(VspRefExist) | | |
|       vsp_mb_flag | 2 | ae(v) |
|     if (! vsp_mb_flag ) | | |
|       mb_type | 2 | ue(v) \| ae(v) |
|   } | | |
|   else { | | |
|     mb_type | 2 | ue(v) \| ae(v) |
|     if (slice_vsp_flag && VspRefExist && (mb_type = = B_L0_16x16 \|\| | | |
|       mb_type == P_L0_16x16)) | | |
|       vsp_mb_flag | 2 | ae(v) |
|   } | | |
|   if( mb_type = = I_PCM ) { | | |
|     while( !byte_aligned( ) ) | | |
|       pcm_alignment_zero_bit | 3 | f(1) |
|     for( i = 0; i < 256; i++ ) | | |
|       pcm_sample_luma[ i ] | 3 | u(v) |
|     for( i = 0; i < 2 * MbWidthC * MbHeightC; i++ ) | | |
|       pcm_sample_chroma[ i ] | 3 | u(v) |
|   } else { | | |
|     noSubMbPartSizeLessThan8x8Flag = 1 | | |
|     if( mb_type != I_NxN && | | |
|       MbPartPredMode( mb_type, 0 ) != Intra_16x16 && | | |
|       NumMbPart( mb_type ) = = 4 ) { | | |
|       if ( !vsp_mb_flag ) | | |
|         sub_mb_pred( mb_type ) | 2 | |
|       for( mbPartIdx = 0; mbPartIdx < 4; mbPartIdx++ ) | | |
|         if( sub_mb_type[ mbPartIdx ] != B_Direct_8x8 ) { | | |
|           if( NumSubMbPart( sub_mb_type[ mbPartIdx ] ) > 1 ) | | |
|             noSubMbPartSizeLessThan8x8Flag = 0 | | |
|         } else if( !direct_8x8_inference_flag ) | | |
|           noSubMbPartSizeLessThan8x8Flag = 0 | | |
|     } else { | | |
|       if(transform_8x8_mode_flag && mb_type = = I_NxN ) | | |
|         transform_size_8x8_flag | 2 | u(1) \| ae(v) |
|       if ( !vsp_mb_flag ) | | |
|         mb_pred( mb_type ) | 2 | |
|     } | | |
|     if( MbPartPredMode( mb_type, 0 ) != Intra_16x16 ) { | | |
|       coded_block_pattern | 2 | me(v) \| ae(v) |
|       if( CodedBlockPatternLuma > 0 && | | |
|         transform_8x8_mode_flag && mb_type != I_NxN && | | |
|         noSubMbPartSizeLessThan8x8Flag && | | |
|         (vsp_mb_flag \|\| (!vsp_mb_flag && (mb_type != B_Direct_16x16 | | |
|     \|\| direct_8x8_inference_flag)) ) ) | | |
|         transform_size_8x8_flag | 2 | u(1) \| ae(v) |
|     } | | |
|     if( CodedBlockPatternLuma > 0 \|\| CodedBlockPatternChroma > 0 \|\| | | |

TABLE 8-continued

Macroblock layer syntax

| macroblock_layer( ) { | C | Descriptor |
|---|---|---|
|     MbPartPredMode( mb_type, 0 ) = = Intra_16x16 ) { | | |
|     mb_qp_delta | 2 | se(v) \| ae(v) |
|     residual( 0, 15 ) | 3 \| 4 | |
|     } | | |
|   } | | |
| } | | |

In the example of Table 8, the content of an MB layer syntax structure depends on variables MbVSPFlagLeft and MbVSPFlagUp. MbVSPFlagLeft and MbVSPFlagUp may be set to the value of the vsp_mb_flag of the MBs that are to the left of and above the current MB, respectively. Alternatively, MbVSPFlagLeft and MbVSPFlagUp may be set to the greater of skip_from_vsp_flag and vsp_mb_flag for the MBs that are to the left of and above the current MB, respectively. That is, MbVSPFlagLeft may be set to max (skip_from_vsp_flag, vsp_mb_flag) of the left MB and MbVSPFlagUp may be set to max(skip_from_vsp_flag, vsp_mb_flag) of the above MB. In another alternative example, MbVSPFlagLeft is set to 1 if any available blocks to the left of the current MB have a VSPFlag equal to 1. In this example, MbVSPFlagUp may be set to 1 if any available blocks above the current MB have a VSPFlag equal to 0. In yet another example, MbVSPFlagLeft is set to 1 if both 8×8 blocks to the left of the current MB are available for use in coding of the current MB and have VSPFlags equal to 1. In this example, MbVSPFlagUp is set to 1 if both 8×8 block above the current MB are available for use in coding of the current MB and have VSPFlags equal to 1.

In the example of Table 8, the MB layer syntax structure may include vsp_mb_flag if slice_vsp_flag is equal to 1, MbVSPFlagLeft is equal to 1, and bMbVSPFlagUp is equal to 1 and VspRefExist is equal to 1. If slice_vsp_flag is equal to 1, MbVSPFlagLeft is equal to 1, and bMbVSPFlagUp is equal to 1 and VspRefExist is not equal to 1, the MB layer syntax structure may include mb_type. In other examples, the MB layer syntax structure may include vsp_mb_flag if MbVSPFlagLeft is equal to 1, and bMbVSPFlagUp is equal to 1 and VspRefExist is equal to 1. If MbVSPFlagLeft is equal to 1, bMbVSPFlagUp is equal to 1 and VspRefExist is not equal to 1, the MB layer syntax structure may include mb_type.

Moreover, in the example of Table 8, the MB layer syntax structure may include vsp_mb_flag if slice_vsp_flag && VspRefExist && (mb_type==B_L0_16×16|| mb_type==P_L0_16×16). In other examples, the MB layer syntax structure may include vsp_mb_flag if mb_type== (B_L0_16×16|| mb_type==P_L0_16×16).

Furthermore, the fourth example implementation, the syntax of the MB prediction syntax structure may be the same as shown in Table 7, above. However, in some examples, the MB prediction syntax structure may include mb_part_vsp_flag[mbPartIdx] if (slice_vsp_flag && NumMbPart(mb_type) !=1 and MbPartPredMode(mb_type, mbPartIdx)==Pred_L0. Table 9, below, shows an example sub-MB prediction syntax used in the fourth example implementation.

TABLE 9

Sub-macroblock prediction syntax

| sub_mb_pred( mb_type ) { | C | Descriptor |
|---|---|---|
|   for( mbPartIdx = 0; mbPartIdx < 4; mbPartIdx++ ) { | | |
|     if (slice_vsp_flag){ // vsp_mb_flag is not 1 | | |
|       if( SubMbVSPFlagLeft && SubMbVSPFlagUp){ | | |
|         if(VspRefExist) | | |
|           sub_mb_vsp_flag[ mbPartIdx ] | 2 | ae(v) |
|         if (!sub_mb_vsp_flag[ mbPartIdx ]) | | |
|           sub_mb_type[ mbPartIdx ] | 2 | ue(v) \| ae(v) |
|       } else { | | |
|         sub_mb_type[ mbPartIdx ] | 2 | ae(v) |
|         if (slice_vsp_flag && VspRefExist && | | |
|           (NumSubMbPart (sub_mb_type[ mbPartIdx ]) = = 1 \|\| | | |
|           sub_mb_type[mbPartIdx ] = = B_Direct_8x8 ) ) | | |
|           sub_mb_vsp_flag[ mbPartIdx ] | 2 | ae(v) |
|       } | | |
|   } | | |
|   for( mbPartIdx = 0; mbPartIdx < 4; mbPartIdx++ ) | | |
|     if(!sub_mb_vsp_flag[ mbPartIdx ]) &&( num_ref_idx_l0_active_minus1 > | | |
| 0 \| \| mb_field_decoding_flag ) && | | |
|       mb_type != P_8x8ref0 && | | |
|       sub_mb_type[ mbPartIdx ] != B_Direct_8x8 && | | |
|       SubMbPredMode( sub_mb_type[ mbPartIdx ] ) != Pred_L1 ) | | |
|       ref_idx_l0[ mbPartIdx ] | 2 | te(v) \| ae(v) |
|   for( mbPartIdx = 0; mbPartIdx < 4; mbPartIdx++ ) | | |
|     if( !sub_mb_vsp_flag[ mbPartIdx ]) && (num_ref_idx_l1_active_minus1 | | |
| > 0 \| \| mb_field_decoding_flag ) && | | |
|       sub_mb_type[ mbPartIdx ] != B_Direct_8x8 && | | |
|       SubMbPredMode( sub_mb_type[ mbPartIdx ] ) != Pred_L0 ) | | |
|       ref_idx_l1[ mbPartIdx ] | 2 | te(v) \| ae(v) |
|   for( mbPartIdx = 0; mbPartIdx < 4; mbPartIdx++ ) | | |

TABLE 9-continued

Sub-macroblock prediction syntax

| sub_mb_pred( mb_type ) { | C | Descriptor |
|---|---|---|
|     if(!sub_mb_vsp_flag[ mbPartIdx]) &&( sub_mb_type[ mbPartIdx ] != B_Direct_8x8 && | | |
|         SubMbPredMode( sub_mb_type[ mbPartIdx ] ) != Pred_L1 ) | | |
|           for( subMbPartIdx = 0; | | |
|             subMbPartIdx < NumSubMbPart( sub_mb_type[ mbPartIdx ] ); | | |
|             subMbPartIdx++) | | |
|             for( compIdx = 0; compIdx < 2; compIdx++ ) | | |
|               mvd_l0[ mbPartIdx ][ subMbPartIdx ][ compIdx ] | 2 | se(v) \| ae(v) |
|     for( mbPartIdx = 0; mbPartIdx < 4; mbPartIdx++ ) | | |
|         if(!sub_mb_vsp_flag[ mbPartIdx ]) &&sub_mb_type[ mbPartIdx ] != B_Direct_8x8 && | | |
|         SubMbPredMode( sub_mb_type[ mbPartIdx ] ) != Pred_L0 ) | | |
|           for( subMbPartIdx = 0; | | |
|             subMbPartIdx < NumSubMbPart( sub_mb_type[ mbPartIdx ] ); | | |
|             subMbPartIdx++) | | |
|             for( compIdx = 0; compIdx < 2; compIdx++ ) | | |
|               mvd_l1[ mbPartIdx ][ subMbPartIdx ][ compIdx ] | 2 | se(v) \| ae(v) |
| } | | |

In the example of Table 9, variables SubMbVSPFlagLeft and SubMbVSPFlagUp control the content of the sub-MB prediction. SubMbVSPFlagLeft and SubMbVSPFlagUp are set to the value of the sub_mb_vsp_flag of the left 8×8 and above 8×8 blocks, respectively. The left 8×8 block is to the left of the current sub-MB partition. The above 8×8 block is above the current sub-MB partition. In particular, in the example syntax of Table 9, the sub-MB prediction syntax structure may include sub_mb_vsp_flag for a sub-MB partition when SubMBVspFlagLeft and SubMBVspFlagUp are equal to 1 and RefPicList0 or RefPicList1 includes a VSP picture (e.g., VspRefExist=1). The sub_mb_vsp_flag for the sub-MB partition indicates whether the sub-MB partitions are predicted from a VSP. Furthermore, in the example syntax of Table 9, the sub-MB prediction syntax structure may include sub_mb_type for a sub-MB partition when sub_mb_vsp_flag for the sub-MB partition indicates that the sub-MB partition is not predicted from a VSP.

Furthermore, in the example syntax of Table 9, if either SubMbVSPFlagLeft or SubMbVSPFlagUp is not equal to 1, the sub-MB prediction syntax structure may include a sub_mb_vsp_flag for a sub-MB partition when VSP is enabled for a slice, RefPicList0 or RefPicList1 includes a VSP picture, and the number of sub-MB partitions of the sub-MB partition is 1 or the sub-MB type of the sub-MB partition is B_direct_8x8. If the sub-MB type of the sub-MB partition is B_direct_8x8, the sub-MB partition is bi-directionally inter predicted and partitioned into 8×8 blocks.

In another example, subMbVSPFlagLeft and SubMb-VSPFlagUp may be set to the value of the VSPFlag of the left 8×8 and above 8×8 blocks, if available for use in coding the current sub-MB partition, respectively.

Furthermore, in an alternate version of Table 9, the sub-MB prediction syntax structure may include sub_mb_vsp_flag[mbPartIdx] if sub_mb_type[mbPartIdx]==P_L0_8×8 or sub_mb_type[mbPartIdx]==B_L0_8×8.

A fifth example implementation of the techniques of this disclosure is similar to the first example implementation described above. In this fifth example implementation, mb_skip_flag and skip_from_vsp_flag may be combined into one syntax element. As indicated above, mb_skip_flag indicates whether the skip mode is used. skip_from_vsp_flag indicates that when skip mode is used, the whole MB is predicted from a VSP picture. Thus, in the fifth example implementation, the combined flag indicates whether skip mode is used, and if skip mode is used, that the whole MB is predicted from a VSP picture.

A sixth example implementation of the techniques of this disclosure is similar to the second example implementation described above. However, in the sixth example implementation, the MB layer syntax structures and the MB prediction syntax structures may be defined according to the syntaxes of Tables 10 and 11, below.

TABLE 10

Macroblock layer syntax structure

| macroblock_layer( ) { | C | Descriptor |
|---|---|---|
|     mb_type | 2 | ue(v) \| ae(v) |
|     if( mb_type = = B_Direct_16x16 && slice_vsp_flag && VspRefExist) | | |
|         vsp_direct_flag | | |
|     if( mb_type = = I_PCM ) { | | |
|         while( !byte_aligned( ) ) | | |
|             pcm_alignment_zero_bit | 3 | f(1) |
|         for( i = 0; i < 256; i++ ) | | |
|             pcm_sample_luma[ i ] | 3 | u(v) |
|         for( i = 0; i < 2 * MbWidthC * MbHeightC; i++ ) | | |
|             pcm_sample_chroma[ i ] | 3 | u(v) |
|     } else { | | |
|         noSubMbPartSizeLessThan8x8Flag = 1 | | |
|         if( mb_type != I_NxN && | | |
|             MbPartPredMode( mb_type, 0 ) != Intra_16x16 && | | |
|             NumMbPart( mb_type ) = = 4 ) { | | |

TABLE 10-continued

Macroblock layer syntax structure

| macroblock_layer( ) { | C | Descriptor |
|---|---|---|
|       sub_mb_pred( mb_type ) | 2 | |
|       for( mbPartIdx = 0; mbPartIdx < 4; mbPartIdx++ ) | | |
|         if( sub_mb_type[ mbPartIdx ] != B_Direct_8x8 ) { | | |
|           if( NumSubMbPart( sub_mb_type[ mbPartIdx ] ) > 1 ) | | |
|             noSubMbPartSizeLessThan8x8Flag = 0 | | |
|         } else if( !direct_8x8_inference_flag ) | | |
|           noSubMbPartSizeLessThan8x8Flag = 0 | | |
|     } else { | | |
|       if(transform_8x8_mode_flag && mb_type = = I_NxN ) | | |
|         transform_size_8x8_flag | 2 | u(1) \| ae(v) |
|       mb_pred( mb_type ) | 2 | |
|     } | | |
|     if( MbPartPredMode( mb_type, 0 ) != Intra_16x16 ) { | | |
|       coded_block_pattern | 2 | me(v) \| ae(v) |
|       if( CodedBlockPatternLuma > 0 && | | |
|         transform_8x8_mode_flag && mb_type != I_NxN && | | |
|         noSubMbPartSizeLessThan8x8Flag && | | |
|         (vsp_direct_flag\|\|(!vsp_direct_flag && (mb_type != | | |
| B_Direct_16x16 \| \| direct_8x8_inference_flag)) ) ) | | |
|         transform_size_8x8_flag | 2 | u(1) \| ae(v) |
|     } | | |
|     if( CodedBlockPatternLuma > 0 \| \| CodedBlockPatternChroma > 0 \| \| | | |
|       MbPartPredMode( mb_type, 0 ) = = Intra_16x16 ) { | | |
|       mb_qp_delta | 2 | se(v) \| ae(v) |
|       residual( 0, 15 ) | 3 \| 4 | |
|     } | | |
|   } | | |
| } | | |

TABLE 11

Macroblock prediction syntax

| mb_pred( mb_type ) { | C | Descriptor |
|---|---|---|
|   if( MbPartPredMode( mb_type, 0 ) = = Intra_4x4 \|\| | | |
|     MbPartPredMode( mb_type, 0 ) = = Intra_16x16 ) { | | |
|     if( MbPartPredMode( mb_type, 0 ) = = Intra_4x4 ) | | |
|       for( luma4x4BlkIdx=0; luma4x4BlkIdx<16; luma4x4BlkIdx++ ) { | | |
|         prev_intra4x4_pred_mode_flag[ luma4x4BlkIdx ] | 2 | u(1) \| ae(v) |
|         if( !prev_intra4x4_pred_mode_flag[ luma4x4BlkIdx ] ) | | |
|           rem_intra4x4_pred_mode[ luma4x4BlkIdx ] | 2 | u(3) \| ae(v) |
|       } | | |
|     intra_chroma_pred_mode | 2 | ue(v) \| ae(v) |
|   } else if( MbPartPredMode( mb_type, 0 ) != Direct ) { | | |
|     for( mbPartIdx = 0; mbPartIdx < NumMbPart( mb_type ); mbPartIdx++) | | |
|       if (slice_vsp_flag && VspRefExist) | | |
|         mb_part_vsp_flag[ mbPartIdx ] | 2 | ae(v) |
|       if(!mb_part_vsp_flag[ mbPartIdx ] &&( | | |
| num_ref_idx_l0_active_minus1 > 0 \| \| | | |
|         mb_field_decoding_flag ) && | | |
|         MbPartPredMode( mb_type, mbPartIdx ) != Pred_L1 ) | | |
|         ref_idx_l0[ mbPartIdx ] | 2 | te(v) \| ae(v) |
|     for(!mb_part_vsp_flag[ mbPartIdx ] &&( mbPartIdx = 0; mbPartIdx < | | |
| NumMbPart( mb_type ); mbPartIdx++) | | |
|       if( ( num_ref_idx_l1_active_minus1 > 0 \| \| | | |
|         mb_field_decoding_flag ) && | | |
|         MbPartPredMode( mb_type, mbPartIdx ) != Pred_L0 ) | | |
|         ref_idx_l1[ mbPartIdx ] | 2 | te(v) \| ae(v) |
|     for( mbPartIdx = 0; mbPartIdx < NumMbPart( mb_type ); mbPartIdx++) | | |
|       if(!mb_part_vsp_flag[ mbPartIdx ] &&( MbPartPredMode | | |
| ( mb_type, mbPartIdx ) != Pred_L1 ) | | |
|         for( compIdx = 0; compIdx < 2; compIdx++ ) | | |
|           mvd_l0[ mbPartIdx ][ 0 ][ compIdx ] | 2 | se(v) \| ae(v) |
|     for( mbPartIdx = 0; mbPartIdx < NumMbPart( mb_type ); mbPartIdx++) | | |
|       if(!mb_part_vsp_flag[ mbPartIdx ] &&( | | |
| MbPartPredMode( mb_type, mbPartIdx ) != Pred_L0 ) | | |
|         for( compIdx = 0; compIdx < 2; compIdx++ ) | | |
|           mvd_l1[ mbPartIdx ][ 0 ][ compIdx ] | 2 | se(v) \| ae(v) |
|   } | | |
| } | | |

In the example syntax of Table 10, the MB layer syntax structure for an MB of a slice may include a vsp_direct_flag syntax element if the type of the MB is B_Direct_16×16 and VSP is enabled for the slice and RefPicList0 or RefPicList1 includes a VSP picture. If the type of MB is B_Direct_16×16, the MB is in a B slice, is coded in direct mode (i.e., no motion information is signaled, but residual information is signaled), and the MB is not partitioned into smaller MB partitions. The vsp_direct_flag may indicate whether the MB is predicted from a VSP picture. For example, vsp_direct_flag equal to 1 may indicate the MB with B_direct_16×16 mode is predicted from the VSP frame and vsp_direct_flag equal to 0 may indicate the original B_direct_16×16 mode is used. Furthermore, as shown in Table 10, the vsp_direct_flag may at least partially control whether the MB layer syntax structure includes a transform_size_8×8_flag syntax element. The CABAC coding process for vsp_direct_flag may be the same as the CABAC coding process for mb_direct_type_flag in 3D-AVC Working Draft 1.

In the example of Table 11, the MB prediction syntax structure may include mb_part_vsp_flag[mbPartIdx] if slice_vsp_flag is equal to 1 and VspRefExist is equal to 1. In other examples, the MB prediction syntax structure may include mb_part_vsp_flag[mbPartIdx] if slice_vsp_flag is equal to 1.

A seventh example implementation of the techniques of this disclosure provide for a combined syntax element that indicates whether an MB is encoded in skip mode and, if so, whether the MB is to be decoded based on a VSP picture. In the seventh example implementation, slice data syntax structures may conform to the syntax of Table 12, below.

TABLE 12

Slice data syntax

| slice_data( ) { | C | Descriptor |
|---|---|---|
|   if( entropy_coding_mode_flag ) | | |
|     while( !byte_aligned( ) ) | | |
|       cabac_alignment_one_bit | 2 | f(1) |
|   CurrMbAddr = first_mb_in_slice * ( 1 + MbaffFrameFlag ) | | |
|   moreDataFlag = 1 | | |
|   prevMbSkipped = 0 | | |
|   do { | | |
|     if( slice_type != I && slice_type != SI ) | | |
|       if( !entropy_coding_mode_flag ) { | | |
|         mb_skip_run | 2 | ue(v) |
|         prevMbSkipped = ( mb_skip_run > 0 ) | | |
|         for( i=0; i<mb_skip_run; i++ ) | | |
|           CurrMbAddr = NextMbAddress( CurrMbAddr ) | | |
|         moreDataFlag = more_rbsp_data( ) | | |
|       } else { | | |
|         if( slice_vsp_enable && VspRefExist) { | | |
|           mb_skip_idc | 2 | ae(v) |
|           moreDataFlag = (mb_skip_idc>1) | | |
|         }else{ | | |
|           mb_skip_flag | 2 | ae(v) |
|           moreDataFlag = !mb_skip_flag | | |
|         } | | |
|       } | | |
|     if( moreDataFlag ) { | | |
|       if( MbaffFrameFlag && ( CurrMbAddr % 2 == 0 \|\| | | |
|         ( CurrMbAddr % 2 == 1 && prevMbSkipped ) ) ) | | |
|         mb_field_decoding_flag | 2 | u(1) \| ae(v) |
|       macroblock_layer( ) | 2 \| 3 \| 4 | |
|     } | | |
|     if( !entropy_coding_mode_flag ) | | |
|       moreDataFlag = more_rbsp_data( ) | | |
|     else { | | |
|       if( slice_type != I && slice_type != SI ) | | |
|         prevMbSkipped = mb_skip_flag | | |
|       if( MbaffFrameFlag && CurrMbAddr % 2 == 0 ) | | |
|         moreDataFlag = 1 | | |
|       else { | | |
|         end_of_slice_flag | 2 | ae(v) |
|         moreDataFlag = !end_of_slice_flag | | |
|       } | | |
|     } | | |
|     CurrMbAddr = NextMbAddress( CurrMbAddr ) | | |
|   } while( moreDataFlag ) | | |
| } | | |

In the example syntax of Table 12, a slice data syntax structure for a slice may include an mb_skip_idc syntax element if VSP is enabled for the slice and a VSP reference picture exists for the slice. In one example, if the mb_skip_idc syntax element is equal to 0, the current MB is skipped from a VSP picture. This means that no motion or residue is signaled for the current MB. The current MB is the MB to which the mb_skip_idc syntax element applies. In this example, if the mb_skip_idc syntax element is equal to 1, the current MB is encoded using normal skip mode. In other words, the current MB is not skipped from a VSP picture.

Furthermore, in this example, if the mb_skip_idc syntax element is equal to 2, the current MB is not coded using skip mode.

In some examples, the mb_skip_idc syntax element may have additional values. For instance, in one example, if the mb_skip_idc syntax element is equal to 2, the current MB is totally predicted from a VSP picture and thus no motion information for the current MB is signaled but residue information for the current MB may be signaled. In another example, if the mb_skip_idc syntax element is equal to 3, the disclosure, the additional mode of indicating a whole MV is predicted from VSP but the residue is still transmitted can be signaled in the MB.

In another example, if the mb_skip_idc syntax element is equal to 1, the current MB is skipped from a VSP picture. In this example, no motion or residue information is signaled for the current MB. Furthermore, in this example, if the mb_skip_idc syntax element is equal to 0, the current MB is coded in a normal skip mode.

In addition, the MB layer syntax structures for MBs may conform to the syntax of Table 13, below.

TABLE 13

| Macroblock layer syntax | C | Descriptor |
|---|---|---|
| macroblock_layer( ) { | | |
|   if (slice_vsp_flag && VspRefExist) | | |
|     vsp_mb_flag | 2 | ae(v) |
|   if ( !vsp_mb_flag ) | | |
|     mb_type | 2 | ue(v) \| ae(v) |
|   if( mb_type = = I_PCM ) { | | |
|     while( !byte_aligned( ) ) | | |
|       pcm_alignment_zero_bit | 3 | f(1) |
|     for( i = 0; i < 256; i++ ) | | |
|       pcm_sample_luma[ i ] | 3 | u(v) |
|     for( i = 0; i < 2 * MbWidthC * MbHeightC; i++ ) | | |
|       pcm_sample_chroma[ i ] | 3 | u(v) |
|   } else { | | |
|     noSubMbPartSizeLessThan8x8Flag = 1 | | |
|     if( mb_type != I_NxN && | | |
|       MbPartPredMode( mb_type, 0 ) != Intra_16x16 && | | |
|       NumMbPart( mb_type ) = = 4 ) { | | |
|       if ( !vsp_mb_flag ) | | |
|         sub_mb_pred( mb_type ) | 2 | |
|       for( mbPartIdx = 0; mbPartIdx < 4; mbPartIdx++ ) | | |
|         if( sub_mb_type[ mbPartIdx ] != B_Direct_8x8 ) { | | |
|           if( NumSubMbPart( sub_mb_type[ mbPartIdx ] ) > 1 ) | | |
|             noSubMbPartSizeLessThan8x8Flag = 0 | | |
|         } else if( !direct_8x8_inference_flag ) | | |
|           noSubMbPartSizeLessThan8x8Flag = 0 | | |
|     } else { | | |
|       if(transform_8x8_mode_flag && mb_type = = I_NxN ) | | |
|         transform_size_8x8_flag | 2 | u(1) \| ae(v) |
|       if ( !vsp_mb_flag ) | | |
|         mb_pred( mb_type ) | 2 | |
|     } | | |
|     if( MbPartPredMode( mb_type, 0 ) != Intra_16x16 ) { | | |
|       coded_block_pattern | 2 | me(v) \| ae(v) |
|       if( CodedBlockPatternLuma > 0 && | | |
|         transform_8x8_mode_flag && mb_type != I_NxN && | | |
|         noSubMbPartSizeLessThan8x8Flag && | | |
|         (vsp_mb_flag \|\| (!vsp_mb_flag && (mb_type != B_Direct_16x16 | | |
| \|\| direct_8x8_inference_flag)) ) ) | | |
|         transform_size_8x8_flag | 2 | u(1) \| ae(v) |
|     } | | |
|     if( CodedBlockPatternLuma > 0 \|\| CodedBlockPatternChroma > 0 \|\| | | |
|       MbPartPredMode( mb_type, 0 ) = = Intra_16x16 ) { | | |
|       mb_qp_delta | 2 | se(v) \| ae(v) |
|       residual( 0, 15 ) | 3 \| 4 | |
|     } | | |
|   } | | |
| } | | | current MB is totally predicted from a normal direct prediction mode, while the residue of the MB is signaled. Direct prediction mode is a type of inter prediction in which no motion vector is signaled or decoded. In the direct prediction mode, a reference index of a reference picture is signaled and a residue of the MB (or MB partition) is signaled relative to a co-located MB (or MB partition) of the reference picture. In another example, a syntax element associated with an MB may indicate that the whole MB is predicted from the VSP picture and that a residue for the MB is signaled. That is, similar to other techniques of this The example MB layer syntax structure of Table 13 may include a vsp_mb_flag syntax element if VSP is enabled for the slice and a VSP reference picture exists for the slice. The vsp_mb_flag syntax element indicates whether the whole MB corresponding to the MB layer syntax structure is predicted from a VSP picture and whether residual data for the MB is signaled. For example, if the vsp_mb_flag syntax element is equal to 1, the whole MB may be predicted from a VSP picture and residual data for the MB is signaled. In this example, if the vsp_mb_flag syntax element is equal to 0, the whole MB may be predicted by other coding modes.

Furthermore, in this example, when the vsp_mb_flag syntax element is equal to 1, the mb_type syntax element is not signaled in the MB layer syntax structure. When the vsp_mb_flag syntax element is not present in the MB layer syntax structure, video decoder 30 may infer the vsp_mb_flag syntax element to be equal to 0.

In the example syntax structures described in Tables 12 and 13, the context modeling for syntax elements other than the mb_skip_idc syntax element may be the same as described elsewhere in this disclosure. The initial probabilities for contexts of the mb_skip_idc syntax element may be initialized with different values for P slices and B slices. In various examples, the mb_skip_idc syntax element may be binarized in various ways and a context may be selected for the mb_skip_idc syntax element in various ways.

In one example, the mb_skip_idc syntax element may be binarized using information from an MB denoted mbPAddrA and an MB denoted mbPAddrB. mbPAddrA may be a neighboring MB (or 8×8 block) to the left of the current MB or the current MB partition. mbPAddrB may be a neighboring MB (or 8×8 block) above the current MB or the current MB partition. If both mbPAddrA and mbPAddrB are available and both mbPAddrA and mbPAddrB are coded using VSP skip mode, the mb_skip_idc syntax element may be binarized according to Table 14, below:

TABLE 14

Binarization of mb_skip_idx

| Value (name) of mb_skip_idc | Bin string | | | | | | |
|---|---|---|---|---|---|---|---|
| 0 (VSP skip mode) | 1 | | | | | | |
| 1 (normal skip mode) | 0 | 0 | | | | | |
| 2 (non-skip modes) | 0 | 1 | | | | | |
| Bin index (binIdx) | 0 | 1 | 2 | 3 | 4 | 5 | 6 |

Alternatively, the mb_skip_idc syntax element may be binarized according to Table 15, below:

TABLE 15

Binarization of mb_skip_idx

| Value (name) of mb_skip_idc | Bin string | | | | | | |
|---|---|---|---|---|---|---|---|
| 0 (VSP skip mode) | 1 | | | | | | |
| 1 (normal skip mode) | 0 | 1 | | | | | |
| 2 (non-skip modes) | 0 | 0 | | | | | |
| Bin index (binIdx) | 0 | 1 | 2 | 3 | 4 | 5 | 6 |

When the entropy coder is entropy coding an mb_skip_idx syntax element binarized according to Table 14 or Table 15, the entropy coder may determine a ctxIdxInc for each bin of the binarized mb_skip_idx syntax element. In this example, if the binIdx of a bin of the binarized mb_skip_idx syntax element is equal to 0 (i.e., the entropy coder is entropy coding the first bin of the mb_skip_idx syntax element), ctxIdxInc for the bin may be equal to the sum of condTermFlagA and condTermFlagB. That is, ctxIdxInc=condTermFlagA+condTermFlagB. In this example, condTermFlagN (where N is either A or B) may be equal to 0 if mbPAddrN is not available or the mode of mbPAddrN is VSP skip mode. Otherwise, condTermFlagN may be equal to 1.

Furthermore, in this example, if the binIdx of a bin is equal to 1, the ctxIdxInc for the bin may be equal to condTermFlagA plus condTermFlagB. When the binIdx of the bin is equal to 1, condTermFlagN (where N is either A or B) may be equal to 0 if mbPAddrN is not available or the mode of mbPAddrN is normal skip mode. Otherwise, condTermFlagN may be equal to 1.

Otherwise, if either mbPAddrA or mbPAddrB is not available or mbPAddrA or mbPAddrB is not encoded in VSP skip mode, the mb_skip_idc syntax element may be binarized according to Table 16, below:

TABLE 16

Binarization of mb_skip_idc

| Value (name) of mb_skip_idc | Bin string | | | | | | |
|---|---|---|---|---|---|---|---|
| 0 (normal skip mode) | 1 | | | | | | |
| 1 (VSP skip mode) | 0 | 0 | | | | | |
| 2 (non-skip modes) | 0 | 1 | | | | | |
| Bin index (binIdx) | 0 | 1 | 2 | 3 | 4 | 5 | 6 |

Alternatively, if either mbPAddrA or mbPAddrB is not available or mbPAddrA or mbPAddrB is not encoded in VSP skip mode, the mb_skip_idc syntax element may be binarized according to Table 17, below:

TABLE 17

Binarization of mb_skip_idc

| Value (name) of mb_skip_idc | Bin string | | | | | | |
|---|---|---|---|---|---|---|---|
| 0 (normal skip mode) | 1 | | | | | | |
| 1 (VSP skip mode) | 0 | 1 | | | | | |
| 2 (non-skip modes) | 0 | 0 | | | | | |
| Bin index (binIdx) | 0 | 1 | 2 | 3 | 4 | 5 | 6 |

When either mbPAddrA or mbPAddrB is not available or mbPAddrA or mbPAddrB is not encoded in VSP skip mode, the entropy coder may determine a ctxIdxInc for each bin of the binarized mb_skip_idx syntax element. In this example, if the binIdx of a bin of the binarized mb_skip_idx syntax element is equal to 0 (i.e., the entropy coder is entropy coding the first bin of the mb_skip_idx syntax element), ctxIdxInc for the bin may be equal to the sum of condTermFlagA and condTermFlagB. That is, ctxIdxInc=condTermFlagA+condTermFlagB. In this example, condTermFlagN (where N is either A or B) may be equal to 0 if mbPAddrN is not available or the mode of mbPAddrN is normal skip mode. Otherwise, condTermFlagN may be equal to 1.

Furthermore, in this example, if the binIdx of a bin is equal to 1, the ctxIdxInc for the bin may be equal to condTermFlagA plus condTermFlagB. When the binIdx of the bin is equal to 1, condTermFlagN (where N is either A or B) may be equal to 0 if mbPAddrN is not available or the mode of mbPAddrN is VSP skip mode. Otherwise, condTermFlagN may be equal to 1.

In other examples, the ctxIdxInc of a bin may depend on only a single spatial neighbor. For example, ctxIdxInc may be equal to condTermFlagA. In another example, ctxIdxInc may be equal to condTermFlagB. In this example, condTermFlagA and condTermFlagB may be defined as above.

An eighth example implementation of the techniques of this disclosure is similar to the seventh example implementation, however the binarization and context selection methods are different. In the eighth example implementation, the binarization schemes for P MBs in P slices and for B MBs in B slices are specified according to Table 18, below:

TABLE 18

| Binarization of mb_skip_idc | | | | | | | |
|---|---|---|---|---|---|---|---|
| Value (name) of mb_skip_idc | Bin string | | | | | | |
| 0 (normal skip mode/VSP skip mode) | 0 | 0 | | | | | |
| 1 (VSP skip mode/normal skip mode) | 0 | 1 | | | | | |
| 2 (non-skip modes) | 1 | | | | | | |
| Bin index (binIdx) | 0 | 1 | 2 | 3 | 4 | 5 | 6 |

Alternatively, in the eighth example implementation, the binarization process for P MBs in P slices and for B MBs in B slices is specified according to Table 19, below:

TABLE 19

| Binarization of mb_skip_idc | | | | | | | |
|---|---|---|---|---|---|---|---|
| Value (name) of mb_skip_idc | Bin string | | | | | | |
| 0 (normal skip mode/VSP skip mode) | 1 | 0 | | | | | |
| 1 (VSP skip mode/normal skip mode) | 1 | 1 | | | | | |
| 2 (non-skip modes) | 0 | | | | | | |
| Bin index (binIdx) | 0 | 1 | 2 | 3 | 4 | 5 | 6 |

In the eighth example implementation, when an entropy coder is coding an MB_skip_idc syntax element, the entropy coder may determine a ctxIdxInc for each bin of the binarized mb_skip_idc syntax element. For instance, when decoding mb_skip_idc, ctxIdxInc for mb_skip_idc may be specified depending on binIdx. In determining the ctxIdxInc for a bin, mbPAddrA may denote the neighboring MB (or 8×8 block) to the left of the current MB and mbPAddrB may denote the neighboring MB (or 8×8 block) above the current MB or MB partition.

If the binIdx of a bin of a binarized mb_skip_idc syntax element is equal to 0, an entropy encoder may determine ctxIdxInc for the bin in various ways. For example, if the binIdx of a bin of a binarized mb_skip_idc syntax element is equal to 0, ctxIdxInc for the bin may be equal to the sum of condTermFlagA and condTermFlagB. In this example, condTermFlagN (where N is either A or B) may be equal to 0 if mbPAddrN is not available or the mode of mbPAddrN is skip mode (either normal skip mode or VSP skip mode). Otherwise, in this example, condTermFlagN is equal to 1. In another example, if the binIdx of a bin of a binarized mb_skip_idc syntax element is equal to 0, ctxIdxInc for the bin may be equal to the sum of condTermFlagA and condTermFlagB. In this example, condTermFlagN (where N is either A or B) may be equal to 0 if mbPAddrN is not available or the mode of mbPAddrN is not skip mode (neither normal skip mode nor VSP skip mode). Otherwise, in this example, condTermFlagN is equal to 1. In another example, if the binIdx of a bin of a binarized mb_skip_idc syntax element is equal to 0, ctxIdxInc for the bin may be equal to condTermFlagN, where condTermFlagN (where N is either A or B) is defined in the manner described by the other examples of this paragraph.

If the binIdx of a bin of a binarized mb_skip_idc syntax element is greater than 0, the entropy coder may determine the ctxIdxInc for the bin in various ways. For example, if the binIdx of a bin of a binarized mb_skip_idc syntax element is greater than 0, ctxIdxInc for the bin may be equal to the sum of condTermA, condTermB and ctxOffset. In this example, condTermFlagN (where N can be either A or B) and ctxOffset may both be dependent on the mode of mbPAddrN. Furthermore, in this example, ctxOffset may be equal to 0 if both mbPAddrA and mbPAddrB are available and coded as VSP skip mode. Otherwise, ctxOffset may be equal to 3. In one alternatively, ctxOffset is set to 0. In another alternative, if both mbPAddrA and mbPAddrB are available and coded as VSP skip mode, ctxOffset is equal to 3 and equal to 0 otherwise. In this example, if both mbPAddrA and mbPAddrB are available and are coded as VSP skip mode, condTermFlagA and condTermFlagB may be set equal to 0. Alternatively, if mbPAddrN (where N can be either A or B) is not available or the mode of mbPAddrN is VSP skip mode, condTermFlagN is set equal to 0 and set equal to 1 otherwise.

Continuing the example of the previous paragraph, if either mbPAddrA or mbPAddrB is not available or not coded as VSP skip mode, condTermFlagN (where N is either A or B) may be set equal to 0. Otherwise, condTermFlagN may be set equal to 1. In one alternative example, if mbPAddrN is not available or the mode of mbPAddrN is VSP skip mode, condTermFlagN is set equal to 0 and set equal to 1 otherwise. In another alternative example, if mbPAddrN is not available or the mode of mbPAddrN is not VSP skip mode, condTermFlagN may be set equal to 0 and may be set equal to 1 otherwise. In another alternative, if mbPAddrN is not available or the mode of mbPAddrN is normal skip mode, condTermFlagN may be set to 0. Otherwise, condTermFlagN may be set equal to 0. In another alternative, if mbPAddrN is not available or the mode of mbPAddrN is not normal skip mode, condTermFlagN may be set equal to 0. Otherwise, condTermFlagN may be set to 1.

In another example in accordance with the eighth example implementation, if the binIdx of a bin of a binarized mb_skip_idc syntax element is greater than 0, the entropy coder may determine ctxIdxInc for the bin as the sum of condTermFlagN and ctxOffset. In this example, condTermFlagN (where N may be either A or B) and ctxOffset may be both dependent on the mode of mbPAddrN. Furthermore, in this example, ctxOffset may be set to 0 if mbPAddrN is available and coded as VSP skip mode. Otherwise, ctxOffset may be set to 2. In one alternative, ctxOffset is set to 0. In another alternative, if mbPAddrN is available and coded as VSP skip mode, ctxOffset is set to 2. Otherwise, in this alternative, ctxOffset is set to 0.

Continuing the example of the previous paragraph, if mbPAddrN is available and coded as VSP skip mode, condTermFlagN may be defined as follows: if mbPAddrN is not available or the mode of mbPAddrN is normal skip mode, condTermFlagN is set equal to 0, and otherwise condTermFlagN is set to 1. Otherwise, if mbPAddrN is not available or not coded as VSP skip mode, condTermFlagN may be defined as: if mbPAddrN is not available or the mode of mbPAddrN is normal skip mode, condTermFlagN is set equal to 0, and otherwise set equal to 1. In one alternative, if mbPAddrN is not available or the mode of mbPAddrN is VSP skip mode, condTermFlagN is set equal to 0. Otherwise, condTermFlagN is set equal to 1. In another alternative, if mbPAddrN is not available or the mode of mbPAddrN is not VSP skip mode, condTermSkipFlagN is set equal to 0. Otherwise, it is set to 1. In another alternative, if mbPAddrN not available or the mode of mbPAddrN is normal skip mode, condTermFlagN is set equal to 0. Otherwise, condTermFlagN is set equal to 0. In another alternative, if mbPAddrN is not available or the mode of mbPAddrN is not normal skip mode, condTermSkipFlagN is set equal to 0. Otherwise, it is set to 1.

As mentioned above, some techniques of this disclosure support multiple VSP pictures. Such techniques may be in addition to the seventh or eighth implementations (or other implementations) described in this disclosure. In such techniques, the total number of VSP pictures available may be signaled in various portions of a bitstream. For example, the total number of VSP pictures available may be signaled in a sequence parameter set, a picture parameter set, a slice header, or in another portion of the bitstream. When there are multiple VSP pictures available, a syntax element may be signaled to indicate an index of an applicable VSP picture. The following discussion may apply when the number of VSP pictures is larger than 1. Table 20, below, shows an example syntax structure for slice data. The syntax structure of Table 20 includes a syntax element vsp_ref_idx that specifies an index of a VSP picture applicable to an MB.

may include the vsp_ref_idx syntax element if the vsp_mb_flag syntax element is equal to 1. In addition, the slice data syntax structure may include the vsp_mb_flag syntax element if mb_part_vsp_flag[mbPartIdx] is equal to 1. As previously discussed, mb_part_vsp_flag[mbPartIdx] indicates whether the current MB partition, which is identified mbPartIdx, is predicted from a VSP picture. The slice data syntax structure may also include the vsp_mb_flag syntax element if sub_mb_vsp_flag[mbPartIdx] is equal to 1. As previously discussed, sub_mb_vsp_flag[mbPartIdx] indi-

TABLE 20

| Slice data syntax | | |
|---|---|---|
| slice_data( ) { | C | Descriptor |
|   if( entropy_coding_mode_flag ) | | |
|     while( !byte_aligned( ) ) | | |
|       cabac_alignment_one_bit | 2 | f(1) |
|   CurrMbAddr = first_mb_in_slice * ( 1 + MbaffFrameFlag ) | | |
|   moreDataFlag = 1 | | |
|   prevMbSkipped = 0 | | |
|   do { | | |
|     if( slice_type != I && slice_type != SI ) | | |
|       if( !entropy_coding_mode_flag ) { | | |
|         mb_skip_run | 2 | ue(v) |
|         prevMbSkipped = ( mb_skip_run > 0 ) | | |
|         for( i=0; i<mb_skip_run; i++ ) | | |
|           CurrMbAddr = NextMbAddress( CurrMbAddr ) | | |
|         moreDataFlag = more_rbsp_data( ) | | |
|       } else { | | |
|         if( slice_vsp_enable && VspRefExist) { | | |
|           mb_skip_idc | 2 | ae(v) |
|           if( MbVspSkip ) | | |
|             vsp_ref_idx | 2 | ae(v) |
|           moreDataFlag = (mb_skip_idc>1) | | |
|         }else{ | | |
|           mb_skip_flag | 2 | ae(v) |
|           moreDataFlag = !mb_skip_flag | | |
|         } | | |
|       } | | |
|     if( moreDataFlag ) { | | |
|       if( MbaffFrameFlag && ( CurrMbAddr % 2 = = 0 \|\| | | |
|         ( CurrMbAddr % 2 = = 1 && prevMbSkipped ) ) ) | | |
|         mb_field_decoding_flag | 2 | u(1) \| ae(v) |
|       macroblock_layer( ) | 2 \| 3 \| 4 | |
|     } | | |
|     if( !entropy_coding_mode_flag ) | | |
|       moreDataFlag = more_rbsp_data( ) | | |
|     else { | | |
|       if( slice_type != I && slice_type != SI ) | | |
|         prevMbSkipped = mb_skip_flag | | |
|       if( MbaffFrameFlag && CurrMbAddr % 2 = = 0 ) | | |
|         moreDataFlag = 1 | | |
|       else { | | |
|         end_of_slice_flag | 2 | ae(v) |
|         moreDataFlag = !end_of_slice_flag | | |
|       } | | |
|     } | | |
|     CurrMbAddr = NextMbAddress( CurrMbAddr ) | | |
|   } while( moreDataFlag ) | | |
| } | | |

In the example syntax structure of Table 20, the vsp_ref_idx syntax element may specify the index of the VSP picture to be used for prediction. The slice data syntax structure may include the vsp_ref_idx syntax element if the current MB is skipped from a VSP picture that can be derived from the VSP picture indicated by the mb_skip_idc syntax element. Furthermore, the slice data syntax structure cates whether the current MB partition (8×8), which is identified mbPartIdx, is predicted from a VSP picture.

Table 21, below, shows an example syntax for an MB layer syntax structure. As shown in Table 21, an MB layer syntax structure may include a vsp_ref_idx syntax element that identifies a VSP picture from among a plurality of available VSP pictures.

TABLE 21

Macroblock layer syntax

| macroblock_layer( ) { | C | Descriptor |
|---|---|---|
|   if (slice_vsp_flag && VspRefExist) { | | |
|     vsp_mb_flag | 2 | ae(v) |
|     if(vsp_mb_flag) | | |
|       vsp_ref_idx | 2 | ae(v) |
|   } | | |
|   if (! vsp_mb_flag ) | | |
|     mb_type | 2 | ue(v) \| ae(v) |
|   if( mb_type = = I_PCM ) { | | |
|     while( !byte_aligned( ) ) | | |
|       pcm_alignment_zero_bit | 3 | f(1) |
|     for( i = 0; i < 256; i++ ) | | |
|       pcm_sample_luma[ i ] | 3 | u(v) |
|     for( i = 0; i < 2 * MbWidthC * MbHeightC; i++ ) | | |
|       pcm_sample_chroma[ i ] | 3 | u(v) |
|   } else { | | |
|     noSubMbPartSizeLessThan8x8Flag = 1 | | |
|     if( mb_type != I_NxN && | | |
|       MbPartPredMode( mb_type, 0 ) != Intra_16x16 && | | |
|       NumMbPart( mb_type ) = = 4 ) { | | |
|       if ( !vsp_mb_flag ) | | |
|         sub_mb_pred( mb_type ) | 2 | |
|       for( mbPartIdx = 0; mbPartIdx < 4; mbPartIdx++ ) | | |
|         if( sub_mb_type[ mbPartIdx ] != B_Direct_8x8 ) { | | |
|           if( NumSubMbPart( sub_mb_type[ mbPartIdx ] ) > 1 ) | | |
|             noSubMbPartSizeLessThan8x8Flag = 0 | | |
|         } else if( !direct_8x8_inference_flag ) | | |
|           noSubMbPartSizeLessThan8x8Flag = 0 | | |
|     } else { | | |
|       if(transform_8x8_mode_flag && mb_type = = I_NxN ) | | |
|         transform_size_8x8_flag | 2 | u(1) \| ae(v) |
|       if ( !vsp_mb_flag ) | | |
|         mb_pred( mb_type ) | 2 | |
|     } | | |
|     if( MbPartPredMode( mb_type, 0 ) != Intra_16x16 ) { | | |
|       coded_block_pattern | 2 | me(v) \| ae(v) |
|       if( CodedBlockPatternLuma > 0 && | | |
|         transform_8x8_mode_flag && mb_type != I_NxN && | | |
|         noSubMbPartSizeLessThan8x8Flag && | | |
|         (vsp_mb_flag \|\| (!vsp_mb_flag && (mb_type != | | |
| B_Direct_16x16 \|\| direct_8x8_inference_flag)) ) ) | | |
|         transform_size_8x8_flag | 2 | u(1) \| ae(v) |
|     } | | |
|     if( CodedBlockPatternLuma > 0 \|\| CodedBlockPatternChroma > 0 \|\| | | |
|       MbPartPredMode( mb_type, 0 ) = = Intra_16x16 ) { | | |
|       mb_qp_delta | 2 | se(v) \| ae(v) |
|       residual( 0, 15 ) | 3 \| 4 | |
|     } | | |
|   } | | |
| } | | |

In Table 21, the semantics of the vsp_ref_idx syntax element may be the same as those described above with reference to Table 20 and the MB layer syntax structure may include the vsp_ref_idx syntax element when the same conditions occur.

Furthermore, Table 22, below, shows an example syntax for an MB prediction syntax structure. As shown in Table 22, an MB prediction syntax structure may include a vsp_ref_idx[mbPartIdx] syntax element that identifies, for an MB partition identified by mbPartIdx, a VSP picture from among a plurality of available VSP pictures.

TABLE 22

Macroblock prediction syntax

| mb_pred( mb_type ) { | C | Descriptor |
|---|---|---|
|   if( MbPartPredMode( mb_type, 0 ) = = Intra_4x4 \|\| | | |
|     MbPartPredMode( mb_type, 0 ) = = Intra_16x16 ) { | | |
|     if( MbPartPredMode( mb_type, 0 ) = = Intra_4x4 ) | | |
|       for( luma4x4BlkIdx=0; luma4x4BlkIdx<16; luma4x4BlkIdx++ ) { | | |
|         prev_intra4x4_pred_mode_flag[ luma4x4BlkIdx ] | 2 | u(1) \| ae(v) |
|         if( !prev_intra4x4_pred_mode_flag[ luma4x4BlkIdx ] ) | | |
|           rem_intra4x4_pred_mode[ luma4x4BlkIdx ] | 2 | u(3) \| ae(v) |
|       } | | |

TABLE 22-continued

Macroblock prediction syntax

| mb_pred( mb_type ) { | C | Descriptor |
|---|---|---|
|     intra_chroma_pred_mode | 2 | ue(v) \| ae(v) |
| } else if( MbPartPredMode( mb_type, 0 ) != Direct ) { | | |
|     for( mbPartIdx = 0; mbPartIdx < NumMbPart( mb_type ); mbPartIdx++) | | |
|       if (slice_vsp_flag && VspRefExist ) //vsp_mb_flag is not 1 | | |
|         mb_part_vsp_flag[ mbPartIdx ] | 2 | ae(v) |
|       if(mb_part_vsp_flag[ mbPartIdx ]) | | |
|         vsp_ref_idx[ mbPartIdx ] | 2 | ae(v) |
|       if(!mb_part_vsp_flag[ mbPartIdx ] &&( num_ref_idx_l0_active_minus1 > 0 \| \| mb_field_decoding_flag ) && MbPartPredMode( mb_type, mbPartIdx ) != Pred_L1 ) | | |
|         ref_idx_l0[ mbPartIdx ] | 2 | te(v) \| ae(v) |
|     for(!mb_part_vsp_flag[ mbPartIdx ] &&( mbPartIdx = 0; mbPartIdx < NumMbPart( mb_type ); mbPartIdx++) | | |
|       if( ( num_ref_idx_l1_active_minus1 > 0 \| \| mb_field_decoding_flag ) && MbPartPredMode( mb_type, mbPartIdx ) != Pred_L0 ) | | |
|         ref_idx_l1[ mbPartIdx ] | 2 | te(v) \| ae(v) |
|     for( mbPartIdx = 0; mbPartIdx < NumMbPart( mb_type ); mbPartIdx++) | | |
|       if(!mb_part_vsp_flag[ mbPartIdx ] &&( MbPartPredMode ( mb_type, mbPartIdx ) != Pred_L1 ) | | |
|         for( compIdx = 0; compIdx < 2; compIdx++ ) | | |
|           mvd_l0[ mbPartIdx ][ 0 ][ compIdx ] | 2 | se(v) \| ae(v) |
|     for( mbPartIdx = 0; mbPartIdx < NumMbPart( mb_type ); mbPartIdx++) | | |
|       if(!mb_part_vsp_flag[ mbPartIdx ] &&( MbPartPredMode( mb_type, mbPartIdx ) != Pred_L0 ) | | |
|         for( compIdx = 0; compIdx < 2; compIdx++ ) | | |
|           mvd_l1[ mbPartIdx ][ 0 ][ compIdx ] | 2 | se(v) \| ae(v) |
|     } | | |
| } | | |

In Table 22, the semantics of the vsp_ref_idx syntax element may be the same as those described above with reference to Table 20 and the MB prediction syntax structure may include the vsp_ref_idx syntax element when the same conditions occur.

Table 23, below, shows an example syntax for a sub-MB prediction syntax structure. As shown in Table 23, a sub-MB prediction syntax structure may include a vsp_ref_idx[mbPartIdx] syntax element that identifies, for a sub-MB partition identified by mbPartIdx, a VSP picture from among a plurality of available VSP pictures.

TABLE 23

Sub-macroblock prediction syntax

| sub_mb_pred( mb_type ) { | C | Descriptor |
|---|---|---|
|     for( mbPartIdx = 0; mbPartIdx < 4; mbPartIdx++ ) { | | |
|       if (slice_vsp_flag && VspRefExist) // vsp_mb_flag is not 1 | | |
|         sub_mb_vsp_flag[ mbPartIdx ] | | |
|       if(sub_mb_vsp_flag[ mbPartIdx ]) | | |
|         vsp_ref_idx[ mbPartIdx ] | 2 | ae(v) |
|       else | | |
|         sub_mb_type[ mbPartIdx ] | 2 | ue(v) \| ae(v) |
|     } | | |
|     for( mbPartIdx = 0; mbPartIdx < 4; mbPartIdx++ ) | | |
|       if(!sub_mb_vsp_flag[ mbPartIdx ]) &&( num_ref_idx_l0_active_minus1 > 0 \| \| mb_field_decoding_flag ) && mb_type != P_8x8ref0 && sub_mb_type[ mbPartIdx ] != B_Direct_8x8 && SubMbPredMode( sub_mb_type[ mbPartIdx ] ) != Pred_L1 ) | | |
|         ref_idx_l0[ mbPartIdx ] | 2 | te(v) \| ae(v) |
|     for( mbPartIdx = 0; mbPartIdx < 4; mbPartIdx++ ) | | |
|       if( !sub_mb_vsp_flag[ mbPartIdx ]) && (num_ref_idx_l1_active_minus1 > 0 \| \| mb_field_decoding_flag ) && sub_mb_type[ mbPartIdx ] != B_Direct_8x8 && SubMbPredMode( sub_mb_type[ mbPartIdx ] ) != Pred_L0 ) | | |
|         ref_idx_l1[ mbPartIdx ] | 2 | te(v) \| ae(v) |
|     for( mbPartIdx = 0; mbPartIdx < 4; mbPartIdx++ ) | | |
|       if(!sub_mb_vsp_flag[ mbPartIdx ]) &&( sub_mb_type[ mbPartIdx ] != B_Direct_8x8 && SubMbPredMode( sub_mb_type[ mbPartIdx ] ) != Pred_L1 ) | | |
|         for( subMbPartIdx = 0; subMbPartIdx < NumSubMbPart( sub_mb_type[ mbPartIdx ] ); subMbPartIdx++) | | |

TABLE 23-continued

Sub-macroblock prediction syntax

| sub_mb_pred( mb_type ) { | C | Descriptor |
|---|---|---|
|         for( compIdx = 0; compIdx < 2; compIdx++ ) | | |
|            mvd_l0[ mbPartIdx ][ subMbPartIdx ][ compIdx ] | 2 | se(v) \| ae(v) |
| for( mbPartIdx = 0; mbPartIdx < 4; mbPartIdx++ ) | | |
|   if(!sub_mb_vsp_flag[ mbPartIdx ]) &&sub_mb_type[ mbPartIdx ] != B_Direct_8x8 && | | |
|     SubMbPredMode( sub_mb_type[ mbPartIdx ] ) != Pred_L0 ) | | |
|     for( subMbPartIdx = 0; | | |
|       subMbPartIdx < NumSubMbPart( sub_mb_type[ mbPartIdx ] ); | | |
|       subMbPartIdx++) | | |
|       for( compIdx = 0; compIdx < 2; compIdx++ ) | | |
|         mvd_l1[ mbPartIdx ][ subMbPartIdx ][ compIdx ] | 2 | se(v) \| ae(v) |
| } | | |

In Table 23, the semantics of the vsp_ref_idx syntax element may be the same as those described above with reference to Table 20 and the MB prediction syntax structure may include the vsp_ref_idx syntax element when the same conditions occur.

The binarization process for vsp_ref_idx may be the same as ref_idx_l0 and ref_idx_l1. The context selection of vsp_ref_idx can be performed in a similar way as ref_idx_l0 and ref_idx_l1. The H.264/AVC standard describes the binarization process and context selection for ref_idx_l0 and ref_idx_l1. The context modelling for vsp_ref_idx may be based on the values of vsp_ref_idx of the neighbouring MBs or MB partitions, but not the values of the ref_idx_l0 or ref_idx_l1.

In some examples, an MB or an MB partition may be predicted based on two VSP pictures. In some such examples, MB prediction syntax structures may have the syntax described by Table 24, below.

TABLE 24

Macroblock prediction syntax

| mb_pred( mb_type ) { | C | Descriptor |
|---|---|---|
| if( MbPartPredMode( mb_type, 0 ) = = Intra_4x4 \|\| | | |
|   MbPartPredMode( mb_type, 0 ) = = Intra_16x16 ) { | | |
|   if( MbPartPredMode( mb_type, 0 ) = = Intra_4x4 ) | | |
|     for( luma4x4BlkIdx=0; luma4x4BlkIdx<16; luma4x4BlkIdx++ ) { | | |
|       prev_intra4x4_pred_mode_flag[ luma4x4BlkIdx ] | 2 | u(1) \| ae(v) |
|       if( !prev_intra4x4_pred_mode_flag[ luma4x4BlkIdx ] ) | | |
|         rem_intra4x4_pred_mode[ luma4x4BlkIdx ] | 2 | u(3) \| ae(v) |
|     } | | |
|   intra_chroma_pred_mode | 2 | ue(v) \| ae(v) |
| } else if( MbPartPredMode( mb_type, 0 ) != Direct ) { | | |
|   for( mbPartIdx = 0; mbPartIdx < NumMbPart( mb_type ); mbPartIdx++) | | |
|     if (slice_vsp_flag && NumMbPart( mb_type ) != 1 && VspRefExist) { | | |
|       if (MbPartPredMode( mb_type, mbPartIdx ) != Pred_L1) | | |
|         mb_part_vsp_flag_L0[ mbPartIdx ] | 2 | ae(v) |
|       if (MbPartPredMode( mb_type, mbPartIdx) != Pred_L0 ) | | |
|         mb_part_vsp_flag_L1[ mbPartIdx ] | 2 | ae(v) |
|     } | | |
|     if(!mb_part_vsp_flag_L0[ mbPartIdx ] &&( | | |
| num_ref_idx_l0_active_minus1 > 0 \|\| | | |
|       mb_field_decoding_flag ) && | | |
|       MbPartPredMode( mb_type, mbPartIdx ) != Pred_L1 ) | | |
|       ref_idx_l0[ mbPartIdx ] | 2 | te(v) \| ae(v) |
|   for (mbPartIdx = 0; mbPartIdx < NumMbPart( mb_type ) && | | |
| !mb_part_vsp_flag_L1[ mbPartIdx ]; mbPartIdx++) | | |
|     if( ( num_ref_idx_l1_active_minus1 > 0 \|\| | | |
|       mb_field_decoding_flag ) && | | |
|       MbPartPredMode( mb_type, mbPartIdx ) != Pred_L0 ) | | |
|       ref_idx_l1[ mbPartIdx ] | 2 | te(v) \| ae(v) |
|   for( mbPartIdx = 0; mbPartIdx < NumMbPart( mb_type ); mbPartIdx++) | | |
|     if(!mb_part_vsp_flag_L0[ mbPartIdx ] && MbPartPredMode | | |
| (mb_type, mbPartIdx ) != Pred_L1 ) | | |
|       for( compIdx = 0; compIdx < 2; compIdx++ ) | | |
|         mvd_l0[ mbPartIdx ][ 0 ][ compIdx ] | 2 | se(v) \| ae(v) |
|   for( mbPartIdx = 0; mbPartIdx < NumMbPart( mb_type ); mbPartIdx++) | | |
|     if(!mb_part_vsp_flag_L1[ mbPartIdx ] && | | |
| MbPartPredMode( mb_type, mbPartIdx ) != Pred_L0 ) | | |
|       for( compIdx = 0; compIdx < 2; compIdx++ ) | | |
|         mvd_l1[ mbPartIdx ][ 0 ][ compIdx ] | 2 | se(v) \| ae(v) |
|   } | | |
| } | | |

In the example syntax of Table 24, the MB prediction syntax structure may include an mb_part_vsp_flag_l0[mbPartIdx] syntax element and an mb_part_vsp_flagl1 [mbPartIdx] syntax element. The mb_part_vsp_flag_l0[mbPartIdx] syntax element indicates whether the current MB Furthermore, some examples where an MB or an MB partition may be predicted based on two VSP pictures, sub-MB prediction syntax structures may have the syntax described by Table 25, below.

TABLE 25

Sub-macroblock prediction syntax

| | C | Descriptor |
|---|---|---|
| sub_mb_pred( mb_type ) { | | |
|   for( mbPartIdx = 0; mbPartIdx < 4; mbPartIdx++ ) { | | |
|     if (slice_vsp_flag && VspRefExist) // vsp_mb_flag is not 1 | | |
|       sub_mb_vsp_flag[ mbPartIdx ] | | |
|     if (!sub_mb_vsp_flag[ mbPartIdx ]) | | |
|       sub_mb_type[ mbPartIdx ] | 2 | ue(v) \| ae(v) |
|     if (slice_vsp_flag && VspRefExist && | | |
|       (NumSubMbPart (sub_mb_type[ mbPartIdx ]) = = 1 \|\| | | |
|       sub_mb_type[mbPartIdx ] = = B_Direct_8x8 ) ) { | | |
|       if( SubMbPredMode( sub_mb_type[ mbPartIdx ] ) != Pred_L1) | | |
|         sub_mb_vsp_flag_l0[ mbPartIdx ] | 2 | ae(v) |
|       if( SubMbPredMode( sub_mb_type[ mbPartIdx ] ) != Pred_L0) | | |
|         sub_mb_vsp_flag_l1[ mbPartIdx ] | 2 | ae(v) |
|     } | | |
|   } | | |
|   for( mbPartIdx = 0; mbPartIdx < 4; mbPartIdx++ ) | | |
|     if(!sub_mb_vsp_flag_l0[ mbPartIdx ] &&( num_ref_idx_l0_active_minus1 > 0 \|\| mb_field_decoding_flag ) && | | |
|       mb_type != P_8x8ref0 && | | |
|       sub_mb_type[ mbPartIdx ] != B_Direct_8x8 && | | |
|       SubMbPredMode( sub_mb_type[ mbPartIdx ] ) != Pred_L1 ) | | |
|       ref_idx_l0[ mbPartIdx ] | 2 | te(v) \| ae(v) |
|   for( mbPartIdx = 0; mbPartIdx < 4; mbPartIdx++ ) | | |
|     if( !sub_mb_vsp_flag_l1[ mbPartIdx ] && (num_ref_idx _l1_active_minus1 > 0 \|\| mb_field_decoding_flag ) && | | |
|       sub_mb_type[ mbPartIdx ] != B_Direct_8x8 && | | |
|       SubMbPredMode( sub_mb_type[ mbPartIdx ] ) != Pred_L0 ) | | |
|       ref_idx_l1[ mbPartIdx ] | 2 | te(v) \| ae(v) |
|   for( mbPartIdx = 0; mbPartIdx < 4; mbPartIdx++ ) | | |
|     if(!sub_mb_vsp_flag_l0[ mbPartIdx ] &&( sub_mb_type[ mbPartIdx ] != B_Direct_8x8 && | | |
|       SubMbPredMode( sub_mb_type[ mbPartIdx ] ) != Pred_L1 ) | | |
|       for( subMbPartIdx = 0; | | |
|         subMbPartIdx < NumSubMbPart( sub_mb_type[ mbPartIdx ] ); | | |
|         subMbPartIdx++) | | |
|         for( compIdx = 0; compIdx < 2; compIdx++ ) | | |
|           mvd_l0[ mbPartIdx ][ subMbPartIdx ][ compIdx ] | 2 | se(v) \| ae(v) |
|   for( mbPartIdx = 0; mbPartIdx < 4; mbPartIdx++ ) | | |
|     if(!sub_mb_vsp_flag_l1[ mbPartIdx ] &&sub_mb_type[ mbPartIdx ] != B_Direct_8x8 && | | |
|       SubMbPredMode( sub_mb_type[ mbPartIdx ] ) != Pred_L0 ) | | |
|       for( subMbPartIdx = 0; | | |
|         subMbPartIdx < NumSubMbPart( sub_mb_type[ mbPartIdx ] ); | | |
|         subMbPartIdx++) | | |
|         for( compIdx = 0; compIdx < 2; compIdx++ ) | | |
|           mvd_l1[ mbPartIdx ][ subMbPartIdx ][ compIdx ] | 2 | se(v) \| ae(v) |
| } | | | partition is predicted from a normal reference picture in RefPicList0 or a VSP picture. For example, if mb_part_vsp_flag_l0[mbPartIdx] is equal to 1, the current MB partition is not predicted from a normal picture in RefPicList0 for prediction, but from a VSP picture. In this example, if mb_part_vsp_flag_l0[mbPartIdx] is equal to 0, the MB partition is predicted from a normal picture in RefPicList0 for prediction. Similarly, the mb_part_vsp_flag_l1[mbPartIdx] syntax element indicates whether the current MB partition is predicted from a normal reference picture in RefPicList1 or a VSP picture. For example, if mb_part_vsp_flag_l1[mbPartIdx] is equal to 1, the current MB partition is not predicted from a normal picture in RefPicList for prediction, but from a VSP picture. In this example, if the mb_part_vsp_flag_l1[mbPartIdx] flag is equal to 0, the MB partition is predicted from a normal picture in RefPicList1 for prediction.

In the example syntax of Table 25, a sub-MB prediction syntax structure may include a sub_mb_vsp_flag[mbPartIdx] syntax element, a sub_mb_vsp_flag_l0[mbPartIdx] syntax element, and a sub_mb_vsp_flag_l1[mbPartIdx] syntax element. sub_mb_vsp_flag[mbPartIdx] indicates whether the current MB partition (8×8) is predicted from a VSP picture. For example, if sub_mb_vsp_flag[mbPartIdx] is equal to 1, the current MB partition (8×8) is predicted from a VSP picture. In this example, if sub_mb_vsp_flag [mbPartIdx] is equal to 0, the current MB partition (8×8) is not predicted from a VSP picture. When sub_mb_vsp_flag [mbPartIdx] is not present, sub_mb_vsp_flag[mbPartIdx] may be inferred to be equal to 0. When sub_mb_vsp_flag [mbPartIdx] is equal to 1, both mb_part_vsp_flag_l0[mbPartIdx] and mb_part_vsp_flag_l1 [mbPartIdx] are derived to be equal to 1.

sub_mb_vsp_flag_l0[mbPartIdx] indicates whether the current MB partition is predicted from a normal reference picture in RefPicList0 or a VSP picture. For example, if sub_mb_vsp_flag_l0[mbPartIdx] is equal to 1, the current MB partition is not predicted from a normal picture in RefPicList0 for prediction, but from a VSP picture. In this example, if sub_mb_vsp_flag_l0[mbPartIdx] is equal to 0, the MB partition is predicted from a normal picture in RefPicList0 for prediction. Similarly, the sub_mb_vsp_ VSP picture. Furthermore, in this example, the VSP picture may be included as the ref_idx_l1_vsp entry of RefPicList1. In other words, ref_idx_l1_vsp indicates a position in RefPicList1 of the VSP picture. If no VSP picture is in RefPicList0, ref_idx_l0_vsp is equal to −1. If no VSP picture is in RefPicList1, ref_idx_l1_vsp is equal to −1. This is shown in Tables 26 and 27, below.

TABLE 26

Macroblock prediction syntax

| mb_pred( mb_type ) { | C | Descriptor |
|---|---|---|
|   if( MbPartPredMode( mb_type, 0 ) = = Intra_4x4 \|\| | | |
|     MbPartPredMode( mb_type, 0 ) = = Intra_16x16 ) { | | |
|     if( MbPartPredMode( mb_type, 0 ) = = Intra_4x4 ) | | |
|       for( luma4x4BlkIdx=0; luma4x4BlkIdx<16; luma4x4BlkIdx++ ) { | | |
|         prev_intra4x4_pred_mode_flag[ luma4x4BlkIdx ] | 2 | u(1) \| ae(v) |
|         if( !prev_intra4x4_pred_mode_flag[ luma4x4BlkIdx ] ) | | |
|           rem_intra4x4_pred_mode[ luma4x4BlkIdx ] | 2 | u(3) \| ae(v) |
|       } | | |
|     intra_chroma_pred_mode | 2 | ue(v) \| ae(v) |
|   } else if( MbPartPredMode( mb_type, 0 ) != Direct ) { | | |
|     for( mbPartIdx = 0; mbPartIdx < NumMbPart( mb_type ); mbPartIdx++) | | |
|       if(num_ref_idx_l0_active_minus1 > 0 \|\| | | |
|         mb_field_decoding_flag ) && | | |
|         MbPartPredMode( mb_type, mbPartIdx ) != Pred_L1 ) { | | |
|         ref_idx_l0[ mbPartIdx ] | 2 | te(v) \| ae(v) |
|         mb_part_vsp_flag_L0[ mbPartIdx ]= | | |
|           (ref_idx_l0[ mbPartIdx ] = = ref_idx_l0_vsp ) | | |
|     } | | |
|     for (mbPartIdx = 0; mbPartIdx < NumMbPart( mb_type ); mbPartIdx++) | | |
|       if( ( num_ref_idx_l1_active_minus1 > 0 \|\| | | |
|         mb_field_decoding_flag ) && | | |
|         MbPartPredMode( mb_type, mbPartIdx ) != Pred_L0 ) { | | |
|         ref_idx_l1[ mbPartIdx ] | 2 | te(v) \| ae(v) |
|         mb_part_vsp_flag_L1[ mbPartIdx ]= | | |
|           (ref_idx_l1[ mbPartIdx ] = = ref_idx_l1_vsp ) | | |
|     } | | |
|     for( mbPartIdx = 0; mbPartIdx < NumMbPart( mb_type ); mbPartIdx++) | | |
|       if(!mb_part_vsp_flag_L0[ mbPartIdx ] && MbPartPredMode | | |
| ( mb_type, mbPartIdx ) != Pred_L1 ) | | |
|         for( compIdx = 0; compIdx < 2; compIdx++ ) | | |
|           mvd_l0[ mbPartIdx ][ 0 ][ compIdx ] | 2 | se(v) \| ae(v) |
|     for( mbPartIdx = 0; mbPartIdx < NumMbPart( mb_type ); mbPartIdx++) | | |
|       if(!mb_part_vsp_flag_L1[ mbPartIdx ] && | | |
| MbPartPredMode( mb_type, mbPartIdx ) != Pred_L0 ) | | |
|         for( compIdx = 0; compIdx < 2; compIdx++ ) | | |
|           mvd_l1[ mbPartIdx ][ 0 ][ compIdx ] | 2 | se(v) \| ae(v) |
|   } | | |
| } | | | flag_l1[mbPartIdx] syntax element indicates whether the current MB partition is predicted from a normal reference picture in RefPicList1 or a VSP picture. For example, if sub_mb_vsp_flag_l1[mbPartIdx] is equal to 1, the current MB partition is not predicted from a normal picture in RefPicList1 for prediction, but from a VSP picture. In this example, if the sub_mb_vsp_flag_l1[mbPartIdx] flag is equal to 0, the MB partition is predicted from a normal picture in RefPicList1 for prediction.

In some examples, the VSP picture is included in a reference picture list and ref_idx is used to derive the values of sub_mb_vsp_flag_l0, sub_mb_vsp_flag_l1, mb_part_vsp_flag_l0, and mb_part_vsp_flag_l1. In one such example, the VSP picture may be included as the ref_idx_l0_vsp entry of RefPicList0. In this example, ref_idx_l0_vsp indicates a position in RefPicList0 of the As shown in Table 26, mb_part_vsp_flag_L0[mbPartIdx] may be equal to 1 if ref_idx_l0[mbPartIdx] is equal to ref_idx_l0_vsp. As indicated above, mb_part_vsp_flag_L0 [mbPartIdx] equal to 1 may indicate that the current MB partition is not predicted from a normal picture in RefPicList0, but rather is predicted from a VSP picture. Similarly, video decoder 30 may determine that mb_part_vsp_flag_L1 [mbPartIdx] is equal to 1 if ref_idx_l1[mbPartIdx] is equal to ref_idx_l1_vsp. mb_part_vsp_flag_L0[mbPartIdx] equal to 1 may indicate that the current MB partition is not predicted from a normal picture in RefPicList1, but rather is predicted from a VSP picture. Thus, in the example syntax of Table 26, it may be unnecessary to signal a separate syntax element to indicate whether the current MB partition is predicted from a normal picture or a VSP picture. Instead, the ref_idx_l0 syntax element can be re-used for the purpose of determining whether the current MB partition is predicted from a normal picture or a VSP picture.

TABLE 27

Sub-macroblock prediction syntax

| | C | Descriptor |
|---|---|---|
| sub_mb_pred( mb_type ) { | | |
|   for( mbPartIdx = 0; mbPartIdx < 4; mbPartIdx++ ) | | |
|     if (slice_vsp_flag && VspRefExist) // vsp_mb_flag is not 1 | | |
|       sub_mb_vsp_flag[ mbPartIdx ] | | |
|     if (!sub_mb_vsp_flag[ mbPartIdx ]) | | |
|       sub_mb_type[ mbPartIdx ] | 2 | ue(v) \| ae(v) |
|   for( mbPartIdx = 0; mbPartIdx < 4; mbPartIdx++ ) | | |
|     if( ( num_ref_idx_l0_active_minus1 > 0 \|\| mb_field_decoding_flag ) && | | |
|       mb_type != P_8x8ref0 && | | |
|       sub_mb_type[ mbPartIdx ] != B_Direct_8x8 && | | |
|       SubMbPredMode( sub_mb_type[ mbPartIdx ] ) != Pred_L1 ) { | | |
|       ref_idx_l0[ mbPartIdx ] | 2 | te(v) \| ae(v) |
|       sub_mb_vsp_flag_l0[ mbPartIdx ] = | | |
|       (ref_idx_l0[ mbPartIdx ] = = ref_idx_l0_vsp ) | | |
|     } | | |
|   for( mbPartIdx = 0; mbPartIdx < 4; mbPartIdx++ ) | | |
|     if( !sub_mb_vsp_flag_l1[ mbPartIdx ] && (num_ref_idx_l1_active_minus1 > 0 \|\| mb_field_decoding_flag ) && | | |
|       sub_mb_type[ mbPartIdx ] != B_Direct_8x8 && | | |
|       SubMbPredMode( sub_mb_type[ mbPartIdx ] ) != Pred_L0 ) { | | |
|       ref_idx_l1[ mbPartIdx ] | 2 | te(v) \| ae(v) |
|       sub_mb_vsp_flag_l1[ mbPartIdx ] = | | |
|       (ref_idx_l1[ mbPartIdx ] = = ref_idx_l1_vsp ) | | |
|     } | | |
|   for( mbPartIdx = 0; mbPartIdx < 4; mbPartIdx++ ) | | |
|     if(!sub_mb_vsp_flag_l0[ mbPartIdx ] &&( sub_mb_type[ mbPartIdx ] != B_Direct_8x8 && | | |
|       SubMbPredMode( sub_mb_type[ mbPartIdx ] ) != Pred_L1 ) | | |
|       for( subMbPartIdx = 0; | | |
|         subMbPartIdx < NumSubMbPart( sub_mb_type[ mbPartIdx ] ); | | |
|         subMbPartIdx++) | | |
|         for( compIdx = 0; compIdx < 2; compIdx++ ) | | |
|           mvd_l0[ mbPartIdx ][ subMbPartIdx ][ compIdx ] | 2 | se(v) \| ae(v) |
|   for( mbPartIdx = 0; mbPartIdx < 4; mbPartIdx++ ) | | |
|     if(!sub_mb_vsp_flag_l1[ mbPartIdx ] &&sub_mb_type[ mbPartIdx ] != B_Direct_8x8 && | | |
|       SubMbPredMode( sub_mb_type[ mbPartIdx ] ) != Pred_L0 ) | | |
|       for( subMbPartIdx = 0; | | |
|         subMbPartIdx < NumSubMbPart( sub_mb_type[ mbPartIdx ] ); | | |
|         subMbPartIdx++) | | |
|         for( compIdx = 0; compIdx < 2; compIdx++ ) | | |
|           mvd_l1[ mbPartIdx ][ subMbPartIdx ][ compIdx ] | 2 | se(v) \| ae(v) |
| } | | |

As shown in Table 27, video decoder 30 may determine that the sub_mb_vsp_flag_L0[mbPartIdx] is equal to 1 if ref_idx_l0[mbPartIdx] is equal to ref_idx_l0_vsp. As indicated above, sub_mb_vsp_flag_L0[mbPartIdx] equal to 1 may indicate that the current MB partition (8×8) is not predicted from a normal picture in RefPicList0, but rather is predicted from a VSP picture. Similarly, video decoder 30 may determine that sub_mb_vsp_flag_L1[mbPartIdx] is equal to 1 if ref_idx_l1[mbPartIdx] is equal to ref_idx_l1_vsp. sub_mb_vsp_flag_L0[mbPartIdx] equal to 1 may indicate that the current MB partition (8×8) is not predicted from a normal picture in RefPicList1, but rather is predicted from a VSP picture. Thus, in the example syntax of Table 27, it may be unnecessary to signal a separate syntax element to indicate whether the current MB partition (8×8) is predicted from a normal picture or a VSP picture. Instead, the ref_idx_l0 syntax element can be re-used for the purpose of determining whether the current MB partition (8×8) is predicted from a normal picture or a VSP picture.

Motion vector prediction is a process of determining motion vectors for a current video unit, such as an MB or MB partition. In general, when a video coder, such as video encoder 20 or video decoder 30, determines a motion vector of the current video unit, the video coder may determine a representative depth value in a depth view component. In some examples, the representative depth value may be an average depth value of depth values in a block of the depth values co-located with the sample blocks of the current video unit. The video decoder may then determine, based at least in part on the representative depth value, a disparity vector for the current video unit. An origin point of the disparity vector may be a location, within a reference texture view component of the same access unit as the current video unit, that is co-located with a location within a sample block of the current video unit. A sample block of a reference video unit of the reference texture view component may include the terminal point of the disparity vector. If the reference video unit is predicted from a texture view of another access unit, the motion vector of the current video unit may be equal to the motion vector of the reference video unit. In other instances, the motion vector of the current video unit may be equal to the disparity vector.

In depth-based motion parameter prediction (DBMP), motion information, such as motion vectors and reference indices, for each pixel of an encoded video unit (e.g., MB, MB partition, etc.) may be directly inferred with the use of already-coded disparity maps from encoded video units in neighboring view at the same temporal instance (i.e., access unit). In other words, a video coder may determine motion vectors and reference indices for each pixel based on disparity maps. This procedure may be repeated independently for each pixel of an encoded video unit. Consequently, in DBMP, motion vector and reference indices are not transmitted in the bitstream, but rather are obtained from the reference view at video decoder 30.

In some examples, VSP can be unified with motion vector prediction. For instance, VSP can be simplified to backward warping with no hole-filling. Backward warping is the inverse of warping. Warping is a process in which samples in reference view components are mapped, based on disparity, to locations in a target view component. Hole-filling is a process of filling in pixels that represent disoccluded portions of background objects in the target view component. Furthermore, when VSP is unified with motion vector prediction, a disparity value or a depth value may be applied to the whole 4×4 block. In this way, it is possible that view synthesis prediction can be simplified to traditional motion compensation, wherein the motion vector is derived from depth or disparity and is associated with each 4×4 block of an MB or MB partition. In this case, the VSP mode is redesigned to a so-called unified VSP mode.

The syntax described in Tables 3, 4 and 5, above, may be reused to support unification of VSP and motion vector prediction. However, several problems may occur when the syntax described in Tables 3, 4 and 5 is reused to support unification of view synthesis prediction and motion vector prediction. For example, in normal VSP as described in Tables 3, 4 and 5, above, the motion vector corresponding to each block is zero while disparity vectors may be used to derive motion vectors for the block using VSP. Thus, the motion vector should not always be equal to zero. In another example, in normal VSP, there is no prediction of the derived motion vectors for neighboring MBs coded with VSP modes because the motion vectors are zero. However, in the unified VSP mode, the derived motion vectors for blocks using VSP are not always zero.

In accordance with one or more techniques of this disclosure, the VSP picture is not added to a reference picture list. Thus, video encoder 20 may not need to signal motion information (e.g., reference indices, motion vectors, etc.) for a block coded using a VSP picture. Furthermore, because view synthesis can be realized by the unified VSP mode, it may be unnecessary for a video coder to generate the VSP picture.

For instance, when VSP is unified to depth-based motion vector prediction or disparity motion vector based motion vector prediction, signaling of the unified VSP mode is introduced to the MB or MB partition level to indicate whether an MB or MB partition is predicted from a VSP picture, by using the same syntax design as described in Tables 3, 4 and 5, above. Furthermore, when VSP is unified to depth-based motion vector prediction, each of the blocks belonging to the unified VSP mode has its motion vectors derived by depth map or disparity motion vectors from other spatial/temporal neighboring blocks.

In some examples, a unified VSP mode is identified by one of a sub_mb_vsp_flag, an mb_part_vsp_flag, or a vsp_mb_flag being equal to 1. In other examples, when none of sub_mb_vsp_flag, mb_part_vsp_flag, or vsp_mb_flag is signaled, a unified VSP mode may be identified by a reference index being signaled to a specific value. In these examples, the entropy coding (e.g., entropy encoding or entropy decoding) of the sub_mb_vsp_flag, the mb_part_vsp_flag, and the vsp_mb_flag may be the same as described elsewhere in this disclosure.

A video coder generates a VSP picture based on a reference picture. A slice header may indicate a view that contains the reference picture from which to generate the VSP picture. The 3D-AVC specification already indicates, in a slice header, the view to be used for view synthesis. This disclosure may use "refViewPicVSP" to denote the decoded picture of the view that is indicated in the slice header and that is in the same access unit as the reference view picture for VSP. The video coder may have already added refViewPicVSP to the reference picture list because a view used for view synthesis is typically a view that is used for normal MVC-fashion inter-view prediction. The video coder may determine a reference index (corresponding to RefPicList0) as follows. For each i from 0 to num_ref_idx_l0_active_minus1, inclusive, if RefPicList0[*i*] is equal to refViewPicVSP, the video coder may set the reference index to i. num_ref_idx_l0_active_minus1 may indicate the number of active reference pictures in RefPicList0, minus 1. If i is equal to num_ref_idx_l0_active_minus1 plus 1, the video coder may determine that the reference index is equal to i and refViewPicVSP is added into RefPicList0 as the last entry.

Alternatively, when the flags (e.g., vsp_mb_flag, mb_part_vsp_flag, etc.) are not used to indicate the unified VSP mode and a reference index (ref_idx_lx) is explicitly signaled, in addition, the reference index (ref_idx_lx) may be reset as follows. For each i from 0 to num_ref_idx_lX_active_minus1, inclusive, if RefPicListX[i] is equal to RefViewPicVSP, ref_idx_lx is set to i.

This derivation process for the reference index may be used to reduce the size of the reference picture lists at video decoder 30. Practically, there is no picture corresponding to the reference index ref_idx_lx that is added into the reference picture list. Instead, ref_idx_lx may be used purely to signal a unified VSP mode and the block which is coded with unified VSP mode is motion compensated from the RefPicList[ref_idx_lx], after ref_idx_lx is reset.

In examples where a current video unit (e.g., an MB, an MB partition, or a sub-MB partition) is coded with view synthesis mode, the derivation of motion vectors may include derivation, for each 4×4 block of the current video unit, of a motion vector. The motion vectors may all refer to the refViewPicVSP and are typically only predicted for RefPicList0, meaning the current video unit is only unidirectionally predicted.

There may be multiple ways to derive a motion vector for a current video unit of a current texture view component. For example, a video coder may derive the motion vector from the corresponding decoded depth view block. In this example, the video coder may get a representative depth value. When the depth picture as ¼ the resolution of the current texture picture (i.e., one 4×4 block in the current texture view component corresponds to one 2×2 region in the depth view component), the video coder may process the four values in the 2×2 region in various ways. For example, the maximum value of the four values may be returned as a representative depth value. In another example, the average value of the four values may be returned as the representative depth value. In another example, the median value of the four values is returned as the representative depth value. When the depth picture is not ¼ the resolution of the current texture picture, (i.e., one 4×4 block in the current texture view component corresponds to one N×M region in the depth view component), the video coder may determine the representative depth value in various ways. For example, the video decoder may determine the representative depth value to be the average of all depth pixels of the corresponding N×M region. In another example, the video decoder may determine the representative depth value to be the average of the four corner depth pixels of the corresponding N×M region. In another example, the video decoder may determine the representative depth value to be the maximum of the four corner depth pixels of the corresponding N×M region. In another example, the video decoder may determine the representative depth value to be the medium value of the four corner depth values of the corresponding N×M region. After determining the representative depth value, the video decoder may convert the representative depth value to a disparity vector and set the motion vector to the disparity vector. The y-axis component of the disparity vector (and motion vector) may be equal to 0.

Furthermore, there may be multiple ways to derive the motion vector from the depth map of a reference view when the corresponding depth view (i.e., the view with the sample, view_id) has not been decoded. Moreover, there may be multiple ways to derive the motion vector from the spatial/temporal neighboring block of the current block. Alternatively, the vertical component of the derived motion vector may be further reset to 0.

In some examples described above, two neighboring blocks coded with or without VSP mode may be considered to be inter predicted from two reference pictures. Thus, the boundary strength of the boundary between the two neighboring blocks may be equal to the case when two the neighboring blocks are both inter predicted but from two different reference pictures. This design of the deblocking filter can be used for a deblocking filter when a unified VSP mode is used in one of the neighboring blocks.

For example, when both of the neighboring blocks are predicted by VSP modes, a filter module (such as filter module 113 or 160) may compare the derived motion vectors, similar to the case in the deblocking filter when both blocks are predicted from the same reference picture and thus the motion vectors are compared. On the other hand, when one block is coded using unified VSP mode and the other block is coded with inter-view prediction and refViewPicVSP is equal to the inter-view prediction reference picture, the two blocks are considered to have the same reference picture. Furthermore, when one block is coded using the unified VSP mode and the other block is coded with a temporal reference picture, the block coded with unified VSP mode may be considered as an intra coded block.

As described above, the techniques of this disclosure may provide an efficient VSP mechanism for HEVC-based 3DV. These techniques may be implemented in various ways. In accordance with a first implementation for HEVC-based 3DV, a sequence parameter set may include flags to support VSP in HEVC-based 3DV. Table 28, below, shows a portion of an example syntax for a sequence parameter set in HEVC-based 3DV.

TABLE 28

Sequence parameter set RBSP syntax

| seq_parameter_set_rbsp( ) { | Descriptor |
|---|---|
| profile_idc | u(8) |
| reserved_zero_8bits /* equal to 0 */ | u(8) |
| level_idc | u(8) |
| ... | |
| if( sps_extension_flag ) { | |
| ... | |
| seq_vsp_flag | u(1) |
| if(seq_vsp_flag) | |
| vsp_in_cu_level_only_flag | u(1) |
| ... | |
| } | |
| rbsp_trailing_bits( ) | |
| } | |

In the example of Table 28, the SPS includes a seq_vsp_flag syntax element. If the seq_vsp_flag syntax element has a particular value (e.g., 1), the SPS includes a vsp_in_cu_level_only_flag syntax element. The seq_vsp_flag syntax element indicates whether VSP mode is enabled for all pictures referring to the SPS. For example, seq_vsp_flag equal to 1 may indicate that VSP mode is enabled for all pictures referring to the SPS. In this example, seq_vsp_flag equal to 0 may indicate that the VSP mode is disabled. Furthermore, in this example, when seq_vsp_flag is not present, video decoder 30 may infer seq_vsp_flag to be equal to 0.

The vsp_in_cu_level_only_flag syntax element may indicate whether VSP mode applies only to the CU level. For example, vsp_in_cu_level_only_flag equal to 1 may indicate that the VSP mode only applies to the CU level. Thus, if vsp_in_cu_level_only_flag is equal to 1, one PU may be predicted from the VSP picture but another PU may be predicted by other modes. In this example, vsp_in_cu_level_only_flag equal to 0 may indicate that the VSP mode applies to the PU level. Furthermore, in this example, when vsp_in_cu_level_only_flag is not present, video decoder 30 may infer vsp_in_cu_level_only_flag to be equal to 0. In other examples, the vsp_in_cu_level_only_flag is not present and VSP mode may always apply to the PU level.

In the first example implementation for HEVC-based 3DV, slice headers may include flags that support VSP in HEVC-based 3DV. Table 29, below, shows an example syntax for a slice header in HEVC-based 3DV.

TABLE 29

Slice header syntax

| slice_header( ) { | Descriptor |
|---|---|
| first_slice_in_pic_flag | u(1) |
| if( first_slice_in_pic_flag = = 0 ) | |
| slice_address | u(v) |
| slice_type | ue(v) |
| entropy_slice_flag | u(1) |
| if( !entropy_slice_flag ) { | |
| pic_parameter_set_id | ue(v) |
| if( output_flag_present_flag ) | |
| pic_output_flag | u(1) |
| if( separate_colour_plane_flag = = 1 ) | |
| colour_plane_id | u(2) |
| if( IdrPicFlag ) { | |
| idr_pic_id | ue(v) |

TABLE 29-continued

Slice header syntax

| | Descriptor |
|---|---|
| slice_header( ) { | |
|     no_output_of_prior_pics_flag | u(1) |
|   } else { | |
|     pic_order_cnt_lsb | u(v) |
|     short_term_ref_pic_set_sps_flag | u(1) |
|     if( !short_term_ref_pic_set_sps_flag ) | |
|       short_term_ref_pic_set( num_short_term_ref_pic_sets ) | |
|     else | |
|       short_term_ref_pic_set_idx | u(v) |
|     if( long_term_ref_pics_present_flag ) { | |
|       num_long_term pics | ue(v) |
|       for( i = 0; i < num_long_term_pics; i++ ) { | |
|         delta_poc_lsb_lt[ i ] | ue(v) |
|         delta_poc_msb_present_flag[ i ] | u(1) |
|         if( delta_poc_msb_present_flag[ i ] ) | |
|           delta_poc_msb_cycle_lt_minus1[ i ] | ue(v) |
|         used_by_curr_pic_lt_flag[ i ] | u(1) |
|       } | |
|     } | |
|   } | |
|   if( sample_adaptive_offset_enabled_flag ) { | |
|     slice_sao_interleaving_flag | u(1) |
|     slice_sample_adaptive_offset_flag | u(1) |
|     if( slice_sao_interleaving_flag && | |
|       slice_sample_adaptive_offset_flag ) { | |
|         sao_cb_enable_flag | u(1) |
|         sao_cr_enable_flag | u(1) |
|     } | |
|   } | |
|   if( scaling_list_enable_flag || | |
|     deblocking_filter_in_aps_enabled_flag || | |
|     ( sample_adaptive_offset_enabled_flag && !slice_sao_interleaving_flag) || | |
|     adaptive_loop_filter_enabled_flag ) | |
|     aps_id | ue(v) |
|   if( slice_type = = P || slice_type = = B ) { | |
|     num_ref_idx_active_override_flag | u(1) |
|     if( num_ref_idx_active_override_flag ) { | |
|       num_ref_idx_l0_active_minus1 | ue(v) |
|       if( slice_type = = B ) | |
|         num_ref_idx_l1_active_minus1 | ue(v) |
|     } | |
|   } | |
|   if( lists_modification_present_flag ) { | |
|     ref_pic_list_modification( ) | |
|     ref_pic_list_combination( ) | |
|   } | |
|   if( slice_type = = B ) | |
|     mvd_l1_zero_flag | u(1) |
| } | |
| if( cabac_init_present_flag && slice_type != I ) | |
|   cabac_init_flag | u(1) |
| if( !entropy_slice_flag ) { | |
|   slice_qp_delta | se(v) |
|   if( deblocking_filter_control_present_flag ) { | |
|     if( deblocking_filter_in_aps_enabled_flag ) | |
|       inherit_dbl_params_from_aps_flag | u(1) |
|     if( !inherit_dbl_params_from_aps_flag ) { | |
|       disable_deblocking_filter_flag | u(1) |
|       if( !disable_deblocking_filter_flag ) { | |
|         beta_offset_div2 | se(v) |
|         tc_offset_div2 | se(v) |
|       } | |
|     } | |
|   } | |
|   if ( seq_vsp_flag && slice_type !=I) | |
|     slice_vsp_enable_flag | u(1) |
|   if( slice_type = = B ) | |
|     collocated_from_l0_flag | u(1) |
|   if( slice_type != I && | |
|     ((collocated_from_l0_flag && num_ref_idx_l0_active_minus1 > 0) || | |
|       (!collocated_from_l0_flag && num_ref_idx _l1_active_minus1 > 0) ) | |
|     collocated_ref_idx | ue(v) |
|   if( ( weighted_pred_flag && slice_type = = P) || | |
|     ( weighted_bipred_idc = = 1 && slice_type = = B ) ) | |
|     pred_weight_table( ) | |
| } | |
| if( slice_type = = P || slice_type = = B ) | |

TABLE 29-continued

Slice header syntax

| slice_header( ) { | Descriptor |
|---|---|
|     five_minus_max_num_merge_cand | ue(v) |
|     if( adaptive_loop_filter_enabled_flag ) { | |
|         slice_adaptive_loop_filter_flag | u(1) |
|         if( slice_adaptive_loop_filter_flag && alf_coef_in_slice_flag ) | |
|             alf_param( ) | |
|         if( slice_adaptive_loop_filter_flag && !alf_coef_in_slice_flag ) | |
|             alf_cu_control_param( ) | |
|     } | |
|     if( seq_loop_filter_across_slices_enabled_flag && | |
|       ( slice_adaptive_loop_filter_flag \| \| slice_sample_adaptive_offset_flag \| \| | |
|         !disable_deblocking_filter_flag ) ) | |
|       slice_loop_filter_across_slices_enabled_flag | u(1) |
|     if( tiles_or_entropy_coding_sync_idc > 0 ) { | |
|       num_entry_point_offsets | ue(v) |
|       if( num_entry_point_offsets > 0 ) { | |
|         offset_len_minus1 | ue(v) |
|         for( i = 0; i < num_entry_point_offsets; i++ ) | |
|             entry_point_offset[ i ] | u(v) |
|       } | |
|     } | |
| } | |

In the example syntax of Table 29, the slice header of a slice includes a slice_vsp_enable_flag syntax element if the seq_vsp_flag syntax element of the applicable SPS indicates that VSP mode is enabled and the slice is not an I slice. The slice_vsp_enable_flag syntax element of the slice header may indicate whether VSP is enabled for the slice. For example, slice_vsp_enable_flag equal to 1 may indicate that VSP is enabled for the current slice. In this example, slice_vsp_enable_flag equal to 0 may indicate that VSP is disabled for the current slice. Furthermore, in this example, when slice_vsp_enable_flag is not present, video decoder 30 may infer slice_vsp_enable_flag to be equal to 0.

In the first implementation for HEVC-based 3DV, CUs may include flags that support VSP in HEVC-based 3DV. Table 30, below, shows an example syntax for a CU in HEVC-based 3DV.

TABLE 30

Coding unit syntax

| coding_unit( x0, y0, log2CbSize ) { | Descriptor |
|---|---|
|   CurrCbAddrTS = MinCbAddrZS[ x0 >> Log2MinCbSize ][ y0 >> Log2MinCbSize ] | |
|   if( slice_type != I ) { | |
|     if (slice_vsp_enable_flag ) | |
|       vsp_cu_flag[ x0 ][ y0 ] | ae(v) |
|       if(!vsp_cu_flag[ x0 ][ y0 ]) | |
|         skip_flag[ x0 ][ y0 ] | ae(v) |
|   } | |
|   if(!vsp_cu_flag[ x0 ][ y0 ] && skip_flag[ x0 ][ y0 ]) | |
|     prediction_unit( x0, y0 , log2CbSize ) | |
|   else if(!vsp_cu_flag[ x0 ][ y0 ] && ( slice_type != I \|\| log2CbSize = = Log2MinCbSize ) ){ | |
|     if( slice_type != I ) | |
|       pred_mode_flag | ae(v) |
|       if( PredMode != MODE_INTRA \|\| log2CbSize = = Log2MinCbSize ) | |
|         part_mode | ae(v) |
|     x1 = x0 + ( ( 1 << log2CbSize ) >> 1 ) | |
|     y1 = y0 + ( ( 1 << log2CbSize ) >> 1 ) | |
|     x2 = x1 − ( ( 1 << log2CbSize ) >> 2 ) | |
|     y2 = y1 − ( ( 1 << log2CbSize ) >> 2 ) | |
|     x3 = x1 + ( ( 1 << log2CbSize ) >> 2 ) | |
|     y3 = y1 + ( ( 1 << log2CbSize ) >> 2 ) | |
|     if( PartMode = = PART_2Nx2N ) | |
|       prediction_unit( x0, y0 , log2CbSize ) | |
|     else if( PartMode = = PART_2NxN ) { | |
|       prediction_unit( x0, y0 , log2CbSize ) | |
|       prediction_unit( x0, y1 , log2CbSize ) | |
|     } else if( PartMode = = PART_Nx2N ) { | |
|       prediction_unit( x0, y0 , log2CbSize ) | |
|       prediction_unit( x1, y0 , log2CbSize ) | |
|     } else if( PartMode = = PART_2NxnU ) { | |
|       prediction_unit( x0, y0 , log2CbSize ) | |
|       prediction_unit( x0, y2 , log2CbSize ) | |
|     } else if( PartMode = = PART_2NxnD ) { | |
|       prediction_unit( x0, y0 , log2CbSize ) | |
|       prediction_unit( x0, y3 , log2CbSize ) | |

TABLE 30-continued

Coding unit syntax

| coding unit( x0, y0, log2CbSize ) { | Descriptor |
|---|---|
|     } else if( PartMode = = PART_nLx2N ) { | |
|         prediction_unit( x0, y0 , log2CbSize ) | |
|         prediction_unit( x2, y0 , log2CbSize ) | |
|     } else if( PartMode = = PART_nRx2N ) { | |
|         prediction_unit( x0, y0 , log2CbSize ) | |
|         prediction_unit( x3, y0 , log2CbSize ) | |
|     } else { /* PART_NxN */ | |
|         prediction_unit( x0, y0 , log2CbSize ) | |
|         prediction_unit( x1, y0 , log2CbSize ) | |
|         prediction_unit( x0, y1 , log2CbSize ) | |
|         prediction_unit( x1, y1 , log2CbSize ) | |
|     } | |
|   } | |
|   if(!skip_flag[ x0 ][ y0 ]&&!pcm_flag ) | |
|     transform_tree( x0, y0, x0, y0, log2CbSize, log2CbSize, log2CbSize, 0, 0 ) | |
| } | |

In the example of Table 30, the CU includes a vsp_cu_flag syntax element if the slice_vsp_enable_flag syntax element of the slice header of the current slice (i.e., the slice that includes the CU) indicates that VSP is enabled for the current slice. The vsp_cu_flag[x0][y0] syntax element may indicate that a CU that includes a pixel at coordinates (x0, y0) of the current picture is predicted from a VSP picture. That is, the array indices x0, y0 may specify the location (x0, y0) of the top-left luma sample of the region of the current CU (i.e., the considered coding block) relative to the top-left luma sample of the current picture. For example, when the current CU is in a P or B slice, vsp_cu_flag[x0] [y0] equal to 1 may specify that pred_mode_flag and part_mode syntax elements of the current CU are not present, that the current CU does not include any PUs, and the whole current CU is predicted from the VSP picture. In this example, vsp_cu_flag[x0][y0] equal to 0 may specify that the whole current CU is not totally predicted from a VSP picture. Accordingly, if vsp_cu_flag[x0][y0] is equal to 0, the current CU may include one or more PUs. Furthermore, in this example, if vsp_cu_flag[x0][y0] is not present, video decoder 30 may infer vsp_cu_flag[x0][y0] to be equal to 0.

Furthermore, in the first example implementation for HEVC-based 3DV, PUs may include flags that support VSP. Table 31, below, shows an example syntax for a PU in HEVC-based 3DV.

TABLE 31

Prediction unit syntax

| prediction_unit( x0, y0, log2CbSize ) { | Descriptor |
|---|---|
|   if (!vsp_cu_flag) | |
|     if( PartMode != PART_2Nx2N && !vsp_in_cu_level_only_flag) | |
|       vsp_pu_flag[ x0 ][ y0 ] | ae(v) |
|   } | |
|   if(!vsp_pu_flag[ x0 ][ y0 ]) { | |
|   if(skip_flag[ x0 ][ y0 ] ) { | |
|     if( MaxNumMergeCand > 1 ) | |
|       merge_idx[ x0 ][ y0 ] | ae(v) |
|   } else if( PredMode = = MODE_INTRA ) { | |
|     if( PartMode = = PART_2Nx2N && pcm_enabled_flag && | |
|       log2CbSize >= Log2MinIPCMCUSize && | |
|       log2CbSize <= Log2MaxIPCMCUSize ) | |
|       pcm_flag | ae(v) |
|     if( pcm_flag ) { | |
|       num_subsequent_pcm | tu(3) |
|       NumPCMBlock = num_subsequent_pcm + 1 | |
|       while( !byte_aligned( ) ) | |
|         pcm_alignment_zero_bit | u(v) |
|       pcm_sample( x0, y0, log2CbSize ) | |
|     } else { | |
|       prev_intra_luma_pred_flag[ x0 ][ y0 ] | ae(v) |
|       if( prev_intra_luma_pred_flag[ x0 ][ y0 ] ) | |
|         mpm_idx[ x0 ][ y0 ] | ae(v) |
|       Else | |
|         rem_intra_luma_pred_mode[ x0 ][ y0 ] | ae(v) |
|       intra_chroma_pred_mode[ x0 ][ y0 ] | ae(v) |
|       SignalledAsChromaDC = | |
|         ( chroma_pred_from_luma_enabled_flag ? | |
|           intra_chroma_pred_mode[ x0 ][ y0 ] = = 3 : | |
|           intra_chroma_pred_mode[ x0 ][ y0 ] = = 2 ) | |
|     } | |
|   } else { /* MODE_INTER */ | |
|     merge_flag[ x0 ][ y0 ] | ae(v) |

TABLE 31-continued

Prediction unit syntax

| prediction_unit( x0, y0, log2CbSize ) { | Descriptor |
|---|---|
|     if(merge_flag[ x0 ][ y0 ] ) { | |
|         if( MaxNumMergeCand > 1 ) | |
|             merge_idx[ x0 ][ y0 ] | ae(v) |
|     } else { | |
|         if( slice_type = = B ) | |
|             inter_pred_flag[ x0 ][ y0 ] | ae(v) |
|         if( inter_pred_flag[ x0 ][ y0 ] = = Pred_LC ) { | |
|             if( num_ref_idx_lc_active_minus1 > 0 ) | |
|                 ref_idx_lc[ x0 ][ y0 ] | ae(v) |
|             mvd_coding(mvd_lc[ x0 ][ y0 ][ 0 ], | |
|                 mvd_lc[ x0 ][ y0 ][ 1 ]) | |
|             mvp_lc_flag[ x0 ][ y0 ] | ae(v) |
|         } else { /* Pred_L0 or Pred_BI */ | |
|             if( num_ref_idx_l0_active_minus1 > 0 ) | |
|                 ref_idx_l0[ x0 ][ y0 ] | ae(v) |
|             mvd_coding(mvd_l0[ x0 ][ y0 ][ 0 ], | |
|                 mvd_l0[ x0 ][ y0 ][ 1 ]) | |
|             mvp_l0_flag[ x0 ][ y0 ] | ae(v) |
|         } | |
|         if( inter_pred_flag[ x0 ][ y0 ] = = Pred_BI ) { | |
|             if( num_ref_idx_l1_active_minus1 > 0 ) | |
|                 ref_idx_l1[ x0 ][ y0 ] | ae(v) |
|             if( mvd_l1_zero_flag ) { | |
|                 mvd_l1[ x0 ][ y0 ][ 0 ] = 0 | |
|                 mvd_l1[ x0 ][ y0 ][ 1 ] = 0 | |
|             } else | |
|                 mvd_coding( mvd_l1[ x0 ][ y0 ][ 0 ], | |
|                     mvd_l1[ x0 ][ y0 ][ 1 ] ) | |
|             mvp_l1_flag[ x0 ][ y0 ] | ae(v) |
|         } | |
|         } | |
|     } | |
| } | |

In the syntax of Table 31, a PU may include a vsp_pu_flag[x0][y0] syntax element if the vsp_cu_flag for the CU indicates that the entire CU is not predicted from a VSP, if the CU is not partitioned according to the 2N×2N partitioning mode, and if the vsp_in_cu_level_only_flag of the applicable SPS does not indicate that the VSP mode only applies to the CU level. The vsp_pu_flag[x0][y0] syntax element may indicate whether the PU is coded with VSP prediction. In other words, vsp_pu_flag[x0][y0] may indicate whether the PU is predicted from a VSP picture. For example, vsp_pu_flag[x0][y0] equal to 1 may specify that the current PU is coded with VSP prediction and that further PU-related elements are not present in the PU. In this example, vsp_pu_flag[x0][y0] equal to 0 specifies the current PU is not coded with VSP prediction. When vsp_pu_flag[x0][y0] is not present, video decoder 30 may infer vsp_pu_flag[x0][y0] to be the same as the vsp_cu_flag[x0][y0] of the CU containing the PU. In another example, the bitstream is constrained such that not all PUs within one CU can have vsp_pu_flag equal to 1 if both vsp_cu_flag and vsp_in_cu_level_only_flag are equal to 0.

In the example of Table 31, above, vsp_cu_flag may be the value of vsp_cu_flag of the CU containing this PU. Alternatively, in Table 31, the condition "if(vsp_cu_flag)" can be changed to explicitly specify the vsp_cu_flag based on the coordinates and size of the CU:
if(vsp_cu_flag[x0>>log 2CbSize<<log 2CbSize][y0>>log 2CbSize<<log 2CbSize])

Furthermore, in the first example implementation for HEVC-based 3DV, a video coder performs a process to generate a predictive block for a CU or a PU when the CU or the PU uses VSP mode. In some examples, the CU or the PU may use VSP mode if the vsp_cu_flag syntax element or the vsp_pu_flag syntax element applicable to the PU is equal to 1. In this process, the current CU or PU may have a left-top pixel with coordinates (x, y) in the luma component and (x', y') in the chroma components. Furthermore, in this process, the size of the current CU or PU is assumed to be N×M. Starting from coordinates (x', y') with the size of N/2×M/2 in the case of the 4:2:0 video format, N×M in the case of the 4:4:4 video format, or N×M/2 in the case of the 4:2:2 video format, motion compensation unit 164 may set the values of pixels in each block of a chroma component of the VSP picture to pixels of the current CU or PU, starting with the same coordinates of the chroma components (x', y'). For example, motion compensation unit 164 may generate a predictive Cb or Cr block for the current CU or PU such that each Cb or Cb sample matches a Cb or Cr sample at a corresponding location in the VSP picture. In this example, motion compensation unit 164 may start generating the predictive Cb or Cr block from coordinates (x', y') of a Cb or Cr block of the VSP picture. Furthermore, in this example, the predictive Cb or Cr block may be of size N/2×M/2, N×M, or n×M/2 if the chroma blocks of the VSP picture are down-sampled according to the 4:2:0 video format, the 4:4:4 video format, or the 4:2:2 video format, respectively.

Furthermore, in the first example implementation for HEVC-based 3DV, a video coder may maintain a context for vsp_cu_flag. The context for vsp_cu_flag may be used to provide the context for entropy encoding both vsp_pu_flag and vsp_cu_flag. The video coder may update the context for vsp_cu_flag when the video coder entropy codes both vsp_pu_flags and vsp_cu_flags. When vsp_cu_flag is equal to 1, each PU of the CU is inferred to have VspFlag equal to 1. Furthermore, when vsp_cu_flag is equal to 1, each 4×4 block in the CU has VspFlag equal to 1. When vsp_cu_flag is equal to 0, PUs in the CU may have different values of vsp_pu_flag. If one PU has a vsp_pu_flag equal to 1, then VspFlags for all 4×4 blocks in the PU are set to 1.

In the first example implementation for HEVC-based 3DV, a video encoder may initialize a context for the VspFlag. The initial probability for the context of the VspFlag of P slices may be different from that of the B slices. The VspFlag may apply to both P and B slices. Furthermore, in the first example implementation for HEVC-based 3DV, when the entropy coder is entropy coding the VspFlag, the entropy coder may determine the ctxIdxInc for a bin associated with the VspFlag. In some examples, the ctxIdxInc for the bin may be the sum of condTermFlagA and condTermFlagB. That is, ctxIdxInc may be derived as ctxIdxInc=condTermFlagA+condTermFlagB. In another example, the ctxIdxInc for the bin may be equal to condTermFlagA. That is, ctxIdxInc may be derived as ctxIdxInc=condTermFlagA. In another example, the ctxIdxIdc for the bin is equal to condTermFlagB. That is, ctxIdxInc may be derived as ctxIdxInc=condTermFlagB. In another example, ctxIdxInc is fixed to be equal to 0.

In the examples above, the entropy coder may determine condTermFlagA and condTermFlagB based at least in part on whether data associated with particular blocks that neighbor a current CU or PU are available for use in the entropy coding process for syntax elements associated with the current CU or PU. For example, uiPAddrA may denote the neighboring 4×4 block to the left of the current CU or PU and uiPAddrB may denote the neighboring 4×4 block above the current CU or PU. In some examples, if uiPAddrN (where N is either A or B) is not available or VspFlag for the block uiPAddrN is equal to 0, condTermFlagN is equal to 0. Otherwise, in this example, if uiPAddrN is available and VspFlag for the block uiPAddrN is equal to 1), condTermFlagN is equal to 1.

In the first example implementation for HEVC-based 3DV, a filter unit (such as filter unit 114 of video encoder 20 or filter unit 160 of video decoder 30) may perform a deblocking filter process. In this process, the filter unit calculates a boundary strength (bS) for a boundary between two neighboring pixels p0 and q0. In this example, the filter unit may determine a boundary strength related to a VSP region. The VSP region may be a region of neighboring PUs or CUs that are each coded with VSP mode.

To determine the boundary strength related to the VSP region, the filter unit may determine whether the boundary of p0 and q0 crosses the boundary of a VSP region. If the boundary of p0 and q0 does not cross the boundary of a VSP region, the filter unit may set the boundary strength to the same boundary strength as that for the case when the boundary of p0 and q0 is within an inter-predicted region. An inter-predicted region is a region of neighboring PUs or CUs that are all coded with the same reference picture/picture pairs and the same or similar (i.e., the same after rounded to a certain accuracy) motion vectors.

On the other hand, if the boundary of p0 and q0 crosses the boundary between a VSP region and an inter-predicted region, the filter unit may set the boundary strength to the same boundary strength as that for the case when the boundary crosses two inter-predicted regions. When either p0 or q0 belongs to an intra coded CU, the filter unit may set the boundary strength to the same boundary strength as the case when p0 belongs to an intra predicted CU and q0 belongs to an inter-predicted region. When p0 belongs to an intra coded CU, q0 belongs to a VSP region. Likewise, when q0 belongs to an intra coded CU, p0 belongs to a VSP region. An intra predicted region may be a CU coded with a certain intra prediction mode.

A second example implementation for HEVC-based 3DV may be similar to the first example implementation for HEVC-based 3DV. However, in the second example implementation for HEVC-based 3DV, VSP is applied only to the CU level, not the PU level. In this second example implementation for HEVC-based 3DV, the syntax and semantics for PUs are not modified relative to the main profile described in HEVC Working Draft 6. Furthermore, unlike in the first example implementation for HEVC-based 3DV, entropy coding of vsp_cu_flag may rely only on the vsp_cu_flag because in this second example implementation for HEVC-based 3DV, there is no vsp_pu_flag. In this second example implementation for HEVC-based 3DV, video encoder 20 does not signal vsp_in_pu_level_flag and video decoder 30 may always infer (i.e., automatically determine) vsp_in_pu_level_flag to be equal to 0.

A third example implementation for HEVC-based 3DV may be similar to the first example implementation for HEVC-based 3DV. However, the third example implementation for HEVC-based 3DV may have a different syntax structure for CUs than the first example implementation for HEVC-based 3DV. In the third example implementation for HEVC-based 3DV, the syntax structure for a CU is described in Table 32, below.

TABLE 32

| Coding unit syntax | |
|---|---|
| coding_unit( x0, y0, log2CbSize ) { | Descriptor |
|   CurrCbAddrTS = MinCbAddrZS[ x0 >> Log2MinCbSize ][ y0 >> Log2MinCbSize ] | |
|   if( slice_type != I ) { | |
|     skip_flag[ x0 ][ y0 ] | ae(v) |
|     if (slice_vsp_enable_flag ) | |
|       vsp_cu_skip_flag[ x0 ][ y0 ] | ae(v) |
|   } | |
|   if(skip_flag[ x0 ][ y0 ] &&!vsp_cu_skip_flag[ x0 ][ y0 ]) | |
|     prediction_unit( x0, y0 , log2CbSize ) | |
|   else if(slice_type != I | | log2CbSize = = Log2MinCbSize ){ | |
|     if (slice_vsp_enable_flag && slice_type != I) | |
|       vsp_cu_flag[ x0 ][ y0 ] | ae(v) |
|       if(!vsp_cu_flag[ x0 ][ y0 ]) { | |
|         if( slice_type != I ) | |
|           pred_mode_flag | ae(v) |
|         if( PredMode != MODE_INTRA | | log2CbSize = = Log2MinCbSize ) | |
|           part_mode | ae(v) |

TABLE 32-continued

Coding unit syntax

```
coding_unit( x0, y0, log2CbSize ) {                                              Descriptor
        x1 = x0 + ( ( 1 << log2CbSize ) >> 1 )
        y1 = y0 + ( ( 1 << log2CbSize ) >> 1 )
        x2 = x1 − ( ( 1 << log2CbSize ) >> 2 )
        y2 = y1 − ( ( 1 << log2CbSize ) >> 2 )
        x3 = x1 + ( ( 1 << log2CbSize ) >> 2 )
        y3 = y1 + ( ( 1 << log2CbSize ) >> 2 )
        if( PartMode = = PART_2Nx2N )
            prediction_unit( x0, y0 , log2CbSize )
        else if( PartMode = = PART_2NxN ) {
            prediction_unit( x0, y0 , log2CbSize )
            prediction_unit( x0, y1 , log2CbSize )
        } else if( PartMode = = PART_Nx2N ) {
            prediction_unit( x0, y0 , log2CbSize )
            prediction_unit( x1, y0 , log2CbSize )
        } else if( PartMode = = PART_2NxnU ) {
            prediction_unit( x0, y0 , log2CbSize )
            prediction_unit( x0, y2 , log2CbSize )
        } else if( PartMode = = PART_2NxnD ) {
            prediction_unit( x0, y0 , log2CbSize )
            prediction_unit( x0, y3 , log2CbSize )
        } else if( PartMode = = PART_nLx2N ) {
            prediction_unit( x0, y0 , log2CbSize )
            prediction_unit( x2, y0 , log2CbSize )
        } else if( PartMode = = PART_nRx2N ) {
            prediction_unit( x0, y0 , log2CbSize )
            prediction_unit( x3, y0 , log2CbSize )
        } else { /* PART_NxN */
            prediction_unit( x0, y0 , log2CbSize )
            prediction_unit( x1, y0 , log2CbSize )
            prediction_unit( x0, y1 , log2CbSize )
            prediction_unit( x1, y1 , log2CbSize )
        }
    }
    if(pcm_flag )
        transform_tree( x0, y0, x0, y0, log2CbSize, log2CbSize, log2CbSize, 0, 0 )
    }
}
```

The example syntax structure of Table 32 includes a skip_flag[x0][y0]. skip_flag[x0][y0] equal to 1 specifies that, for the current CU, when decoding a P or B slice, no more syntax elements except the motion vector predictor indices might be decoded after skip_flag[x0][y0]. skip_flag[x0][y0] equal to 0 specifies that the CU is not skipped. The array indices x0, y0 specify the location (x0,y0) of the top-left luma sample of the considered coding block relative to the top-left luma sample of the picture. When skip_flag[x0][y0] is not present, video decoder 30 may infer skip_flag[x0][y0] to be equal to 0. A CU with skip_flag[x0][y0] equal to 1 may be either a conventional skip CU in HEVC or a CU coded with VSP and has no residue signaled, thus the transform_tree syntax structure is not present in the CU.

In accordance with one or more techniques of this disclosure, the CU may include a vsp_cu_skip_flag[x0][y0] syntax element if the slice_vsp_enable_flag is equal to 1. The vsp_cu_skip_flag[x0][y0] syntax element indicates whether the current CU is predicted by the VSP mode. For example, vsp_cu_skip_flag[x0][y0] equal to 1 specifies that the current CU is encoded using skip mode and predicted from the VSP picture. In this example, vsp_cu_skip_flag[x0][y0] equal to 0 specifies that the current CU is predicted with conventional HEVC skip mode. When a CU is in a P or B slice and the CU is encoded in conventional HEVC skip mode, no more syntax elements except the motion vector predictor indices are decoded after skip_flag[x0][y0]. Hence, in accordance with one or more techniques of this disclosure, the CU may include a PU if skip_flag[x0][y0] is equal to 1 and vsp_cu_skip_flag[x0][y0] is not equal to 1.

Furthermore, if skip_flag[x0][y0] is not equal to 0 or vsp_cu_skip_flag[x0][y0] is equal to 1, and the current slice is not an I slice and the slice_vsp_enable_flag is equal to 1, the CU may, in accordance with one or more techniques of this disclosure, include a vsp_cu_flag[x0][y0] syntax element. vsp_cu_flag[x0][y0] may indicate whether, when decoding a P or B slice, pred_mode_flag, part_mode, or syntax element in the prediction unit syntax table are present in the CU and the whole CU is predicted from the VSP picture. For example, vsp_cu_flag[x0][y0] equal to 1 may specify that for the current CU, when decoding a P or B slice, and pred_mode_flag, part_mode or syntax elements in prediction unit syntax table are not present and the whole CU is predicted from the VSP picture. In this example, vsp_cu_flag[x0][y0] equal to 0 specifies that the whole CU is not totally predicted from a VSP picture. The array indices x0, y0 specify the location (x0,y0) of the top-left luma sample of the considered coding block relative to the top-left luma sample of the picture. When not present, vsp_cu_flag[x0][y0] is inferred to be equal to max(0, vsp_cu_skip_flag[x0][y0]).

In the third example implementation for HEVC-based 3DV, an entropy coding unit, such as entropy encoding unit 118 of FIG. 2 or entropy decoding unit 150 of FIG. 3, may maintain an entropy coding context for vsp_cu_flag. The entropy coding unit may use the entropy coding context for vsp_cu_flag for the coding of vsp_pu_flag, vsp_cu_skip_flag and vsp_cu_flag. The entropy coding unit may update the entropy coding context for vsp_cu_flag when the entropy coding unit codes vsp_cu_skip_flags, vsp_cu_flags, and vsp_cu_flags. When vsp_cu_flag or vsp_cu_skip_flag is equal to 1, each PU of the CU may be inferred to have VspFlag equal to 1. In addition, each 4×4 block in the CU has VspFlag equal to 1. Furthermore, when vsp_cu_flag is 0, PUs in the CU may have different values of vsp_pu_flag. If one PU has vsp_pu_flag equal to 1, then VspFlag for all the 4×4 blocks in the PU are set to 1.

In the third example implementation for HEVC-based 3DV, the context modeling for the VspFlag includes context initialization and context selection. In the context initialization, the VSP mode applies for both P slices and B slices. The initial probability for the context of VspFlag of P slices may be different from the B slices.

In the context selection, uiPAddrA denotes the neighboring 4×4 block to the left of the current CU or PU and uiPAddrB denotes the neighboring 4×4 block above the current CU or PU. Furthermore, the entropy coding unit may determine the variable condTermFlagN (with N being either A or B). If uiPAddrA is not available or VspFlag for the block uiPAddrA is equal to 0, the entropy coding unit may set condTermFlagN equal to 0. Otherwise, if uiPAddrN is available and VspFlag for the block uiPAddrN is equal to 1, the entropy coding unit may set condTermFlagN equal to 1.

Furthermore, in the third example implementation for HEVC-based 3DV, the entropy coding unit may use a context index ctxIdx to code the VspFlag. The entropy coding unit may determine an increment to ctxIdx (i.e., ctxIdxInc) as ctxIdxInc=condTermFlagA+condTermFlagB. In alternatively example, the entropy coding unit may derived ctxIdxInc such that ctxIdxInc=condTermFlagA. In another alternative example, the entropy coding unit may derive ctxIdxInc such that ctxIdxInc=condTermFlagB. In another alternative example, ctxIdxInc may be fixed at zero.

A fourth example implementation for HEVC-based 3DV may be similar to the first example implementation for HEVC-based 3DV. However, in the fourth example implementation for HEVC-based 3DV, the syntax for CUs may be defined by Table 33, below.

TABLE 33

| Coding unit syntax | Descriptor |
|---|---|
| coding_unit( x0, y0, log2CbSize ) { | |
|     CurrCbAddrTS = MinCbAddrZS[ x0 >> Log2MinCbSize ][ y0 >> Log2MinCbSize ] | |
|     if( slice_type != I ) { | |
|         if (slice_vsp_enable_flag ) | |
|             vsp_cu_flag[ x0 ][ y0 ] | ae(v) |
|         skip_flag[ x0 ][y0 ] | ae(v) |
|     } | |
|     if(!vsp_cu_flag[ x0 ][ y0 ] && skip_flag[ x0 ][ y0 ]) | |
|         prediction_unit( x0, y0 , log2CbSize ) | |
|     else if(!vsp_cu_flag[ x0 ][ y0 ] && ( slice_type != I | | log2CbSize = = Log2MinCbSize ) ){ | |
|         if( slice_type != I ) | |
|             pred_mode_flag | ae(v) |
|         if( PredMode != MODE_INTRA | | log2CbSize = = Log2MinCbSize ) | |
|             part_mode | ae(v) |
|         x1 = x0 + ( ( 1 << log2CbSize ) >> 1 ) | |
|         y1 = y0 + ( ( 1 << log2CbSize ) >> 1 ) | |
|         x2 = x1 − ( ( 1 << log2CbSize ) >> 2 ) | |
|         y2 = y1 − ( ( 1 << log2CbSize ) >> 2 ) | |
|         x3 = x1 + ( ( 1 << log2CbSize ) >> 2 ) | |
|         y3 = y1 + ( ( 1 << log2CbSize ) >> 2 ) | |
|         if( PartMode = = PART_2Nx2N ) | |
|             prediction_unit( x0, y0 , log2CbSize ) | |
|         else if( PartMode = = PART_2NxN ) { | |
|             prediction_unit( x0, y0 , log2CbSize ) | |
|             prediction_unit( x0, y1 , log2CbSize ) | |
|         } else if( PartMode = = PART_Nx2N ) { | |
|             prediction_unit( x0, y0 , log2CbSize ) | |
|             prediction_unit( x1, y0 , log2CbSize ) | |
|         } else if( PartMode = = PART_2NxnU ) { | |
|             prediction_unit( x0, y0 , log2CbSize ) | |
|             prediction_unit( x0, y2 , log2CbSize ) | |
|         } else if( PartMode = = PART_2NxnD ) { | |
|             prediction_unit( x0, y0 , log2CbSize ) | |
|             prediction_unit( x0, y3 , log2CbSize ) | |
|         } else if( PartMode = = PART_nLx2N ) { | |
|             prediction_unit( x0, y0 , log2CbSize ) | |
|             prediction_unit( x2, y0 , log2CbSize ) | |
|         } else if( PartMode = = PART_nRx2N ) { | |
|             prediction_unit( x0, y0 , log2CbSize ) | |
|             prediction_unit( x3, y0 , log2CbSize ) | |
|         } else { /* PART_NxN */ | |
|             prediction_unit( x0, y0 , log2CbSize ) | |
|             prediction_unit( x1, y0 , log2CbSize ) | |
|             prediction_unit( x0, y1 , log2CbSize ) | |
|             prediction_unit( x1, y1 , log2CbSize ) | |
|         } | |
|     } | |
|     if(!skip_flag[ x0 ][ y0 ]&&!pcm_flag ) | |
|         transform_tree( x0, y0, x0, y0, log2CbSize, log2CbSize, log2CbSize, 0, 0 ) | |
| } | |

In the example syntax of Table 33, the CU includes a vsp_cu_flag[x0][y0]. vsp_cu_flag[x0][y0] for a CU may indicate whether, when decoding a P or B slice, pred_mode_flag, part_mode or syntax elements in the prediction unit syntax table are not present and the whole CU is predicted from the VSP picture. For example, vsp_cu_flag[x0][y0] equal to 1 may specify that for the current CU, when decoding a P or B slice, and pred_mode_flag, part_mode or syntax elements in the PU syntax table are not present and the whole CU is predicted from the VSP picture. In this example, vsp_cu_flag[x0][y0] equal to 0 specifies that the whole CU is not totally predicted from a VSP picture. The array indices x0, y0 specify the location (x0,y0) of the top-left luma sample of the considered coding block relative to the top-left luma sample of the picture. When vsp_cu_flag[x0][y0] is not present, vsp_cu_flag[x0][y0] may be inferred to be equal to 0.

In addition, the CU may include a skip_flag[x0][y0] that indicates whether the current CU, when decoding a P or B slice, includes syntax elements other than the motion vector predictor indices (e.g., merge_idx, mvp_lc_flag, mvp_l0_flag, mvp_l1_flag, etc.). For example, skip_flag[x0][y0] equal to 1 specifies that for the current CU, when decoding a P or B slice, no more syntax elements except the motion vector predictor indices might be decoded after skip_flag[x0][y0]. In this example, skip_flag[x0][y0] equal to 0 specifies that the CU is not skipped. The array indices x0, y0 specify the location (x0,y0) of the top-left luma sample of the considered coding block relative to the top-left luma sample of the picture. When skip_flag[x0][y0] is not present, skip_flag[x0][y0] may be inferred to be equal to 0. A CU with skip_flag equal to 1 may be either a conventional skip CU in HEVC or a CU coded with VSP and has no residue signaled, thus the transform tree syntax structure is not present. The transform tree syntax structure may include residual information for the CU.

FIG. 4A is a flowchart illustrating an example operation 200 of video encoder 20, in accordance with one or more techniques of this disclosure. The flowchart of FIG. 4A and the flowcharts of the following figures are provided as examples. In other examples, the techniques of this disclosure may be implemented using more, fewer, or different steps than those shown in the example of FIG. 4A and the following figures.

In the example of FIG. 4A, video encoder 20 may generate, based at least in part on a previously-coded texture view component of a current access unit and a depth view component of the current access unit, a VSP picture (201). Furthermore, video encoder 20 may signal, in a bitstream that includes an encoded representation of multiple texture views and depth views, a syntax element indicating whether a current video unit is predicted from a VSP picture (202). In some examples, the current video unit may be a MB or an MB partition of a current texture view component of a current access unit. In at least some examples where the current video unit is a MB, video encoder 20 may signal, in the bitstream, an MB layer syntax structure that includes the syntax element. In such examples, the syntax element may be vsp_mb_flag. In at least some examples where the current video unit is a MB partition, video encoder 20 may signal, in the bitstream, a syntax structure that includes the syntax element. In such examples, the syntax structure may be a MB prediction syntax structure or a sub-MB prediction syntax structure and the syntax element may be mb_part_vsp_flag or sub_mb_vsp_flag.

Furthermore, video encoder 20 may determine, based at least in part on whether the current video unit is predicted from the VSP picture, whether to signal, in the bitstream, motion information for the current video unit (204). In response to determining that the current video unit is not predicted from a VSP picture ("NO" of 204), video encoder 20 may signal, in the bitstream, motion information for the current video unit (206). Otherwise ("YES" of 204), video encoder 20 may omit, from the bitstream, the motion information for the current video unit (208). In either case, video encoder 20 may output the bitstream (210). The motion information for the current video unit may include a reference index and a motion vector difference. The reference index may indicate a position within a reference picture list (e.g. RefPicList0 or RefPicList1) and the motion vector difference may indicate a difference between a motion vector predictor and a motion vector of the current video unit.

FIG. 4B is a flowchart illustrating an example operation 250 of video decoder 30, in accordance with one or more techniques of this disclosure. In the example of FIG. 4B, video decoder 30 may generate, based at least in part on a previously-coded texture view component of a current access unit and a depth view component of the current access unit, a VSP picture (251). Furthermore, video decoder 30 may decode, from a bitstream that includes a coded representation of multiple texture views and multiple depth views, a syntax element that indicates whether a current video unit is predicted from a VSP picture (252). In some examples, the current video unit may be an MB or an MB partition of a current texture view component of a current view of the current access unit. In at least some examples where the current video unit is a MB, video decoder 30 may decode, from the bitstream, a MB layer syntax structure that includes the syntax element. In some such examples, the syntax element may be vsp_mb_flag. In at least some examples where the current video unit is a MB partition, video decoder may decode, from the bitstream, a syntax structure that includes the syntax element. In such examples, the syntax structure may be a MB prediction syntax structure or a sub-MB prediction syntax structure and the syntax element may be mb_part_vsp_flag or sub_mb_vsp_flag.

Furthermore, video decoder 30 may determine whether the current video unit is predicted from a VSP picture (254). When the current video unit is not predicted from a VSP picture ("NO" of 254), video decoder 30 may decode, from the bitstream, motion information for the current video unit (256). In addition, video decoder 30 may use the motion information for the current video unit to reconstruct sample blocks of the current video unit (258). When the current video unit is predicted from the VSP picture ("YES" of 256), video decoder 30 may use the VSP picture to reconstruct the sample blocks of the current video unit (260).

Figures 5A, 5B:
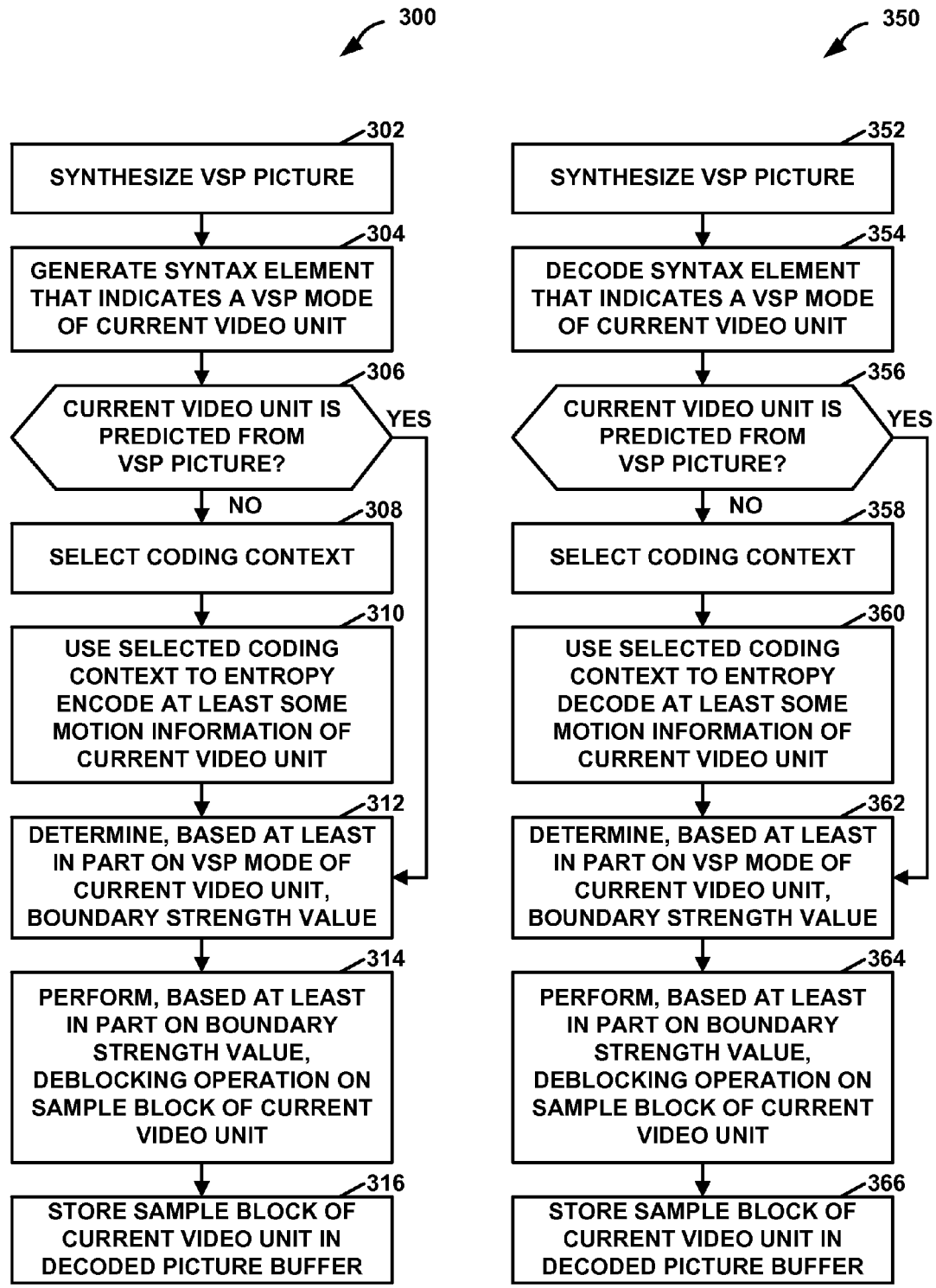
FIG. 5A is a flowchart illustrating another example operation of the video encoder, in accordance with the techniques of this disclosure.
FIG. 5B is a flowchart illustrating another example operation of the video decoder, in accordance with the techniques of this disclosure.

FIG. 5A is a flowchart illustrating another example operation 300 of video encoder 20, in accordance with the techniques of this disclosure. As illustrated in the example of FIG. 5A, video encoder 20 may synthesize a VSP picture based at least in part on a depth map and one or more texture view components (302). Furthermore, video encoder 20 may generate a syntax element that indicates a VSP mode of the current video unit (304). The VSP mode may indicate whether the current video unit is predicted from a VSP picture. In addition, video encoder 20 may determine whether the current video unit is predicted from the VSP picture (306).

When the current video unit is not predicted from the VSP picture or when the current video unit is not predicted from the VSP picture ("NO" of 306), video encoder 20 may select, based at least in part on whether a neighboring video unit is predicted from the VSP picture, a coding context (308). A sample block of the neighboring video unit neighbors a sample block of the current video unit. In addition, video encoder 20 may use the selected coding context to entropy encode at least some motion information of the current video unit (310).

Furthermore, regardless of whether the current video unit is predicted from the VSP picture, video encoder 20 may determine, based at least in part on the VSP mode of the current video unit, a boundary strength value (312). In addition, video encoder 20 may perform, based at least in part on the boundary strength value, a deblocking operation on a sample block of the current video unit (314). Video encoder 20 may store the sample block of the current video unit in decoded picture buffer 116 (316).

FIG. 5B is a flowchart illustrating another example operation 350 of video decoder 30, in accordance with the techniques of this disclosure. As illustrated in the example of FIG. 5B, video decoder 30 may synthesize a VSP picture based at least in part on a depth map and one or more texture view components (352). Furthermore, video decoder 30 may decode, from a bitstream, a syntax element that indicates a VSP mode of a current video unit (354). The VSP mode may indicate whether the current video unit is predicted from a VSP picture. In addition, video decoder 30 may determine, based at least in part on the syntax element, whether the current video unit is predicted from the VSP picture (356).

When the current video unit is not predicted from the VSP picture ("NO" of 356), video decoder 30 may select, based at least in part on whether a neighboring video unit is predicted from the VSP picture, a coding context (358). A sample block of the neighboring video unit neighbors a sample block of the current video unit. In addition, video decoder 30 may use the selected coding context to entropy decode at least some motion information of the current video unit (360).

When the current video unit is not predicted from the VSP picture or when the current video unit is predicted from the VSP picture ("YES" of 356), video decoder 30 may determine, based at least in part on the VSP mode of the current video unit, a boundary strength value (362). In addition, video decoder 30 may perform, based at least in part on the boundary strength value, a deblocking operation on a sample block of the current video unit (364). Video decoder 30 may store the sample block of the current video unit in decoded picture buffer 162 (366).

FIG. 6A is a flowchart illustrating another example operation 400 of video encoder 20, in accordance with the techniques of this disclosure. In the example of FIG. 6A, video encoder 20 may signal, in the bitstream, a slice header syntax structure for a slice that includes a current MB (402). The slice header syntax structure may include a syntax element (e.g., slice_vsp_flag) that indicates whether VSP is allowed for the slice.

Furthermore, video encoder 20 may determine whether VSP is allowed for the slice and whether the current MB is encoded using skip mode (404). When VSP is allowed for the slice and the current MB is encoded using skip mode ("YES" of 404), video encoder 20 may include, in a slice data syntax structure for the slice, a syntax element (e.g., skip_from_vsp_flag) that indicates whether the current MB is predicted from the VSP picture or whether the current MB is predicted from another reference picture (406). Otherwise, when VSP is not allowed for the slice or the current MB is not encoded using skip mode ("NO" of 404), video encoder 20 may omit the syntax element (e.g., skip_from_vsp_flag) from the slice data syntax structure (408). In either case, video encoder 20 may signal, in the bitstream, the slice header syntax structure and the slice data syntax structure (410). In this way, video encoder 20 may signal, in the bitstream, a slice data syntax structure syntax element for a slice that includes the MB, wherein the slice data syntax structure includes a second syntax element when the MB is encoded using skip mode, the second syntax element indicating whether all of the MB is predicted from the VSP picture or whether the MB is predicted from another reference picture.

FIG. 6B is a flowchart illustrating another example operation 450 of video decoder 30, in accordance with the techniques of this disclosure. In the example of FIG. 6B, video decoder 30 may decode, from the bitstream, a slice header syntax structure for a slice that includes a current MB (452). The slice header syntax structure may include a syntax element (e.g., slice_vsp_flag) that indicates whether VSP is allowed for the slice.

Furthermore, video decoder 30 may determine whether VSP is allowed for the slice and whether the current MB is encoded using skip mode (454). When VSP is allowed for the slice and the current MB is encoded using skip mode ("YES" of 454), video decoder 30 may determine that a slice data syntax structure for the slice includes a syntax element (e.g., skip_from_vsp_flag) that indicates whether the current MB is predicted from the VSP picture or whether the current MB is predicted from another reference picture (456). Otherwise, when VSP is not allowed for the slice or the current MB is not encoded using skip mode ("NO" of 454), video decoder 30 may determine that the syntax element (e.g., skip_from_vsp_flag) is omitted from the slice data syntax structure (458). In either case, video decoder 30 may reconstruct sample blocks of the current MB (460). In this way, video decoder 30 may decode, from the bitstream, a slice data syntax structure syntax element for a slice that includes the MB, wherein the slice data syntax structure includes a second syntax element when the MB is encoded using skip mode, the second syntax element indicating whether all of the MB is predicted from the VSP picture or whether the MB is predicted from another reference picture.

Figures 7A, 7B:
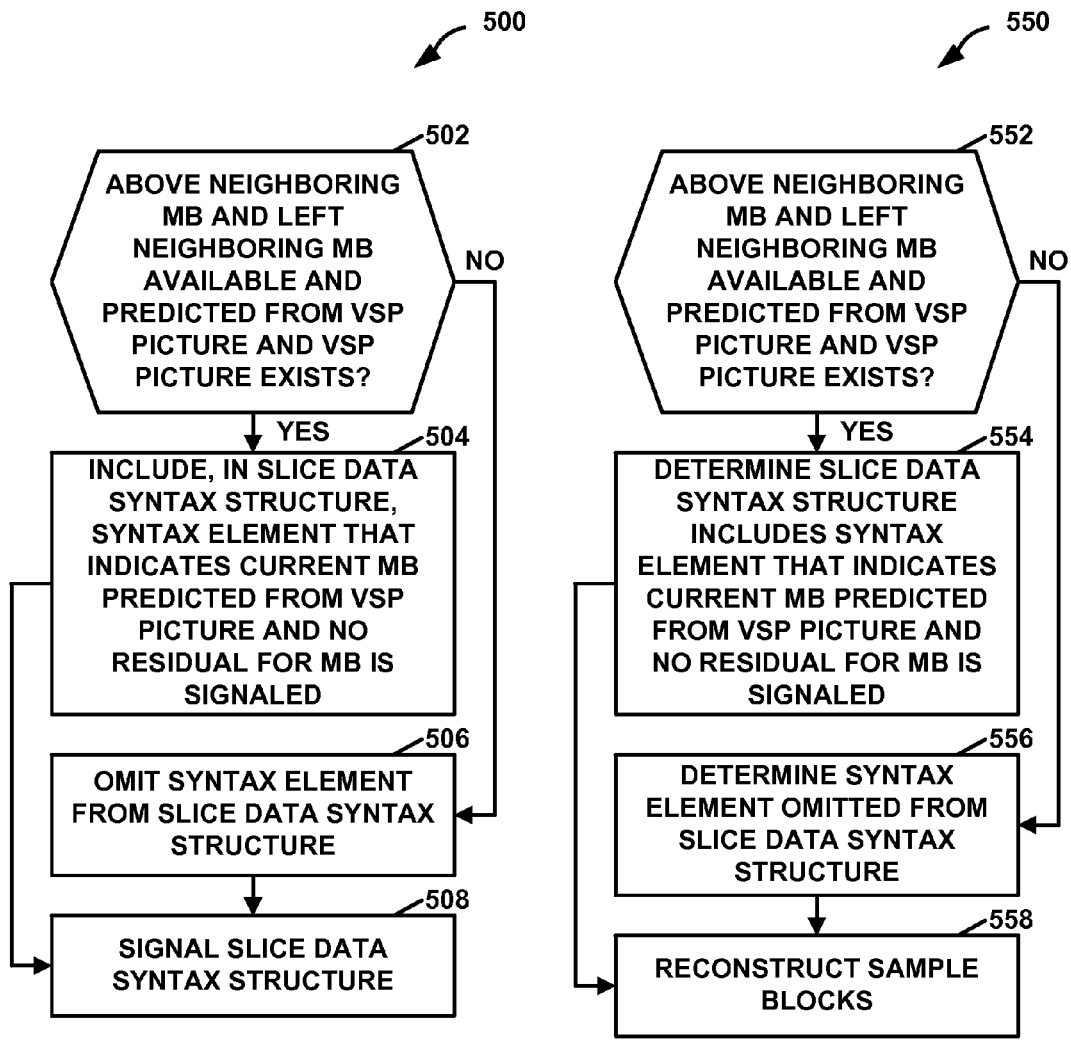
FIG. 7A is a flowchart illustrating another example operation of the video encoder, in accordance with the techniques of this disclosure.
FIG. 7B is a flowchart illustrating another example operation of the video decoder, in accordance with the techniques of this disclosure.

FIG. 7A is a flowchart illustrating another example operation 500 of video encoder 20, in accordance with the techniques of this disclosure. In the example of FIG. 7A, video encoder 20 may determine whether an above neighboring MB and a left neighboring MB are available for use in coding a current MB, the above neighboring MB and the left neighboring MB are predicted from the VSP picture, and the VSP picture exists (502).

When the above neighboring MB and the left neighboring MB are available for use in coding the current MB, the above neighboring MB and the left neighboring MB are predicted from the VSP picture, and the VSP picture exists ("YES" of 502), video encoder 20 may include, in a slice data syntax structure, a syntax element that indicates that the current MB is predicted from the VSP picture and that no residual for the current MB is signaled (504). Otherwise ("NO" of 502), video encoder 20 may omit from the syntax element from the slice data syntax structure (506). In either case, video encoder 20 may signal, in the bitstream, the slice data syntax structure (508). In this way, video encoder 20 may signal, in the bitstream, a slice data syntax structure, the slice data syntax structure including a second syntax element when an above neighboring MB and a left neighboring MB are available for use in coding the current video unit, the above neighboring MB and the left neighboring MB are predicted from the VSP picture, and the VSP picture exists, and the second syntax element indicating that the MB is predicted from the VSP picture and that no residual for the MB is signaled.

FIG. 7B is a flowchart illustrating another example operation 550 of video decoder 30, in accordance with the techniques of this disclosure. In the example of FIG. 7B, video decoder 30 may determine whether an above neighboring MB and a left neighboring MB are available for use in coding a current MB, the above neighboring MB and the left neighboring MB are predicted from the VSP picture, and the VSP picture exists (552).

When the above neighboring MB and the left neighboring MB are available for use in coding the current MB, the above neighboring MB and the left neighboring MB are predicted from the VSP picture, and the VSP picture exists ("YES" of 552), video decoder 30 may determine that a slice data syntax structure includes a syntax element that indicates that the current MB is predicted from the VSP picture and that no residual for the current MB is signaled (554). Otherwise ("NO" of 552), video decoder 30 may determine that the syntax element is omitted from the slice data syntax structure (556). In either case, video decoder 30 may reconstruct sample blocks of the current MB (558). In this way, video encoder 30 may decode, from the bitstream a slice data syntax structure, the slice data syntax structure including a syntax element when an above neighboring MB and a left neighboring MB are available for use in coding the current video unit, the above neighboring MB and the left neighboring MB are predicted from the VSP picture, and the VSP picture exists, the syntax element indicating that the MB is predicted from the VSP picture and that no residual for the MB is signaled.

FIG. 8A is a flowchart illustrating another example operation 600 of video encoder 20, in accordance with the techniques of this disclosure. In the example of FIG. 8A, video encoder 20 may determine whether an above neighboring MB and a left neighboring MB are available for use in coding a current MB, the above neighboring MB and the left neighboring MB are predicted from the VSP picture, and the current MB is not predicted from the VSP picture (602). When the above neighboring MB and a left neighboring MB are available for use in coding the current MB, the above neighboring MB and the left neighboring MB are predicted from the VSP picture, and the current MB is not predicted from the VSP picture ("YES" of 602), video encoder 20 may include, in a MB layer syntax structure for the current MB, a syntax element that indicates a type of the current MB (604). Otherwise ("NO" of 602), video encoder 20 may omit from the syntax element from MB layer syntax structure (606).

Furthermore, video encoder 20 may determine whether the current MB is predicted from the VSP picture (608). When the current MB is not predicted from the VSP picture ("NO" of 608), video encoder 20 may include, in the MB layer syntax structure, a sub-MB prediction syntax structure or an MB prediction syntax structure (610). Otherwise ("YES" of 608), video encoder 20 may omit any sub-MB prediction syntax structures and any MB prediction syntax structures from the MB layer syntax structure (612). In either case, video encoder 20 may signal, in the bitstream, the MB layer syntax structure (614).

In this way, video encoder 20 may signal, in the bitstream, an MB layer syntax structure for the MB. The MB layer syntax structure may include a second syntax element when an above neighboring MB and a left neighboring MB are available for use in coding the current video unit, the above neighboring MB and the left neighboring MB are predicted from the VSP picture, and the MB is not predicted from the VSP picture, the second syntax element indicating a type of the MB. The MB layer syntax structure may include a sub-MB prediction syntax structure or an MB prediction syntax structure when the MB is not predicted from the VSP picture.

FIG. 8B is a flowchart illustrating another example operation 650 of video decoder 30, in accordance with the techniques of this disclosure. In the example of FIG. 8B, video decoder 30 may determine whether an above neighboring MB and a left neighboring MB are available for use in coding a current MB, the above neighboring MB and the left neighboring MB are predicted from the VSP picture, and the current MB is not predicted from the VSP picture (652). When the above neighboring MB and a left neighboring MB are available for use in coding the current MB, the above neighboring MB and the left neighboring MB are predicted from the VSP picture, and the current MB is not predicted from the VSP picture ("YES" of 652), video decoder 30 may determine that a MB layer syntax structure for the current MB includes a syntax element that indicates a type of the current MB (654). Otherwise ("NO" of 652), video decoder 30 may determine that the syntax element is omitted from MB layer syntax structure (656).

Furthermore, video decoder 30 may determine whether the current MB is predicted from the VSP picture (658). When the current MB is not predicted from the VSP picture ("NO" of 658), video decoder 30 may determine that the MB layer syntax structure includes a sub-MB prediction syntax structure or an MB prediction syntax structure (660). Otherwise ("YES" of 658), video decoder 30 may determine that any sub-MB prediction syntax structures and any MB prediction syntax structures are omitted from the MB layer syntax structure (662). In either case, video decoder 30 may reconstruct sample blocks of the MB (664).

In this way, video decoder 30 may decode, from the bitstream, an MB layer syntax structure for the MB, the MB layer syntax structure including a second syntax element when an above neighboring MB and a left neighboring MB are available for use in coding the current video unit, the above neighboring MB and the left neighboring MB are predicted from the VSP picture, and the MB is not predicted from the VSP picture, the second syntax element indicating a type of the MB, and the MB layer syntax structure including a sub-MB prediction syntax structure or an MB prediction syntax structure when the MB is not predicted from the VSP picture.

Figure 9A:
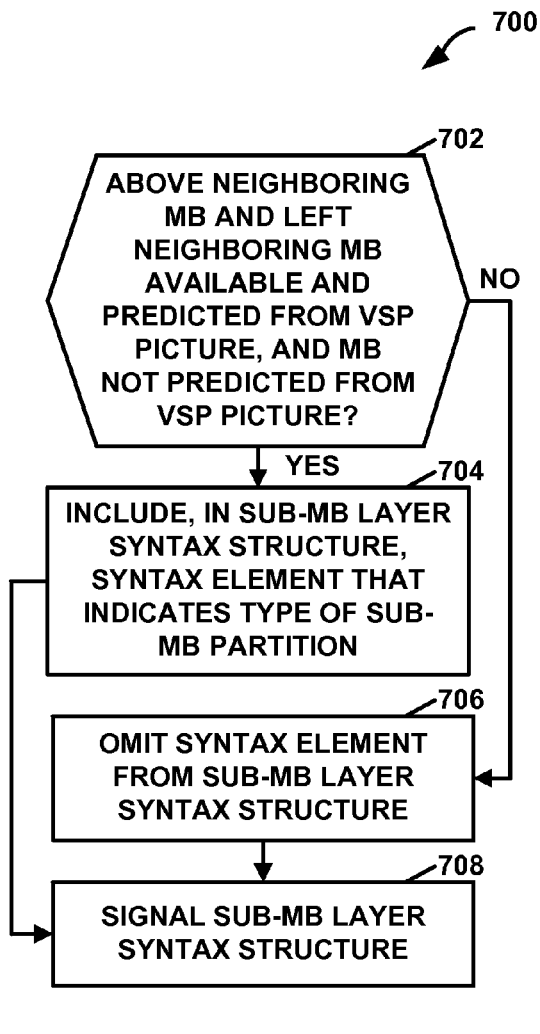
FIG. 9A is a flowchart illustrating another example operation of the video encoder, in accordance with the techniques of this disclosure.

FIG. 9A is a flowchart illustrating another example operation 700 of video encoder 20, in accordance with the techniques of this disclosure. In the example of FIG. 9A, video encoder 20 may determine whether an above neighboring MB and a left neighboring MB are available for use in coding a current sub-MB partition, the above neighboring MB and the left neighboring MB are predicted from the VSP picture, and the current sub-MB partition is not predicted from the VSP picture (702).

When the above neighboring MB and the left neighboring MB are available for use in coding the current sub-MB partition, the above neighboring MB and the left neighboring MB are predicted from the VSP picture, and the current sub-MB partition is not predicted from the VSP picture ("YES" of 702), video encoder 20 may include, in a sub-MB prediction syntax structure for the current sub-MB partition, a syntax element that indicates a type of the sub-MB partition (704). Otherwise ("NO" of 702), video encoder 20 may omit the syntax element from the sub-MB prediction syntax structure (706). In either case, video encoder 20 may signal, in the bitstream, the sub-MB prediction syntax structure (708). In this way, video encoder 20 may signal, in the bitstream, a sub-MB prediction syntax structure for the sub-MB partition, the sub-MB prediction syntax structure including a second syntax element when an above neighboring MB and a left neighboring MB are available for use in coding the current video unit, the above neighboring MB and the left neighboring MB are predicted from the VSP picture, and the sub-MB partition is not predicted from the VSP picture.

Figure 9B:
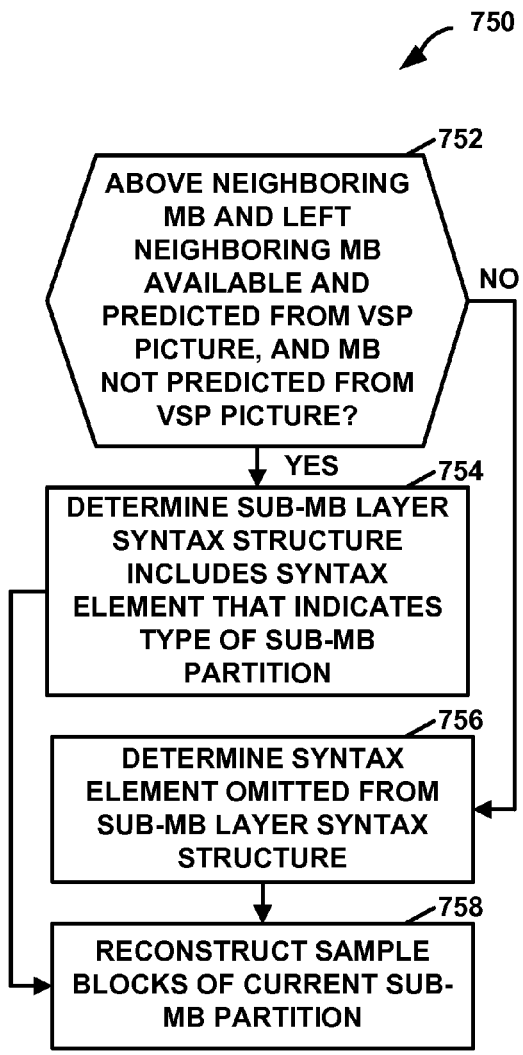
FIG. 9B is a flowchart illustrating another example operation of the video decoder, in accordance with the techniques of this disclosure.

FIG. 9B is a flowchart illustrating another example operation 750 of video decoder 30, in accordance with the techniques of this disclosure. In the example of FIG. 9B, video decoder 30 may determine whether an above neighboring MB and a left neighboring MB are available for use in coding a current sub-MB partition, the above neighboring MB and the left neighboring MB are predicted from the VSP picture, and a current sub-MB partition is not predicted from the VSP picture (752).

When the above neighboring MB and the left neighboring MB are available for use in coding the current sub-MB partition, the above neighboring MB and the left neighboring MB are predicted from the VSP picture, and the current sub-MB partition is not predicted from the VSP picture ("YES" of 752), video decoder 30 may determine that a sub-MB prediction syntax structure for the current sub-MB partition includes a syntax element that indicates a type of the sub-MB partition (754). Otherwise ("NO" of 752), video decoder 30 may determine that the syntax element is omitted from the sub-MB prediction syntax structure (756). In either case, video decoder 30 may reconstruct sample blocks of the sub-MB partition (758). In this way, video decoder 30 may decode, from the bitstream, a sub-MB prediction syntax structure for the sub-MB partition, the sub-MB prediction syntax structure including a second syntax element when an above neighboring MB and a left neighboring MB are available for use in coding the current video unit, the above neighboring MB and the left neighboring MB are predicted from the VSP picture, and the sub-MB partition is not predicted from the VSP picture, the second syntax element indicating a type of the sub-MB partition.

Figure 10:
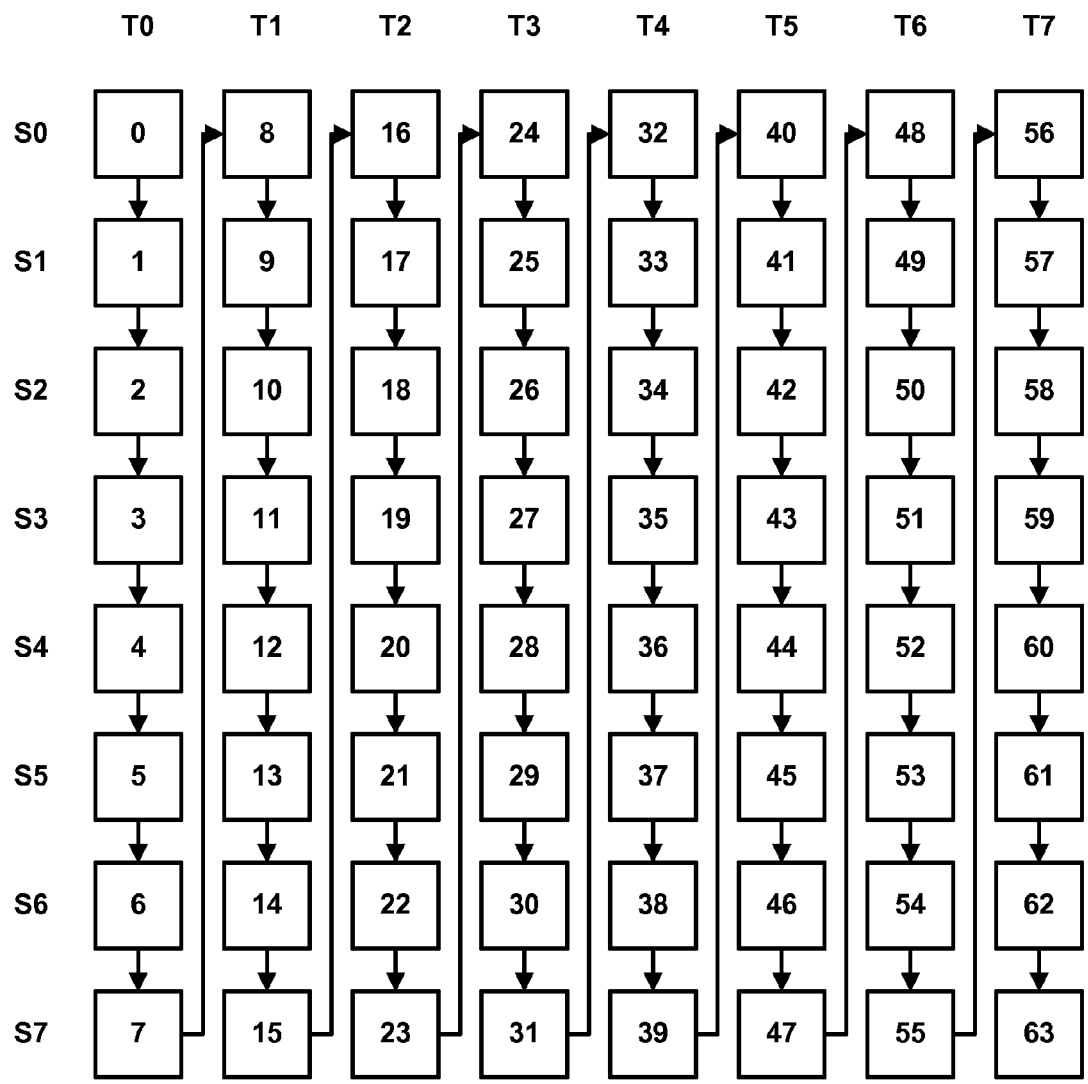
FIG. 10 is a conceptual diagram illustrating an example 3-dimensional video (3DV) decoding order.

FIG. 10 is a conceptual diagram illustrating an example 3DV decoding order. The MVC decoding order may be a bitstream order. In the example of FIG. 10, each square corresponds to a view component. Columns of squares correspond to access units. Each access unit may be defined to contain the coded pictures of all the views of a time instance. Rows of squares correspond to views. In the example of FIG. 10, the access units are labeled T0 . . . T7 and the views are labeled S0 . . . S7. Because each view component of an access unit is decoded before any view component of the next access unit, the decoding order of FIG. 10 may be referred to as time-first coding. As shown in the example of FIG. 10, the decoding order of access units may not be identical to the output or display order of the views.

Figure 11:
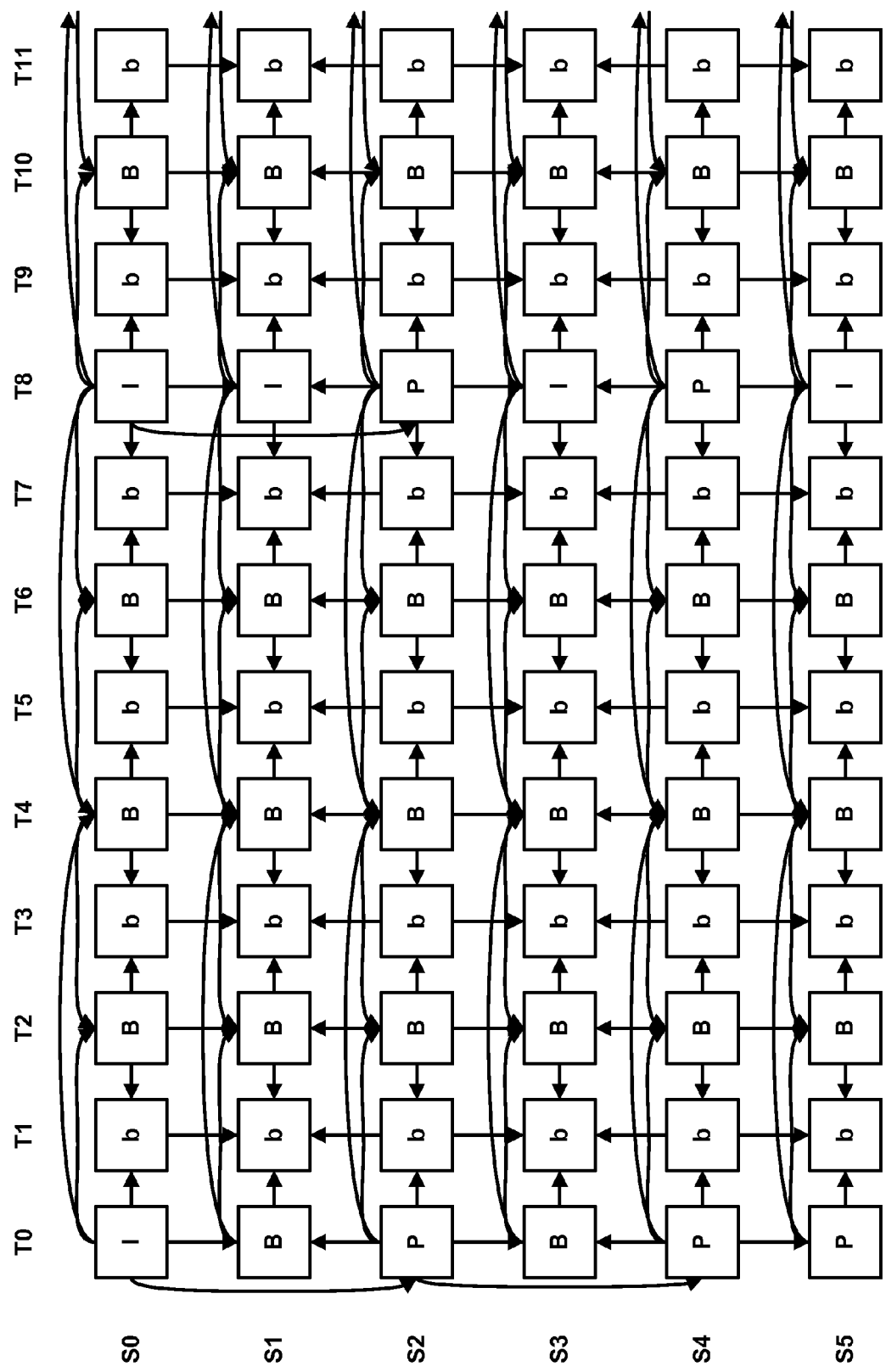
FIG. 11 is a conceptual diagram illustrating an example temporal and inter-view prediction structure.

FIG. 11 is a conceptual diagram illustrating an example temporal and inter-view prediction structure. In the example of FIG. 11, each square corresponds to a view component. Squares labeled "I" are intra predicted view components. Squares labeled "P" are uni-directionally inter predicted view components. Squares labeled "B" and "b" are bi-directionally inter predicted view components. Squares labeled "b" may use squares labeled "B" as reference pictures. An arrow that points from a first square to a second square indicates that the first square is available in inter prediction as a reference picture for the second square. As indicated by the vertical arrows in FIG. 11, view components in different views of the same access unit may be available as reference pictures. The use of one view component of an access unit as a reference picture for another view component of the same access unit may be referred to as inter-view prediction.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining whether a current video unit of the video data is coded using a first mode, wherein the current video unit is either a macro block (MB) or an MB partition of a current texture view component of a current view of a current access unit;
   when the current video unit is coded using the first mode:
      determining a reference view picture for view synthesis prediction, wherein the reference view picture is in the current access unit and is in a view indicated in a slice header as being a view for view synthesis;
      setting a reference index for the current video unit such that the reference index indicates the reference view picture; and
      deriving, from either a depth map or disparity motion vectors of one or more blocks that spatially or temporally neighbor the current video unit, a motion vector for the current video unit, wherein the motion vector for the current video unit refers to the reference view picture and the motion vector for the current video unit is not equal to 0, wherein deriving the motion vector comprises:
         determining a representative depth value;
         converting the representative depth value to a disparity vector; and
         setting the motion vector for the current video unit equal to the disparity vector;
   when the current video unit is coded using a second mode, decoding, from the bitstream, the reference index for the current video unit and a motion vector difference for the current video unit;
   generating a predictive block for the current video unit based on a reference block indicated by motion information of the current video unit, the motion information of the current video unit including the motion vector for the current video unit and the reference index for the current video unit; and
   adding the predictive block to a residual block to construct a sample block of the current video unit.

2. The method of claim 1, wherein the first mode is identified by one of the following syntax elements: a sub_mb_vsp_flag, a mb_part_vsp_flag, and a vsp_mb_flag.

3. The method of claim 1, wherein determining whether the current video unit is coded using the first mode comprises determining that the current video unit is coded using the first mode when the reference index for the current video unit has a specific value.

4. The method of claim 1, wherein setting the reference index for the current video unit comprises: for each i from 0 to a number of active reference pictures in a reference picture list RefPicList0, inclusive, if RefPicList0[i] is equal to the reference view picture for view synthesis prediction, setting the reference index to i.

5. A video decoding device comprising:
   a buffer configured to store reconstructed sample blocks of video data; and
   one or more processors configured to:
      determine whether a current video unit of the video data is coded using a first mode, wherein the current video unit is either a macroblock (MB) or an MB partition of a current texture view component of a current view of a current access unit;
      when the current video unit is coded using the first mode:
         determine a reference view picture for view synthesis prediction, wherein the reference view picture is in the current access unit and is in a view indicated in a slice header as being a view for view synthesis;
         set a reference index for the current video unit such that the reference index indicates the reference view picture; and
         derive, from either a depth map or disparity motion vectors of one or more blocks that spatially or temporally neighbor the current video unit, a motion vector for the current video unit, wherein the motion vector for the current video unit refers to the reference view picture and the motion vector for the current video unit is not equal to 0, wherein to derive the motion vector for the current video unit, the one or more processors:
            determine a representative depth value;
            convert the representative depth value to a disparity vector; and
            set the motion vector for the current video unit equal to the disparity vector;
      when the current video unit is coded using a second mode, decode, from the bitstream, the reference index for the current video unit and a motion vector difference for the current video unit;
      generate a predictive block for the current video unit based on a reference block indicated by motion information of the current video unit, the motion information of the current video unit including the motion vector for the current video unit and the reference index for the current video unit; and
      add the predictive block to a residual block to construct a sample block of the current video unit.

6. The video decoding device of claim 5, wherein the first mode is identified by one of the following syntax elements: a sub_mb_vsp_flag, a mb_part_vsp_flag, and a vsp_mb_flag.

7. The video decoding device of claim 5, wherein the one or more processors are configured to determine that the current video unit is coded using the first mode when the reference index for the current video unit has a specific value.

8. The video decoding device of claim 5, wherein the one or more processors are configured to set the reference index for the current video unit such that, for each i from 0 to a number of active reference pictures in a reference picture list RefPicList0, inclusive, if RefPicList0[i] is equal to the reference view picture for view synthesis prediction, the one or more processors set the reference index to i.

9. The video decoding device of claim 5, wherein the video decoding device comprises at least one of:
   an integrated circuit;
   a microprocessor; or
   a wireless communication device.

10. A video decoding device comprising:
means for determining whether a current video unit of video data is coded using a first mode, wherein the current video unit is either a macroblock (MB) or an MB partition of a current texture view-component of a current view of a current access unit;
means for determining, when the current video unit is coded using the first mode, a reference view picture for view synthesis prediction, wherein the reference view picture is in the current access unit and is in a view indicated in a slice header as being a view for view synthesis;
means for setting, when the current video unit is coded using the first mode, a reference index for the current video unit such that the reference index indicates the reference view picture;
means for deriving, when the current video unit is coded using the first mode, from either a depth map or disparity motion vectors of one or more blocks that spatially or temporally neighbor the current video unit, a motion vector for the current video unit, wherein the motion vector for the current video unit refers to the reference view picture and the motion vector for the current video unit is not equal to 0, wherein deriving the motion vector comprises:
determining a representative depth value;
converting the representative depth value to a disparity vector; and
setting the motion vector of the current video unit equal to the disparity vector;
means for decoding, when the current video unit is coded using a second mode, from the bitstream, the reference index for the current video unit and a motion vector difference for the current video unit;
means for generating a predictive block for the current video unit based on a reference block indicated by motion information of the current video unit, the motion information of the current video unit including the motion vector for the current video unit and the reference index for the current video unit; and
means for adding the predictive block to a residual block to construct a sample block of the current video unit.

11. A non-transitory computer-readable storage medium having instructions stored thereon that, when executed by one or more processors of a video decoding device, configure the video decoding device to:
determine whether a current video unit of video data is coded using a first mode, wherein the current video unit is either a macroblock (MB) or an MB partition of a current texture view component of a current view of a current access unit;
when the current video unit is coded using the first mode:
determine a reference view picture for view synthesis prediction, wherein the reference view picture is in the current access unit and is in a view indicated in a slice header as being a view for view synthesis;
set a reference index for the current video unit such that the reference index indicates the reference view picture;
derive, from either a depth map or disparity motion vectors of one or more blocks that spatially or temporally neighbor the current video unit, a motion vector for the current video unit, wherein the motion vector for the current video unit refers to the reference view picture and the motion vector for the current video unit is not equal to 0, wherein the instructions configure the video decoding device to:
determine a representative depth value;
convert the representative depth value to a disparity vector; and
set the motion vector for the current video unit equal to the disparity vector;
when the current video unit is coded using a second mode, decode, from the bitstream, the reference index for the current video unit and a motion vector difference for the current video unit;
generate a predictive block for the current video unit based on a reference block indicated by motion information of the current video unit, the motion information of the current video unit including the motion vector for the current video unit and the reference index for the current video unit; and
add predictive block to a residual block to construct a sample block of the current video unit.

12. A method for encoding video data, the method comprising:
signaling, in a bitstream that includes an encoded representation of multiple texture views of the video data and multiple depth views of the video data, whether a current video unit is coded using a first mode, wherein the current video unit is either a macro block (MB) or an MB partition of a current texture view component of a current view of a current access unit;
when the current video unit is coded using a second mode, signaling, in the bitstream, a reference index for the current video unit and a motion vector for the current video unit;
when the current video unit is coded using the first mode:
determining a reference view picture for view synthesis prediction, wherein the reference view picture is in the current access unit and is in a view indicated in a slice header as being a view for view synthesis;
setting the reference index for the current video unit such that the reference index indicates the reference view picture;
deriving, from either a depth map or disparity motion vectors of one or more blocks that spatially or temporally neighbor the current video unit, the motion vector for the current video unit, wherein the motion vector for the current video unit refers to the reference view picture and the motion vector for the current video unit is not equal to 0, wherein deriving the motion vector comprises:
determining a representative depth value;
converting the representative depth value to a disparity vector; and
setting the motion vector for the current video unit to the disparity vector; and
omitting, from the bitstream, the motion vector for the current video unit; and
outputting the bitstream.

13. The method of claim 12, wherein the first mode is identified by one of the following syntax elements: a sub_mb_vsp_flag, a mb_part_vsp_flag, and a vsp_mb_flag.

14. The method of claim 12, wherein signaling whether the current video unit is coded using the first mode comprises signaling, in the bitstream, that the reference index for the current video unit has a specific value.

15. The method of claim 12, wherein setting the reference index for the current video unit comprises: for each i from 0 to a number of active reference pictures in a reference picture list RefPicList0, inclusive, if RefPicList0[i] is equal to the reference view picture for view synthesis prediction, setting the reference index to i.

16. A video encoding device comprising:
one or more processors configured to:
signal, in a bitstream that includes an encoded representation of multiple texture views of video data and multiple depth views of the video data, whether a current video unit is coded using a first mode, wherein the current video unit is either a macroblock (MB) or an MB partition of a current texture view component of a current view of a current access unit;
when the current video unit is coded using a second mode, signal, in the bitstream, a reference index for the current video unit and a motion vector for the current video unit;
when the current video unit is coded using the first mode:
determine a reference view picture for view synthesis prediction, wherein the reference view picture is in the current access unit and is in a view indicated in a slice header as being a view for view synthesis;
set the reference index for the current video unit such that the reference index indicates the reference view picture;
derive, from either a depth map or disparity motion vectors of one or more blocks that spatially or temporally neighbor the current video unit, the motion vector for the current video unit, wherein the motion vector for the current video unit refers to the reference view picture and the motion vector for the current video unit is not equal to 0, wherein to derive the motion vector, the one or more processors:
determine a representative depth value;
convert the representative depth value to a disparity vector; and
set the motion vector for the current video unit to the disparity vector; and
omit, from the bitstream, the motion vector for the current video unit; and
an output interface configured to output the bitstream.

17. The video encoding device of claim 16, wherein the first mode is identified by one of the following syntax elements: a sub_mb_vsp_flag, a mb_part_vsp_flag, and a vsp_mb_flag.

18. The video encoding device of claim 16, wherein the one or more processors are configured to signal whether the current video unit is coded using the first mode by signaling, in the bitstream, that the reference index for the current video unit has a specific value.

19. The video encoding device of claim 16, wherein the one or more processors are configured such that, for each i from 0 to a number of active reference pictures in a reference picture list RefPicList0, inclusive, if RefPicList0[i] is equal to the reference view picture for view synthesis prediction, the one or more processors set the reference index to i.

20. The video decoding device of claim 5, further comprising a display configured to display decoded video data.

21. The video encoding device of claim 16, wherein the video encoding device comprises at least one of:
an integrated circuit;
a microprocessor; or
a wireless communication device.

22. The video encoding device of claim 16, further comprising a camera configured to capture the video data.

23. A video encoding device comprising:
means for signaling, in a bitstream that includes an encoded representation of multiple texture views of video data and multiple depth views of the video data, whether a current video unit is coded using a first mode, wherein the current video unit is either a macro block (MB) or an MB partition of a current texture view component of a current view of a current access unit;
means for signaling, when the current video unit is coded using a second mode, in the bitstream, a reference index for the current video unit and a motion vector for the current video unit;
means for determining, when the current video unit is coded using the first mode, a reference view picture for view synthesis prediction, wherein the reference view picture is in the current access unit and is in a view indicated in a slice header as being a view for view synthesis;
means for setting, when the current video unit is coded using the first mode, the reference index for the current video unit such that the reference index indicates the reference view picture;
means for deriving, when the current video unit is coded using the first mode, from either a depth map or disparity motion vectors of one or more blocks that spatially or temporally neighbor the current video unit, the motion vector for the current video unit, wherein the motion vector for the current video unit refers to the reference view picture and the motion vector for the current video unit is not equal to 0, wherein deriving the motion vector for the current video unit comprises:
determining a representative depth value;
converting the representative depth value to a disparity vector; and
setting the motion vector for the current video unit to the disparity vector; and
means for omitting, when the current video unit is coded using the first mode, from the bitstream, the motion vector for the current video unit; and
means for outputting the bitstream.

24. A non-transitory computer-readable storage medium having instructions stored thereon that, when executed by one or more processors of a video encoding device, configure the video encoding device to:
signal, in a bitstream that includes an encoded representation of multiple texture views of video data and multiple depth views of the video data, whether a current video unit is coded using a first mode, wherein the current video unit is either a macroblock (MB) or an MB partition of a current texture view component of a current view of a current access unit;
when the current video unit is coded using a second mode, signal, in the bitstream, a reference index for the current video unit and a motion vector for the current video unit;
when the current video unit is coded using the first mode:
determine a reference view picture for view synthesis prediction, wherein the reference view picture is in the current access unit and is in a view indicated in a slice header as being a view for view synthesis;
set the reference index for the current video unit such that the reference index indicates the reference view picture;
derive, from either a depth map or disparity motion vectors of one or more blocks that spatially or temporally neighbor the current video unit, the motion vector for the current video unit, wherein the motion vector for the current video unit refers to the reference view picture and the motion vector for the current video unit is not equal to 0, wherein the instructions configure the video encoding device to:
determine a representative depth value;
convert the representative depth value to a disparity vector; and
set the motion vector for the current video unit to the disparity vector; and
omit, from the bitstream, the motion vector for the current video unit; and
output the bitstream.

* * * * *